US011934569B2

(12) United States Patent
Pastrana Vicente et al.

(10) Patent No.: US 11,934,569 B2
(45) Date of Patent: Mar. 19, 2024

(54) DEVICES, METHODS, AND GRAPHICAL USER INTERFACES FOR INTERACTING WITH THREE-DIMENSIONAL ENVIRONMENTS

(71) Applicant: Apple Inc., Cupertino, CA (US)

(72) Inventors: Israel Pastrana Vicente, Spring, TX (US); Jonathan R. Dascola, San Francisco, CA (US); Christopher D. McKenzie, Burlingame, CA (US); Jesse Chand, San Francisco, CA (US); Stephen O. Lemay, Palo Alto, CA (US); Kristi E. S. Bauerly, Los Altos, CA (US); Zoey C. Taylor, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/948,117

(22) Filed: Sep. 19, 2022

(65) Prior Publication Data

US 2023/0100610 A1    Mar. 30, 2023

Related U.S. Application Data

(60) Provisional application No. 63/248,370, filed on Sep. 24, 2021.

(51) Int. Cl.
*G06F 3/01*    (2006.01)
*G06F 3/16*    (2006.01)
*G06F 3/048*   (2013.01)

(52) U.S. Cl.
CPC .............. *G06F 3/011* (2013.01); *G06F 3/165* (2013.01)

(58) Field of Classification Search
CPC ...... G06F 3/011; G06F 3/165; G06F 3/04815; H04N 7/157; G06T 19/003
See application file for complete search history.

(56) References Cited

U.S. PATENT DOCUMENTS 6,002,853 A * 12/1999 de Hond ............... G06F 16/954
                                                     709/219
6,079,982 A *  6/2000 Meader ................... A63F 13/54
                                                      434/30

(Continued)

FOREIGN PATENT DOCUMENTS

EP      3 751 433 A1    12/2020

OTHER PUBLICATIONS

Invitation to Pay Additional Fees, dated Jan. 20, 2023, received in International Patent Application No. PCT/US2022/044339, which corresponds with U.S. Appl. No. 17/948,117, 15 pages.

(Continued)

*Primary Examiner* — Nicholas Augustine
(74) *Attorney, Agent, or Firm* — Morgan, Lewis & Bockius LLP

(57) ABSTRACT

A computer system displays a first and second user interface object in a three-dimensional environment. The first and second user interface objects have a first and second spatial relationship to a first and second anchor position corresponding to a location of a user's hand in a physical environment, respectively. While displaying the first and second user interface objects in the three-dimensional environment, the computer system detects movement of the user's hand in the physical environment, corresponding to a translational movement and a rotational movement of the user's hand relative to a viewpoint, and in response, translates the first and second user interface objects relative to the viewpoint in accordance with the translational movement of the user's hand, and rotates the first user interface object relative to the viewpoint in accordance with the rotational movement of the user's hand without rotating the second user interface object.

60 Claims, 15 Drawing Sheets

(56) References Cited

U.S. PATENT DOCUMENTS

| | | | | |
|---|---|---|---|---|
| 6,119,147 A * | 9/2000 | Toomey | G06Q 10/109 | 719/329 |
| 6,179,619 B1 * | 1/2001 | Tanaka | A63G 7/00 | 472/60 |
| 6,219,045 B1 * | 4/2001 | Leahy | H04L 67/10 | 709/204 |
| 6,362,817 B1 * | 3/2002 | Powers | G06T 17/00 | 345/428 |
| 6,396,522 B1 * | 5/2002 | Vu | G06F 3/04845 | 715/848 |
| 6,414,679 B1 * | 7/2002 | Miodonski | G06T 13/00 | 707/999.005 |
| 6,570,563 B1 * | 5/2003 | Honda | A63F 13/352 | 345/473 |
| 6,573,903 B2 * | 6/2003 | Gantt | G06F 30/00 | 345/619 |
| 6,784,901 B1 * | 8/2004 | Harvey | H04L 67/02 | 715/848 |
| 6,961,055 B2 * | 11/2005 | Doak | A63F 13/63 | 345/677 |
| 7,119,819 B1 * | 10/2006 | Robertson | G06F 3/04815 | 715/848 |
| 7,414,629 B2 * | 8/2008 | Santodomingo | G06T 17/05 | 345/582 |
| 7,542,040 B2 * | 6/2009 | Templeman | G06T 13/40 | 345/474 |
| 7,663,625 B2 * | 2/2010 | Chartier | G06T 19/20 | 700/182 |
| 7,746,343 B1 * | 6/2010 | Charaniya | G06N 7/01 | 345/428 |
| 7,788,323 B2 * | 8/2010 | Greenstein | G06Q 10/10 | 715/744 |
| 7,804,507 B2 * | 9/2010 | Yang | H04N 13/344 | 345/633 |
| 7,814,429 B2 * | 10/2010 | Buffet | G06F 30/00 | 715/763 |
| 7,817,150 B2 * | 10/2010 | Reichard | G06T 15/20 | 715/705 |
| 7,844,724 B2 * | 11/2010 | Van Wie | H04L 67/131 | 709/227 |
| 9,244,533 B2 * | 1/2016 | Friend | G09B 21/009 | |
| 9,696,795 B2 * | 7/2017 | Marcolina | G06T 17/10 | |
| 9,996,797 B1 * | 6/2018 | Holz | G06F 3/04842 | |
| 10,516,853 B1 * | 12/2019 | Gibson | H04N 7/157 | |
| 2001/0018667 A1 * | 8/2001 | Kim | G06Q 30/0277 | 705/14.73 |
| 2002/0113820 A1 * | 8/2002 | Robinson | G06F 16/954 | 715/764 |
| 2004/0113887 A1 * | 6/2004 | Pair | G09B 25/08 | 345/156 |
| 2004/0193441 A1 * | 9/2004 | Altieri | A63F 13/216 | 709/203 |
| 2005/0093719 A1 * | 5/2005 | Okamoto | G01C 21/3697 | 705/14.62 |
| 2005/0128212 A1 * | 6/2005 | Edecker | G06T 17/05 | 345/581 |
| 2008/0030429 A1 * | 2/2008 | Hailpern | G06T 7/73 | 345/8 |
| 2008/0125218 A1 * | 5/2008 | Collins | G06Q 90/00 | 463/31 |
| 2008/0246693 A1 * | 10/2008 | Hailpern | G06T 7/246 | 345/8 |
| 2009/0076791 A1 * | 3/2009 | Rhoades | A63F 13/53 | 703/21 |
| 2009/0091583 A1 * | 4/2009 | McCoy | G06T 19/006 | 345/419 |
| 2010/0115428 A1 * | 5/2010 | Shuping | G06F 3/0481 | 715/277 |
| 2010/0205541 A1 * | 8/2010 | Rapaport | G06Q 30/02 | 715/753 |
| 2010/0214284 A1 * | 8/2010 | Rieffel | G06T 17/00 | 382/154 |
| 2010/0274567 A1 * | 10/2010 | Carlson | G06Q 40/02 | 235/487 |
| 2010/0274627 A1 * | 10/2010 | Carlson | G06Q 20/20 | 705/16 |
| 2011/0010636 A1 * | 1/2011 | Hamilton, II | G06Q 10/10 | 705/26.7 |
| 2012/0249741 A1 * | 10/2012 | Maciocci | G06T 19/006 | 348/51 |
| 2013/0042296 A1 * | 2/2013 | Hastings | G06Q 50/184 | 726/1 |
| 2013/0174213 A1 * | 7/2013 | Liu | G06F 21/6245 | 726/1 |
| 2014/0082526 A1 * | 3/2014 | Park | H04L 65/403 | 715/757 |
| 2014/0282105 A1 * | 9/2014 | Nordstrom | G06F 3/016 | 715/753 |
| 2016/0026253 A1 * | 1/2016 | Bradski | H04N 13/128 | 345/8 |
| 2017/0017301 A1 | 1/2017 | Doornenbal et al. | | |
| 2017/0148223 A1 * | 5/2017 | Holzer | G06V 20/10 | |
| 2017/0185261 A1 * | 6/2017 | Perez | G06F 3/04845 | |
| 2017/0243403 A1 * | 8/2017 | Daniels | G06F 3/1454 | |
| 2018/0129278 A1 * | 5/2018 | Luchinskiy | G06F 3/0483 | |
| 2018/0131907 A1 * | 5/2018 | Schmirler | H04N 23/698 | |
| 2018/0357472 A1 * | 12/2018 | Dreessen | G06V 20/49 | |
| 2019/0087015 A1 * | 3/2019 | Lam | A63F 13/213 | |
| 2020/0110928 A1 * | 4/2020 | Al Jazaery | G05B 19/042 | |
| 2020/0117267 A1 * | 4/2020 | Gibson | G06F 3/011 | |
| 2020/0117270 A1 * | 4/2020 | Gibson | G06F 3/011 | |
| 2021/0008413 A1 * | 1/2021 | Asikainen | G06F 3/0304 | |
| 2021/0041951 A1 * | 2/2021 | Gibson | G06T 7/74 | |
| 2021/0191600 A1 | 6/2021 | Lemay et al. | | |
| 2022/0070232 A1 * | 3/2022 | Young | G06T 19/003 | |

OTHER PUBLICATIONS

International Search Report and Written Opinion, dated Mar. 15, 2023, received in International Patent Application No. PCT/US2022/044339, which corresponds with U.S. Appl. No. 17/948,117, 21 pages.

* cited by examiner

DEVICES, METHODS, AND GRAPHICAL USER INTERFACES FOR INTERACTING WITH THREE-DIMENSIONAL ENVIRONMENTS

RELATED APPLICATIONS

This applications claims priority to U.S. Provisional Application Ser. No. 63/248,370, filed Sep. 24, 2021, which is incorporated by reference herein in its entirety.

TECHNICAL FIELD

This disclosure relates generally to computer systems with a display generation component and one or more input devices that provide computer-generated extended reality (XR) experiences, including but not limited to electronic devices that provide virtual reality and mixed reality experiences via a display generation component.

BACKGROUND

The development of computer systems for virtual reality, augmented reality, and extended reality has increased significantly in recent years. Example augmented reality and extended reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented/extended reality environments. Example virtual elements include virtual objects include digital images, video, text, icons, and control elements such as buttons and other graphics.

But methods and interfaces for interacting with environments that include at least some virtual elements (e.g., applications, augmented reality environments, mixed reality environments, virtual reality environments, and extended reality environments) are cumbersome, inefficient, and limited. For example, systems that provide insufficient feedback for performing actions associated with virtual objects, systems that require a series of inputs to achieve a desired outcome in a virtual/augmented/extended reality environment, and systems in which manipulation of virtual objects are complex, tedious and error-prone, create a significant cognitive burden on a user, and detract from the experience with the virtual/augmented/extended reality environment. In addition, these methods take longer than necessary, thereby wasting energy. This latter consideration is particularly important in battery-operated devices.

SUMMARY

Accordingly, there is a need for computer systems with improved methods and interfaces for providing computer generated experiences to users that make interaction with the computer systems more efficient and intuitive for a user. The above deficiencies and other problems associated with user interfaces for computer systems with a display generation component and one or more input devices are reduced or eliminated by the disclosed systems, methods, and user interfaces. Such systems, methods and interfaces optionally complement or replace conventional systems, methods, and user interfaces for providing extended reality experiences to users. Such methods and interfaces reduce the number, extent, and/or nature of the inputs from a user by helping the user to understand the connection between provided inputs and device responses to the inputs, thereby creating a more efficient human-machine interface.

In accordance with some embodiments, a method is performed at a computer system that is in communication with a first display generation component and one or more input devices. The method includes displaying, via the first display generation component, a first user interface object and a second user interface object in a first view of a three-dimensional environment, wherein a respective characteristic position of the first user interface object in the three-dimensional environment has a first spatial relationship to a first anchor position in the three-dimensional environment that corresponds to a location of a first hand of a user in a physical environment, and a respective characteristic position of the second user interface object in the three-dimensional environment has a second spatial relationship to the first anchor position in the three-dimensional environment that corresponds to the location of the first hand of the user in the physical environment, and wherein the first user interface object includes one or more user interface objects in a predetermined layout. The method further includes, while displaying the first user interface object and the second user interface object in the first view of the three-dimensional environment detecting, via the one or more input devices, a first movement of the first hand in the physical environment, the first movement of the first hand corresponds to a translational movement and a rotational movement relative to a viewpoint corresponding to the first view of the three-dimensional environment. The method further includes, in response to detecting the first movement of the first hand in the physical environment: translating the first user interface object and the second user interface object in the three-dimensional environment relative to the viewpoint in accordance with the translational movement of the first hand in the physical environment and rotating the first user interface object in the three-dimensional environment relative to the viewpoint in accordance with the rotational movement of the first hand in the physical environment, without rotating the second user interface object in the three-dimensional environment.

In some embodiments, a method is performed at a computer system that is in communication with a first display generation component and one or more input devices. The method includes displaying, via the first display generation component, a view of a communication session between a first user of the first display generation component and a second user of a second display generation component that is different from the first display generation component, wherein the view of the communication session includes a view of a three-dimensional environment that includes at least some virtual content that is shared between the first user and the second user, wherein displaying the view of the three-dimensional environment of the communication session includes displaying a respective representation of the second user in the view of the three-dimensional environment, and wherein the respective representation of the second user is determined based on a virtual spatial relationship between the first user and the second user in the three-dimensional environment. The method further includes, while displaying the view of the communication session, displaying, via the first display generation component, a user interface for controlling the communication session, wherein the user interface for controlling the communication session includes a first control object that, when activated by the first user causes the first computer system to perform a respective operation that modifies an appearance of a three-dimensional region of the three-dimensional environment. The method further includes, while displaying the view of the three-dimensional environment, detecting a first user input that actives the first control object. The method further includes, in response to detecting the first user input that activates the first control object: modifying the appearance of the three-dimensional region of the three dimensional environment for the first user of the first display generation component and initiating a process for the appearance of the three-dimensional region of the three dimensional environment displayed at the second display generation component to be modified for the second user of the second display generation component.

In some embodiments, a method is performed at a computer system that is in communication with a first display generation component and one or more input devices. The method includes displaying a first three-dimensional computer-generated experience in a view of a three-dimensional environment. The method further includes, while displaying the first three-dimensional computer-generated experience in the view of the three-dimensional environment, detecting a first event. The method further includes, in response to detecting the first event, displaying a first user interface object in the view of the three-dimensional environment, wherein the first user interface object includes one or more user interface objects that, when activated, causes the computer system to perform respective operations that modify at least one aspect the display of the first computer-generated experience in the three-dimensional environment. The method further includes, while displaying the first user interface object in the view of the three-dimensional environment, detecting that attention of a user is no longer directed to the first user interface object. The method further includes, in response to detecting that the attention of the user is no longer directed to the first user interface object: in accordance with a determination that the first user interface object is of a first object type that has a first spatial relationship relative to a viewpoint of the view of the three-dimensional environment, ceasing to display at least a portion of the first user interface object in the view of the three-dimensional environment, and in accordance with a determination that the first user interface object is of a second object type that has a second spatial relationship relative to the three-dimensional environment that is different from the first spatial relationship, maintaining display of the first user interface object in the three-dimensional environment.

In accordance with some embodiments, a computer system includes or is in communication with a display generation component (e.g., a display, a projector, and/or a head-mounted display), one or more input devices (e.g., one or more cameras, a touch-sensitive surface, optionally one or more sensors to detect intensities of contacts with the touch-sensitive surface), optionally one or more audio output components, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a non-transitory computer readable storage medium has stored therein instructions, which, when executed by a computer system with a display generation component, one or more input devices (e.g., one or more cameras, a touch-sensitive surface, optionally one or more sensors to detect intensities of contacts with the touch-sensitive surface), optionally one or more audio output components, and optionally one or more tactile output generators, cause the device to perform or cause performance of the operations of any of the methods described herein. In accordance with some embodiments, a graphical user interface on a computer system with a display generation component, one or more input devices (e.g., one or more cameras, a touch-sensitive surface, optionally one or more sensors to detect intensities of contacts with the touch-sensitive surface), optionally one or more audio output components, optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, a computer system includes: a display generation component, one or more input devices (e.g., one or more cameras, a touch-sensitive surface, optionally one or more sensors to detect intensities of contacts with the touch-sensitive surface), optionally one or more audio output components, and optionally one or more tactile output generators; and means for performing or causing performance of the operations of any of the methods described herein. In accordance with some embodiments, an information processing apparatus, for use in a computer system with a display generation component, one or more input devices (e.g., one or more cameras, a touch-sensitive surface, optionally one or more sensors to detect intensities of contacts with the touch-sensitive surface), optionally one or more audio output components, and optionally one or more tactile output generators, includes means for performing or causing performance of the operations of any of the methods described herein.

Thus, computer systems with display generation components are provided with improved methods and interfaces for interacting with a three-dimensional environment and facilitating the user's user of the computer systems when interacting with the three-dimensional environment, thereby increasing the effectiveness, efficiency, and user safety and satisfaction with such computer systems. Such methods and interfaces may complement or replace conventional methods for interacting with a three-dimensional environment and facilitating the user's use of the computer systems when interacting with the three-dimensional environment.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1:
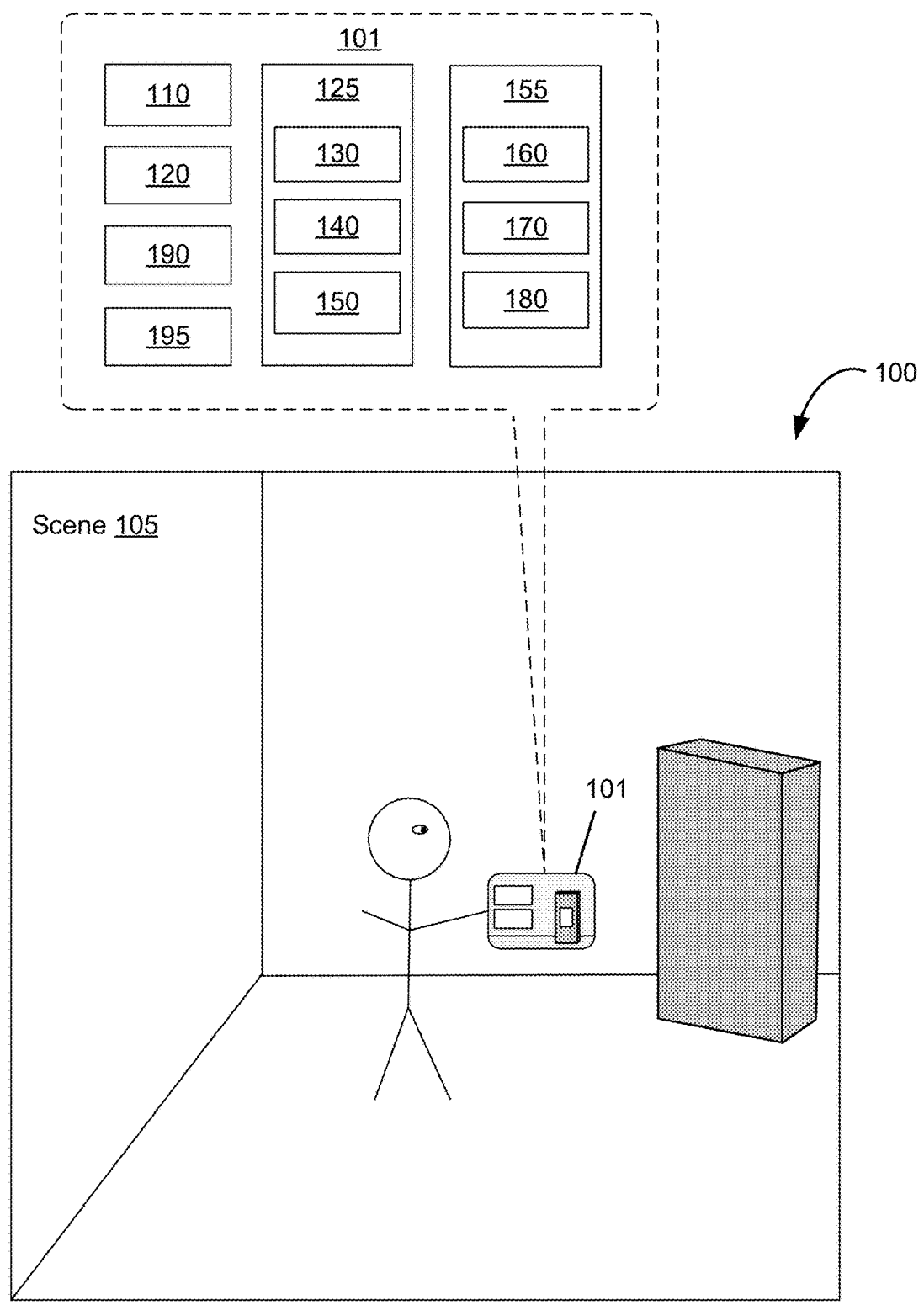
FIG. 1 is a block diagram illustrating an operating environment of a computer system for providing extended-reality (XR) experiences in accordance with some embodiments.

The present disclosure relates to user interfaces for providing a computer generated extended reality (XR) experience to a user, in accordance with some embodiments.

The systems, methods, and GUIs described herein improve user interface interactions with virtual/augmented reality environments in multiple ways.

In some embodiments, a computer system displays a first user interface object and a second user interface object, with respective spatial relationships relative to an anchor position corresponding to a user's hand, and in response to detecting movement of the user's hand, the computer system translates both the first user interface object and the second user interface object in accordance with the translational movement of the user's hand. The computer system rotates the first user interface object but not the second user interface object in accordance with rotational movement of the user's hand, in accordance with some embodiments.

In some embodiments, a computer system modifies the appearance of a shared view of a communication session corresponding to a shared three-dimensional environment between multiple users. For example, the computer system displays selectable controls that allow a user to adjust various applications and other settings related to the shared three-dimensional environment that is shared with other users during the communication session.

In some embodiments, a computer system displays user interface elements for a user in a three-dimensional environment, and automatically removes certain user interface elements that have not been placed in the three-dimensional environment in response to the user looking away from the user interface elements. For example, a user interface element that has been placed in and anchored to the three-dimensional environment, is maintained when the user looks away from the user interface element, while user interface elements that are not placed in and anchored to the three-dimensional environment are removed from the current view when the user is not paying attention to the user interface elements.

FIGS. 1-6 provide a description of example computer systems for providing XR experiences to users. The user interfaces in FIGS. 7A-7J are used to illustrate the processes in FIGS. 8-10, respectively.

The processes described below enhance the operability of the devices and make the user-device interfaces more efficient (e.g., by helping the user to provide proper inputs and reducing user mistakes when operating/interacting with the device) through various techniques, including by providing improved visual, audio, and/or haptic feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In some embodiments, as shown in FIG. 1, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, and/or a touch-screen), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, and/or velocity sensors), and optionally one or more peripheral devices 195 (e.g., home appliances, and/or wearable devices). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended-reality: In contrast, a extended-reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, an XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in an XR environment may be made in response to representations of physical motions (e.g., vocal commands). A person may sense and/or interact with an XR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: There are many different types of electronic systems that enable a person to sense and/or interact with various XR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/ earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate an XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical setting/environment). For example, the controller 110 is a local server located within the scene 105. In another example, the controller 110 is a remote server located outside of the scene 105 (e.g., a cloud server, central server, or another server). In some embodiments, the controller 110 is communicatively coupled with the display generation component 120 (e.g., an HMD, a display, a projector, and/or a touch-screen) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/ or hardware. The display generation component 120 is described in greater detail below with respect to FIG. 3. In some embodiments, the functionalities of the controller 110 are provided by and/or combined with the display generation component 120.

According to some embodiments, the display generation component 120 provides an XR experience to the user while the user is virtually and/or physically present within the scene 105.

In some embodiments, the display generation component is worn on a part of the user's body (e.g., on his/her head, on his/her hand). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is an XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operation environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
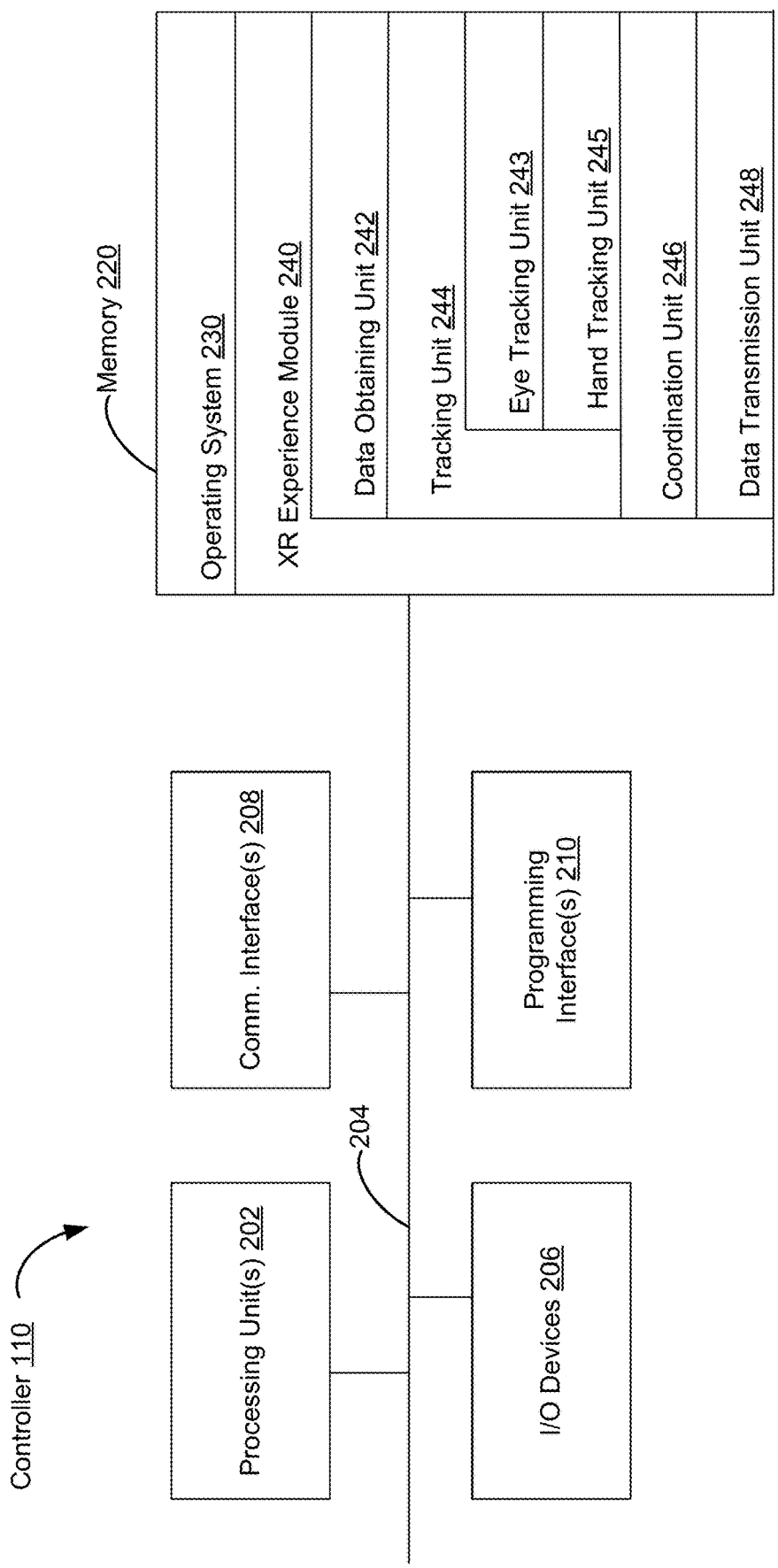
FIG. 2 is a block diagram illustrating a controller of a computer system that is configured to manage and coordinate an XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLU- ETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and an XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 242, a tracking unit 244, a coordination unit 246, and a data transmitting unit 248.

In some embodiments, the data obtaining unit 242 is configured to obtain data (e.g., presentation data, interaction data, sensor data, and/or location data) from at least the display generation component 120 of FIG. 1, and optionally one or more of the input devices 125, output devices 155, sensors 190, and/or peripheral devices 195. To that end, in various embodiments, the data obtaining unit 242 includes instructions and/or logic therefor, and heuristics and metadata therefor.

In some embodiments, the tracking unit 244 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 244 includes instructions and/or logic therefor, and heuristics and metadata therefor. In some embodiments, the tracking unit 244 includes hand tracking unit 245 and/or eye tracking unit 243. In some embodiments, the hand tracking unit 245 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 245 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, and/or location data) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 242, the tracking unit 244 (e.g., including the eye tracking unit 243 and the hand tracking unit 245), the coordination unit 246, and the data transmitting unit 248 are shown as residing on a single device (e.g., the controller 110), it should be understood that in other embodiments, any combination of the data obtaining unit 242, the tracking unit 244 (e.g., including the eye tracking unit 243 and the hand tracking unit 245), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
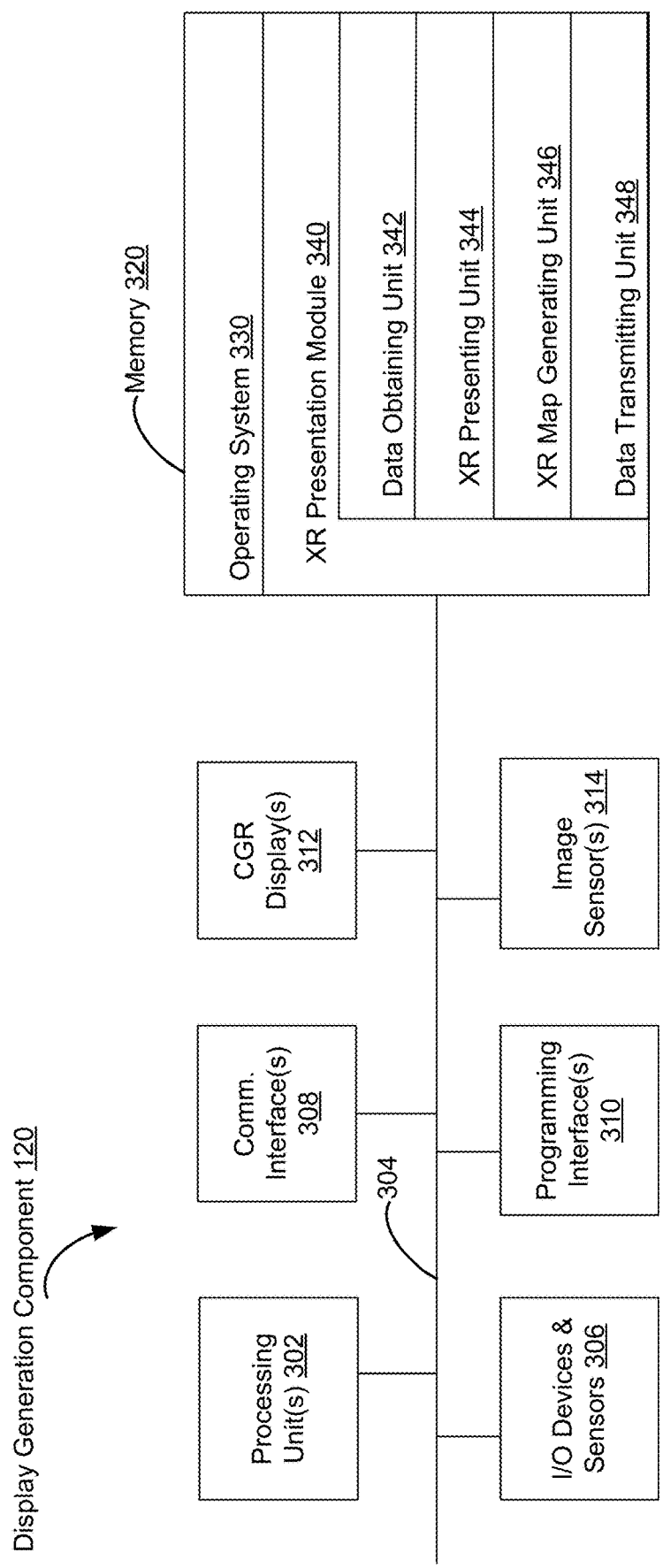
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, and/or blood glucose sensor), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the HMD 120 includes a single XR display. In another example, the HMD 120 includes an XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the HMD 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and an XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, an XR presenting unit 344, an XR map generating unit 346, and a data transmitting unit 348.

In some embodiments, the data obtaining unit 342 is configured to obtain data (e.g., presentation data, interaction data, sensor data, and/or location data) from at least the controller 110 of FIG. 1. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate an XR map (e.g., a 3D map of the mixed reality scene or a map of the physical environment into which computer generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, and/or location data) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
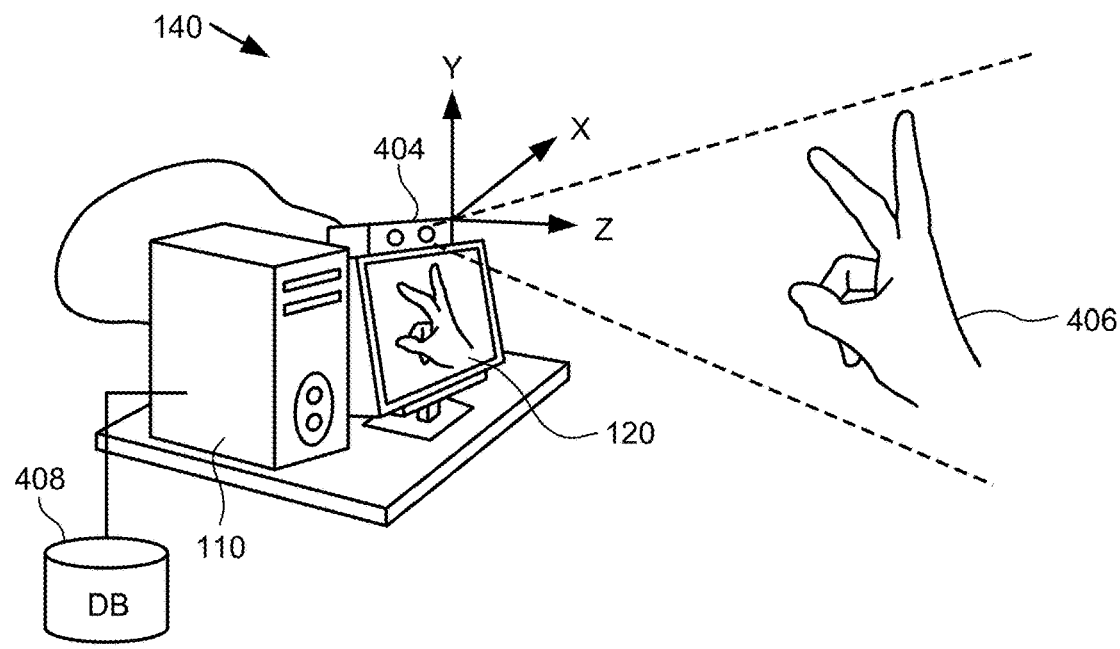
FIG. 4 is a block diagram illustrating a hand tracking unit of a computer system that is configured to capture gesture inputs of the user in accordance with some embodiments.
Figure 4:
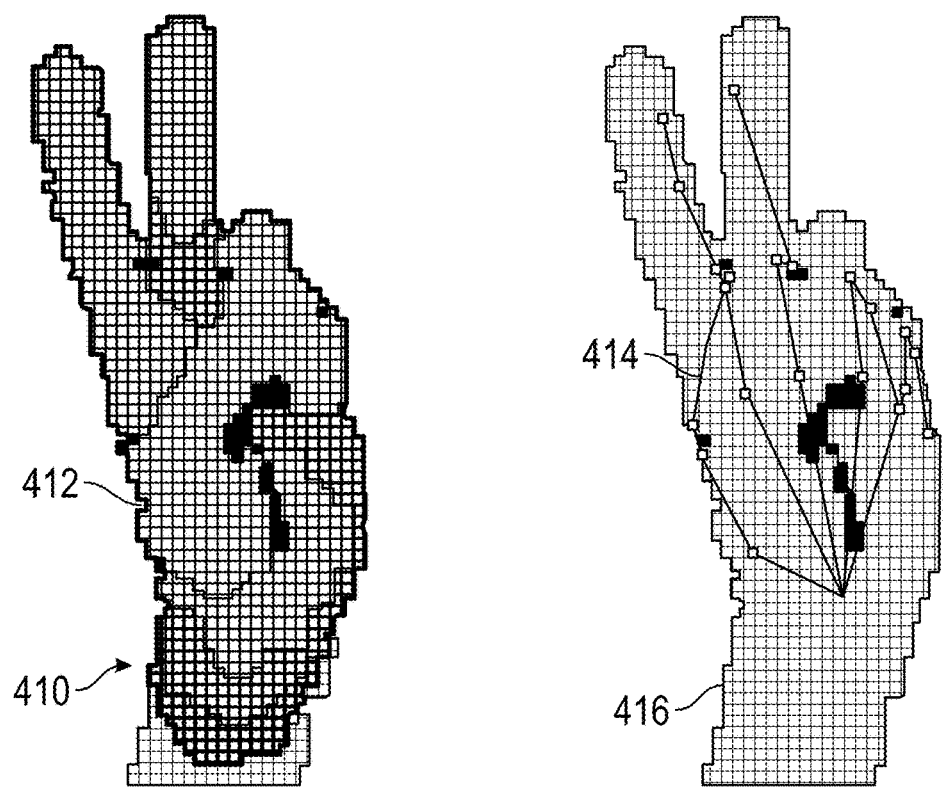

FIG. 4 is a schematic, pictorial illustration of an example embodiment of the hand tracking device 140. In some embodiments, hand tracking device 140 (FIG. 1) is controlled by hand tracking unit 245 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environment of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 outputs a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 408 and changing his hand posture.

In some embodiments, the image sensors 404 project a pattern of spots onto a scene containing the hand 406 and captures an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the hand tracking device 440 may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 440, some or all of the processing functions of the controller may be performed by a suitable microprocessor and software or by dedicated circuitry within the housing of the hand tracking device 402 or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the skeleton 414 is superimposed on a hand background 416 that has been segmented from the original depth map. In some embodiments, key feature points of the hand (e.g., points corresponding to knuckles, finger tips, center of the palm, or end of the hand connecting to wrist) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
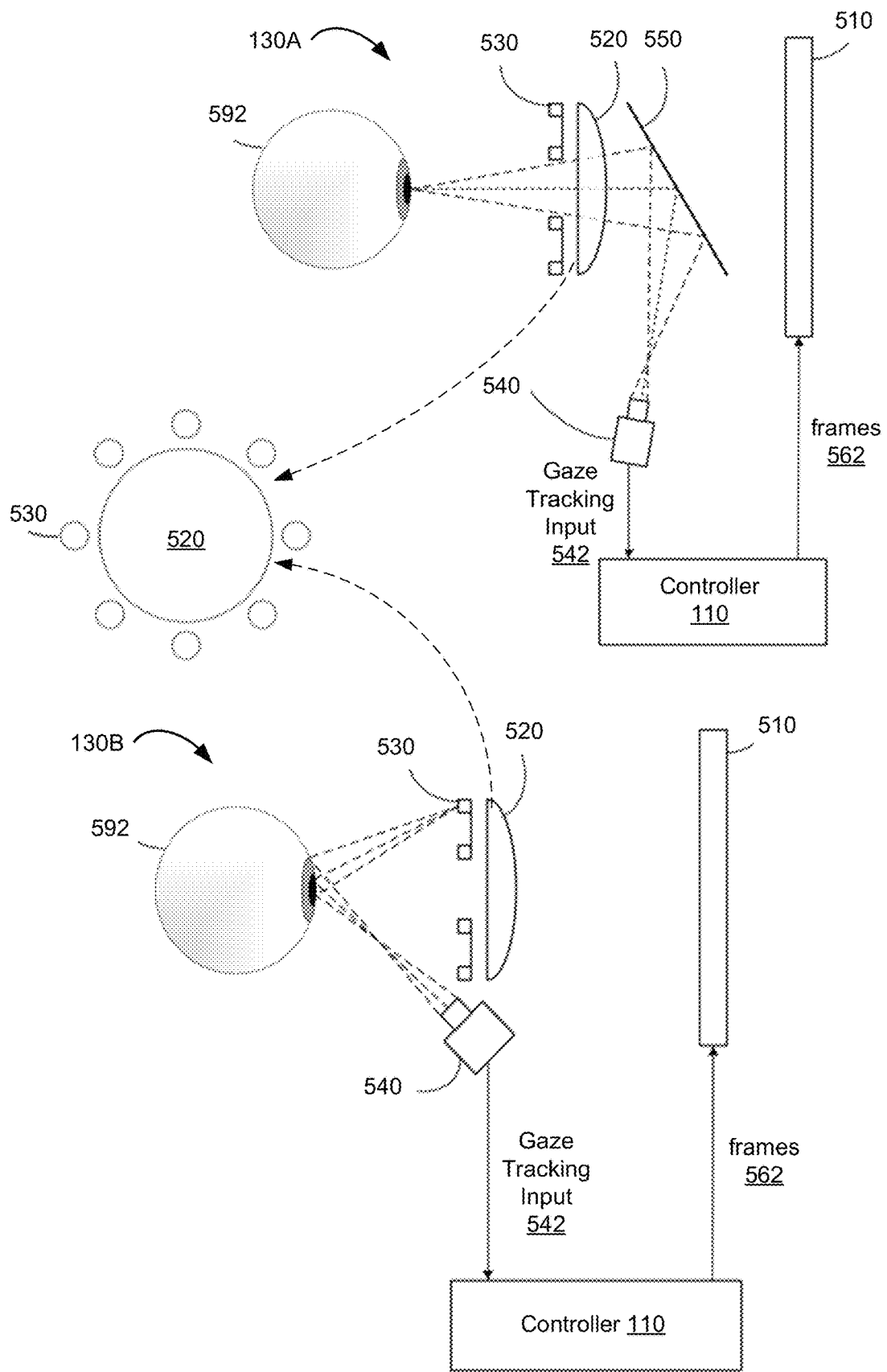
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or an XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, a gaze tracking device 130 includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The gaze tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, and/or a projector) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provide the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environment of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The Light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g. 850 nm) and a camera 540 that operates at a different wavelength (e.g. 940 nm) may be used on each side of the user's face.

Embodiments of the gaze tracking system as illustrated in FIG. 5 may, for example, be used in extended-reality (e.g., including virtual reality, and/or mixed reality) applications to provide extended-reality (e.g., including virtual reality, augmented reality, and/or augmented virtuality) experiences to the user.

Figure 6:
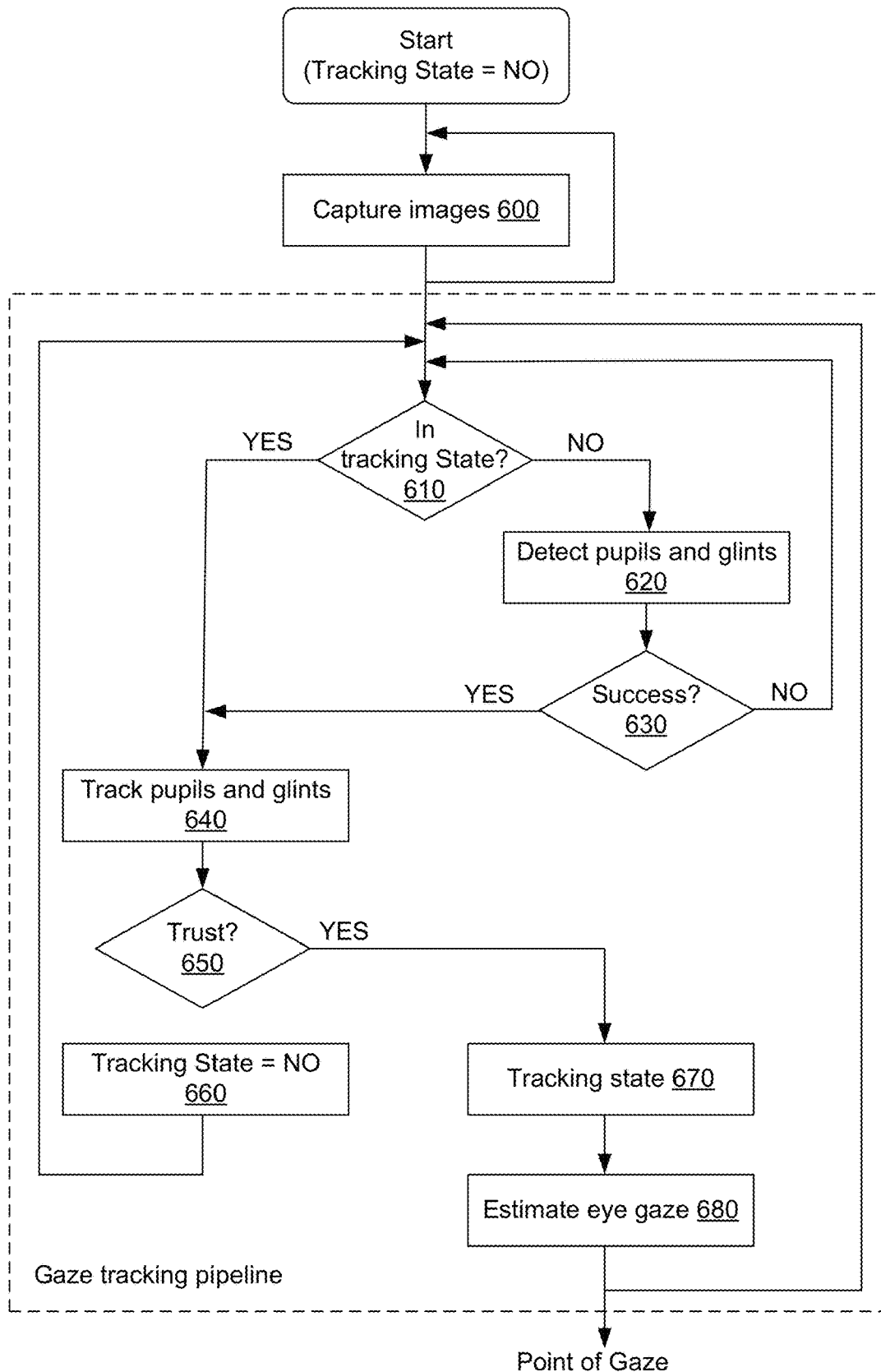
FIG. 6 is a flowchart illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracing system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 410, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serves as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

FIGS. 7A-7J illustrate three-dimensional environments displayed via a display generation component (e.g., a display generation component 7100, display generation component 7102, or a display generation component 120) and interactions that occur in the three-dimensional environments caused by user inputs directed to the three-dimensional environments and/or inputs received from other computer systems and/or sensors. In some embodiments, an input is directed to a virtual object within a three-dimensional environment by a user's gaze detected in the region occupied by the virtual object, or by a hand gesture performed at a location in the physical environment that corresponds to the region of the virtual object. In some embodiments, an input is directed to a virtual object within a three-dimensional environment by a hand gesture that is performed (e.g., optionally, at a location in the physical environment that is independent of the region of the virtual object in the three-dimensional environment) while the virtual object has input focus (e.g., while the virtual object has been selected by a concurrently and/or previously detected gaze input, selected by a concurrently or previously detected pointer input, and/or selected by a concurrently and/or previously detected gesture input). In some embodiments, an input is directed to a virtual object within a three-dimensional environment by an input device that has positioned a focus selector object (e.g., a pointer object or selector object) at the position of the virtual object. In some embodiments, an input is directed to a virtual object within a three-dimensional environment via other means (e.g., voice or control button). In some embodiments, an input is directed to a representation of a physical object or a virtual object that corresponds to a physical object by the user's hand movement (e.g., whole hand movement, whole hand movement in a respective posture, movement of one portion of hand relative to another portion of the user's hand, and/or relative movement between two hands) and/or manipulation with respect to the physical object (e.g., touching, swiping, tapping, opening, moving toward, and/or moving relative to). In some embodiments, the computer system displays some changes in the three-dimensional environment (e.g., displaying additional virtual content, ceasing to display existing virtual content, or transitioning between different levels of immersion with which visual content is being displayed) in accordance with inputs from sensors (e.g., image sensors, temperature sensors, biometric sensors, motion sensors, and/or proximity sensors) and contextual conditions (e.g., location, time, and/or presence of others in the environment). In some embodiments, the computer system displays some changes in the three-dimensional environment (e.g., displaying additional virtual content, ceasing to display existing virtual content, and/or transitioning between different levels of immersion with which visual content is being displayed) in accordance with inputs from other computers used by other users that are sharing the computer-generated environment with the user of the computer system (e.g., in a shared computer-generated experience, in a shared virtual environment, and/or in a shared virtual or augmented reality environment of a communication session). In some embodiments, the computer system displays some changes in the three-dimensional environment (e.g., displaying movement, deformation, and/or changes in visual characteristics of a user interface, a virtual surface, a user interface object, and/or virtual scenery) in accordance with inputs from sensors that detects movement of other persons and objects and movement of the user that may not quality as a recognized gesture input for triggering an associated operation of the computer system.

In some embodiments, a three-dimensional environment that is displayed via a display generation component described herein is a virtual three-dimensional environment that includes virtual objects and content at different virtual positions in the three-dimensional environment without a representation of the physical environment. In some embodiments, the three-dimensional environment is a mixed reality environment that displays virtual objects at different virtual positions in the three-dimensional environment that are constrained by one or more physical aspects of the physical environment (e.g., positions and orientations of walls, floors, surfaces, direction of gravity, time of day and/or spatial relationships between physical objects). In some embodiments, the three-dimensional environment is an augmented reality environment that includes a representation of the physical environment. In some embodiments, the representation of the physical environment includes respective representations of physical objects and surfaces at different positions in the three-dimensional environment, such that the spatial relationships between the different physical objects and surfaces in the physical environment are reflected by the spatial relationships between the representations of the physical objects and surfaces in the three-dimensional environment. In some embodiments, when virtual objects are placed relative to the positions of the representations of physical objects and surfaces in the three-dimensional environment, they appear to have corresponding spatial relationships with the physical objects and surfaces in the physical environment. In some embodiments, the computer system transitions between displaying the different types of environment (e.g., transitions between presenting a computer-generated environment or experience with different levels of immersion and/or adjusting the relative prominence of audio/visual sensory inputs from the virtual content and from the representation of the physical environment) based on user inputs and/or contextual conditions.

In some embodiments, the display generation component includes a pass-through portion in which the representation of the physical environment is displayed. In some embodiments, the pass-through portion of the display generation component is a transparent or semi-transparent (e.g., see-through) portion of the display generation component revealing at least a portion of physical environment surrounding and within the field of view of user. For example, the pass-through portion is a portion of a head-mounted display or heads-up display that is made semi-transparent (e.g., less than 50%, 40%, 30%, 20%, 15%, 10%, or 5% of opacity) or transparent, such that the user can see through it to view the real world surrounding the user without removing the head-mounted display or moving away from the heads-up display. In some embodiments, the pass-through portion gradually transitions from semi-transparent or transparent to fully opaque when displaying a virtual or mixed reality environment. In some embodiments, the pass-through portion of the display generation component displays a live feed of images or video of at least a portion of physical environment captured by one or more cameras (e.g., rear facing camera(s) of a mobile device or associated with a head-mounted display, or other cameras that feed image data to the computer system). In some embodiments, the one or more cameras point at a portion of the physical environment that is directly in front of the user's eyes (e.g., behind the display generation component relative to the user of the display generation component). In some embodiments, the one or more cameras point at a portion of the physical environment that is not directly in front of the user's eyes (e.g., in a different physical environment, or to the side or behind the user).

In some embodiments, when displaying virtual objects at positions that correspond to locations of one or more physical objects in the physical environment (e.g., at positions in a virtual reality environment, a mixed reality environment, or an augmented reality environment), at least some of the virtual objects are displayed in placed of (e.g., replacing display of) a portion of the live view (e.g., a portion of the physical environment captured in the live view) of the cameras. In some embodiments, at least some of the virtual objects and content are projected onto physical surfaces or empty space in the physical environment and are visible through the pass-through portion of the display generation component (e.g., viewable as part of the camera view of the physical environment, or through the transparent or semi-transparent portion of the display generation component). In some embodiments, at least some of the virtual objects and virtual content are displayed to overlay a portion of the display and blocks the view of at least a portion of the physical environment visible through the transparent or semi-transparent portion of the display generation component.

In some embodiments, the display generation component displays different views of the three-dimensional environment in accordance with user inputs or movements that change the virtual position of the viewpoint of the currently displayed view of the three-dimensional environment relative to the three-dimensional environment. In some embodiments, when the three-dimensional environment is a virtual environment, the viewpoint moves in accordance with navigation or locomotion requests (e.g., in-air hand gestures, or gestures performed by movement of one portion of the hand relative to another portion of the hand) without requiring movement of the user's head, torso, and/or the display generation component in the physical environment. In some embodiments, movement of the user's head and/or torso, and/or the movement of the display generation component or other location sensing elements of the computer system (e.g., due to the user holding the display generation component or wearing the HMD), relative to the physical environment cause corresponding movement of the viewpoint (e.g., with corresponding movement direction, movement distance, movement speed, and/or change in orientation) relative to the three-dimensional environment, resulting in corresponding change in the currently displayed view of the three-dimensional environment. In some embodiments, when a virtual object has a preset spatial relationship relative to the viewpoint (e.g., is anchored or fixed to the viewpoint), movement of the viewpoint relative to the three-dimensional environment would cause movement of the virtual object relative to the three-dimensional environment while the position of the virtual object in the field of view is maintained (e.g., the virtual object is said to be head locked). In some embodiments, a virtual object is body-locked to the user, and moves relative to the three-dimensional environment when the user moves as a whole in the physical environment (e.g., carrying or wearing the display generation component and/or other location sensing component of the computer system), but will not move in the three-dimensional environment in response to the user's head movement alone (e.g., the display generation component and/or other location sensing component of the computer system rotating around a fixed location of the user in the physical environment). In some embodiments, a virtual object is, optionally, locked to another portion of the user, such as a user's hand or a user's wrist, and moves in the three-dimensional environment in accordance with movement of the portion of the user in the physical environment, to maintain a preset spatial relationship between the position of the virtual object and the virtual position of the portion of the user in the three-dimensional environment. In some embodiments, a virtual object is locked to a preset portion of a field of view provided by the display generation component, and moves in the three-dimensional environment in accordance with the movement of the field of view, irrespective of movement of the user that does not cause a change of the field of view.

Figure 7B:
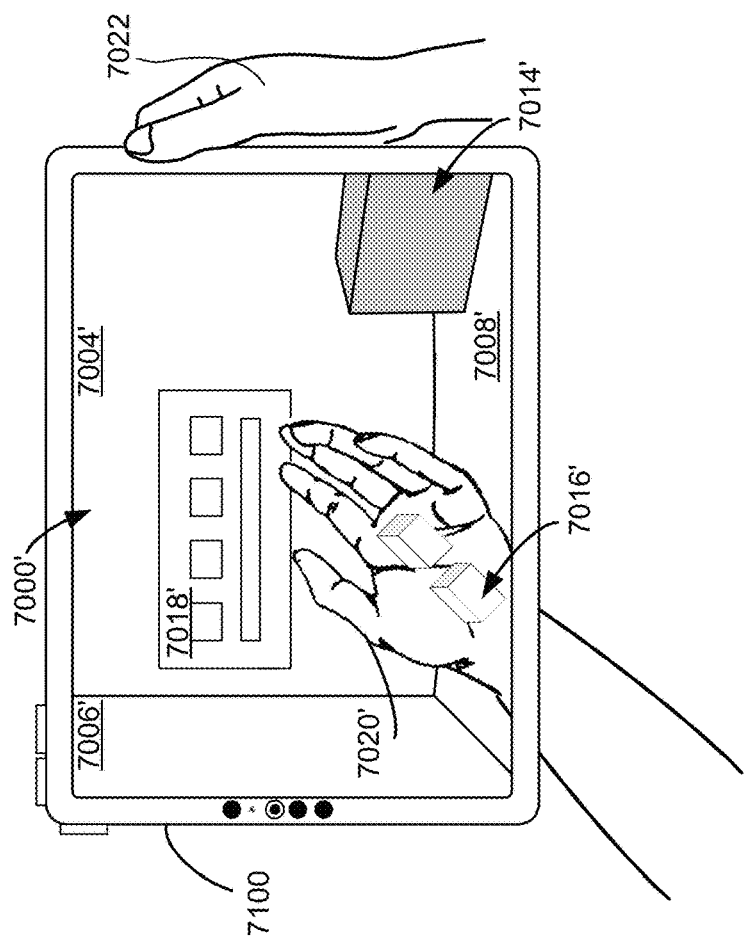
FIGS. 7A-7D are block diagrams that illustrate displaying user interface objects at first respective positions in a three-dimensional environment that corresponds to a location at or near a user's hand in a physical environment, in accordance with some embodiments.

In some embodiments, as shown in FIGS. 7E-7J, the views of a three-dimensional environment sometimes do not include representation(s) of a user's hand(s), arm(s), and/or wrist(s). In some embodiments, as shown in FIGS. 7B-7D, the representation(s) of a user's hand(s), arm(s), and/or wrist(s) are included in the views of a three-dimensional environment. In some embodiments, the representation(s) of a user's hand(s), arm(s), and/or wrist(s) are included in the views of a three-dimensional environment as part of the representation of the physical environment provided via the display generation component. In some embodiments, the representations are not part of the representation of the physical environment and are separately captured (e.g., by one or more camera's pointing toward the user's hand(s), arm(s), and wrist(s)) and displayed in the three-dimensional environment independent of the currently displayed view of the three-dimensional environment. In some embodiments, the representation(s) include camera images as captured by one or more cameras of the computer system(s), or stylized versions of the arm(s), wrist(s) and/or hand(s) based on information captured by various sensors). In some embodiments, the representation(s) replace display of, are overlaid on, or block the view of, a portion of the representation of the physical environment. In some embodiments, when the display generation component does not provide a view of a physical environment, and provides a completely virtual environment (e.g., no camera view and no transparent pass-through portion), real-time visual representations (e.g., stylize representations or segmented camera images) of one or both arms, wrists, and/or hands of the user are, optionally, still displayed in the virtual environment. In some embodiments, if a representation of the user's hand is not provided in the view of the three-dimensional environment, the position that corresponds to the user's hand is optionally indicated in the three-dimensional environment, e.g., by the changing appearance of the virtual content (e.g., through a change in translucency and/or simulated reflective index) at positions in the three-dimensional environment that correspond to the location of the user's hand in the physical environment. In some embodiments, the representation of the user's hand or wrist is outside of the currently displayed view of the three-dimensional environment while the virtual position in the three-dimensional environment that corresponds to the location of the user's hand or wrist is outside of the current field of view provided via the display generation component; and the representation of the user's hand or wrist is made visible in the view of the three-dimensional environment in response to the virtual position that corresponds to the location of the user's hand or wrist being moved within the current field of view due to movement of the display generation component, the user's hand or wrist, the user's head, and/or the user as a whole.

FIGS. 7A-7J are block diagrams illustrating user interactions with user interface objects displayed in a three-dimensional environment, in accordance with some embodiments. In some embodiments, one or more of the user interface objects are provided as part of a control center user interface or a home experience in the three-dimensional environment. Behaviors described with reference to FIGS. 7A-7J (and FIGS. 8-10) with respect to user interface objects in some examples are applicable to user interface objects in other examples, in accordance with various embodiments, unless stated otherwise in the descriptions.

FIGS. 7A-7J show an exemplary computer system (e.g., device 101, or another computer system) that is in communication with a first display generation component (e.g., display generation component 7100, or another display generation component). In some embodiments, the first display generation component is a heads-up display. In some embodiments, the first display generation component is a head-mounted display (HMD). In some embodiments, the first display generation component is a standalone display, a touchscreen, a projector, or another type of display. In some embodiments, the computer system is in communication with one or more input devices, including cameras or other sensors and input devices that detect movement of the user's hand(s), movement of the user's body as whole, and/or movement of the user's head in the physical environment. In some embodiments, the one or more input devices detect the movement and the current postures, orientations, and positions of the user's hand(s), face, and body as a whole, of the user. In some embodiments, the one or more input devices include an eye tracking component that detects location and movement of the user's gaze. In some embodiments, the first display generation component, and optionally, the one or more input devices and the computer system, are parts of a head-mounted device (e.g., an HMD, or a pair of AR/VR goggles/glasses) that moves and rotates with the user's head in the physical environment, and changes the viewpoint of the user into the three-dimensional environment provided via the first display generation component. In some embodiments, the first display generation component is a heads-up display that does not move or rotate with the user's head or the user's body as a whole, but, optionally, changes the viewpoint of the user into the three-dimensional environment in accordance with the movement of the user's head or body relative to the first display generation component. In some embodiments, the first display generation component is optionally moved and rotated by the user's hand relative to the physical environment or relative to the user's head, and changes the viewpoint of the user into the three-dimensional environment in accordance with the movement of the first display generation component relative to the user's head or face or relative to the physical environment.

FIGS. 7A-7D are block diagrams that illustrate displaying user interface objects (e.g., a first user interface object 7016' and a second user interface object 7018') at first respective positions in a three-dimensional environment that corresponds to a location at or near a user's hand (e.g. hand 7020, or another hand) in a physical environment.

Figure 7A:
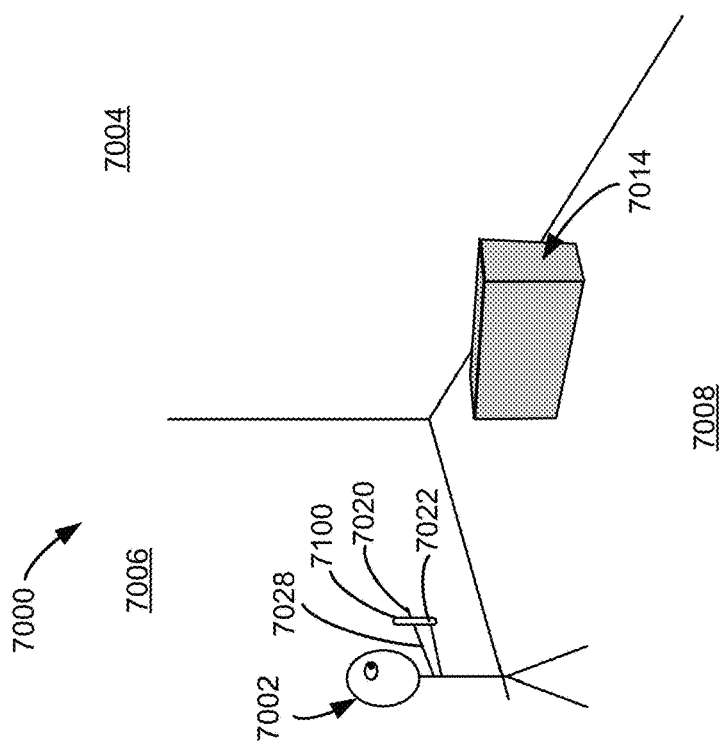
Figure 7D:
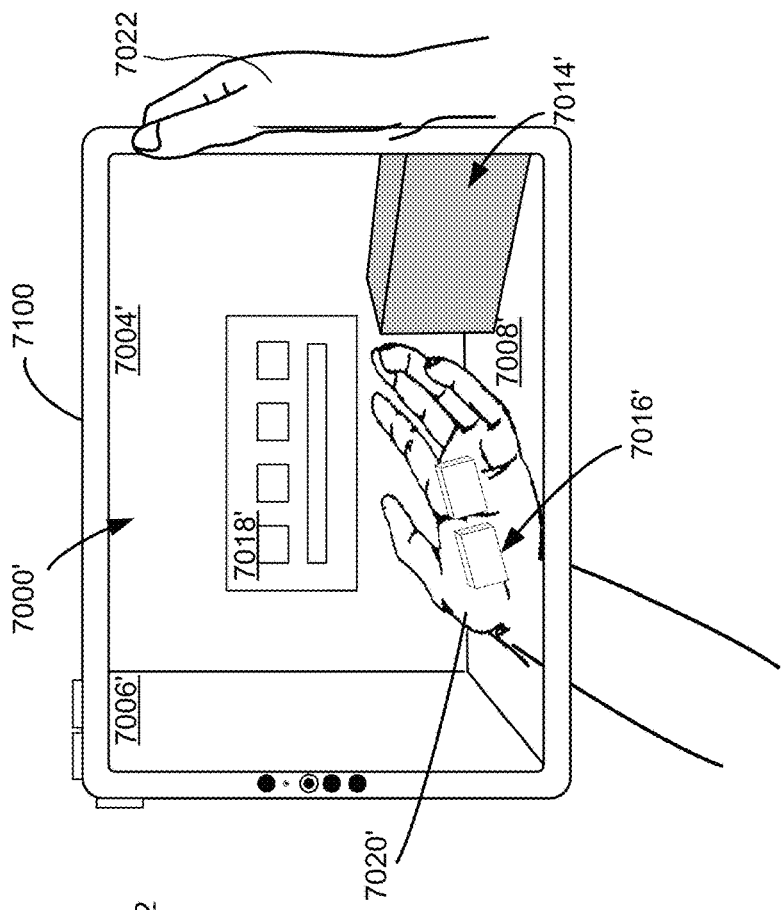
Figure 7C:
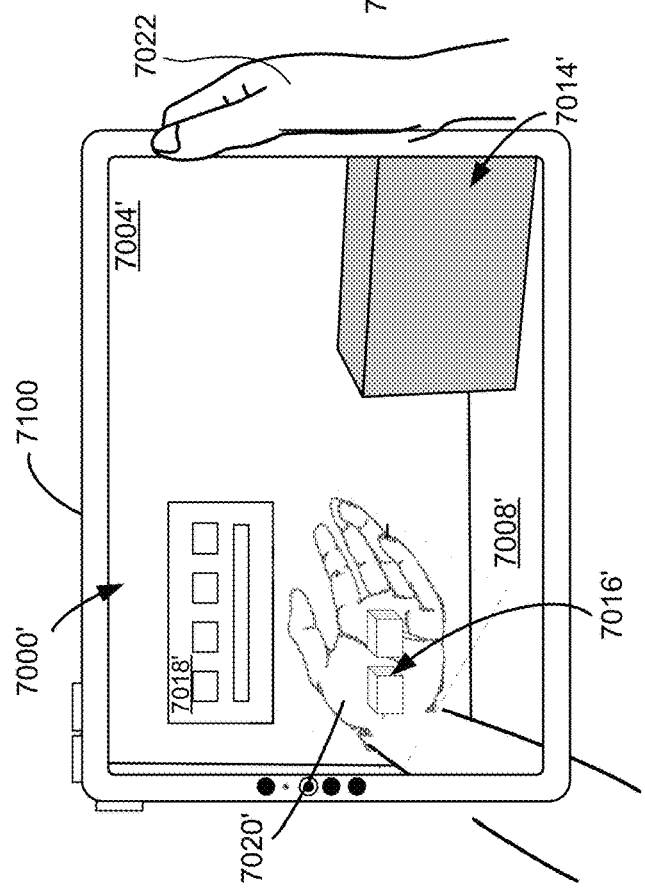

For example, FIG. 7A illustrates a physical environment 7000 that includes a user 7002 interacting with display generation component 7100. The user 7002 has two hands, hand 7020 and hand 7022. Also shown is the user's left arm 7028, which is connected to the user's left hand 7020. The physical environment 7000 includes a physical object 7014, and physical walls 7004 and 7006. The physical environment 7000 further includes a physical floor 7008. As shown in FIG. 7A, the computer system (e.g., display generation component 7100) displays a view of a three-dimensional environment (e.g., environment 7000', a virtual three-dimensional environment, an augmented reality environment, a pass-through view of a physical environment, or a camera view of a physical environment). In some embodiments, the three-dimensional environment is a virtual three-dimensional environment without a representation of a physical environment 7000. In some embodiments, the three-dimensional environment is a mixed reality environment that is a virtual environment that is augmented by sensor data corresponding to the physical environment. In some embodiments, the three-dimensional environment is an augmented reality environment that includes one or more virtual objects and a representation of at least a portion of a physical environment (e.g., representations 7004', 7006' of walls, representation 7008' of a floor, and/or representation 7014' of a physical object) surrounding the display generation component 7100. In some embodiments, the representation of the physical environment includes a camera view of the physical environment. In some embodiments, the representation of the physical environment includes a view of the physical environment through a transparent or semitransparent portion of the first display generation component.

FIGS. 7B-7D illustrate a three-dimensional environment 7000' that is displayed using the display generation component 7100. FIG. 7B illustrates a first view from the viewpoint of the user, which is based in part on the location and/or position of the user in the physical environment 7000. As illustrated in FIG. 7B, in accordance with the user moving the user's hand 7020 into the field of view of the display generation component 7100, a representation of the user's hand 7020' is displayed in the three-dimensional environment 7000'. In some embodiments, the representation of the user's hand 7020' is a pass-through view of the user's hand (e.g., the display generation component displays a camera view of the user's physical hand 7020). In some embodiments, the representation of the user's hand 7020' is a generated (e.g., a stylized, animated and/or otherwise virtualized) representation of the user's hand. The representation of the user's hand 7020' is updated as the user moves the user's physical hand 7020 within the physical environment relative to the first viewpoint of the user (e.g., and/or relative to the field of view of the display generation component 7100). For example, the representation of the user's hand 7020' moves in accordance with movement of the user 7002 and/or the display generation component 7100 in the physical environment 7000.

In some embodiments, the positions at which user interface objects are displayed in the three-dimensional environment 7000', as shown in FIG. 7B, are anchored to (e.g., positioned relative to) a portion of the user's body (e.g., the user's head, eyes, face, torso, hand and/or wrist). In some embodiments, one or more user interface objects (e.g., the first user interface object 7016' and the second user interface object 7018') are anchored to a hand that is determined as the non-dominant hand of the user. For example, the computer system determines which hand is dominant and non-dominant based on the user's past interactions (e.g., and/or based on a user selection that indicates the user's non-dominant hand). In the examples shown in FIGS. 7B-7D, the user's left hand (e.g., hand 7020) is determined as the non-dominant hand of the user (e.g., and the user interface objects 7016' and 7018' are both positioned based on a current position of the user's hand 7020).

For example, the first user interface object 7016' is anchored to the palm of the representation of the user's hand 7020'. In some embodiments, the second user interface object 7018' is also positioned (e.g., anchored) relative to the user's hand (e.g., hovers above and/or behind the user's hand (e.g., at a predefined distance away from the user)). For example, the second user interface object 7018' is displayed to appear to be out of arm's reach of the user (e.g., second user interface object 7018' is positioned in the three-dimensional environment at least a predefined distance away from the user). It will be understood that other user interface objects are enabled to be anchored to portions of the user's body, and/or to be anchored to the three-dimensional environment (e.g., such that the user interface objects do not move in position within the three-dimensional environment as the user moves in the physical environment).

In some embodiments, the first user interface object 7016' and the second user interface object 7018' are displayed in the three-dimensional environment 7000' in accordance with one or more gestures of the user's hand. For example, in response to the user opening the palm of the user's hand (e.g., within a current viewpoint of the user), the first user interface object 7016' and/or the second user interface object 7018' are displayed. In some embodiments, the first and second user interface objects are displayed in accordance with detection of a user's gaze (e.g., in conjunction with the gesture) and/or detection of the user satisfying another attention-based criteria. In some embodiments, in response to detecting other (e.g., additional) gestures of the user's hand, the first and/or second user interface objects 7016' and

7018' are no longer displayed (e.g., and are replaced with display of other controls, such as controls on the back of the user's hand in response to the user closing the user's palm).

In some embodiments, in accordance with the user's hand moving out of the viewpoint (e.g., out of the field of view of the display generation component 7100), the second user interface object 7018' remains displayed (e.g., and the first user interface object 7016', which is positioned in the palm of the user's hand, is no longer displayed).

In some embodiments, the first user interface object 7016', while anchored to the palm of the representation of the user's hand, is no longer displayed in accordance with the user turning (e.g., rotating, along an axis corresponding to a wrist of the user, and/or closing) the representation of the user's hand 7020' such that the user's palm is not displayed (e.g., the representation of the user's hand 7020' is turned (e.g., flipped) over such that the user's palm faces away from the user (e.g., or the user closes the user's fist)). As such, the first user interface object 7016' disappears if the user turns over the user's palm or closes the user's fist.

In some embodiments, in response to the user moving the representation of the user's hand out of the field of view, if the user's palm is facing the user while the representation of the user's hand is moved out of the field of view, the first user interface object 7016' (e.g., and/or second user interface object 7018') continues to be displayed (e.g., while the representation of the user's hand is out of the current field of view). In some embodiments, if the user's palm is facing away from the user (e.g., the user's hand is turned over) and/or the user's hand is closed (e.g., in a first) while the representation of the user's hand is moved out of the field of view, the first user interface object 7016' (e.g., and/or second user interface object 7018') ceases to be displayed while the representation of the user's hand is not in the field of view.

In some embodiments, the first user interface object 7016' is a first type of user interface object that includes a variety of system-level controls (e.g., home menu controls). In some embodiments, the second user interface object 7018' is a second type of user interface object that includes a variety of session-level (e.g., application) controls. It will be understood that, in some embodiments, the controls included in the first and/or second user interface objects 7016' and 7018' are selected by the user (e.g., the user is enabled to modify where controls are displayed within the three-dimensional environment).

In some embodiments, the second user interface object 7018' is initially displayed in the representation of the user's hand (e.g., in the palm of the representation of the user's hand), before moving (e.g., with an animation to appear as if it is popping out of the user's hand to its anchor position). For example, if the user opens the user's fist (e.g., the representation of the user's hand opens), the user interface object 7018' is displayed as moving from a position over the palm of the representation of the user's hand to its anchor position.

In some embodiments, the first user interface object 7016' includes a first set of controls (e.g., a home button and/or other home menu controls) that is anchored to a first side of the representation of the user's hand (e.g., the user's palm). In some embodiments, a second set of controls (e.g., a control center including a plurality of selectable user interface elements for controlling various device functions) is anchored to a second side of the representation of the user's hand (e.g., the back of the user's hand). This enables the user to rotate the user's hand to access different types of controls (e.g., the user views the user's palm to access a home button and the user views the back of the user's hand to access a control center).

In some embodiments, the user is enabled to select a control (e.g., via a user input) from the first set of controls (e.g., in user interface object 7016') and/or a control from a set of controls displayed in the user interface object 7018'. For example, the user is enabled to gaze at the respective control, and in response to detecting the user's gaze directed to the respective control, the respective control is visually emphasized (e.g., expands and/or shows additional content and/or buttons). In some embodiments, the user is enabled to select the control by gazing at the control and providing an input (e.g., a gesture with the user's hand). For example, the user is enabled to perform a gaze and pinch gesture directed to the control, and/or the user is enabled to perform a tap input directed to the control. In some embodiments, the user input is directed to the control directly (e.g., the user performs the input at a position that corresponds to the control) or the input is directed to the control indirectly (e.g., the user performs the input while gazing at the control, wherein a position of the user's hand while performing the input is not at the position that corresponds to the control). For example, the user is enabled to direct the user's input to the control by initiating the gesture at, or near, the control (e.g., within 0.5 cm, 1 cm, 5 cm, or a distance between 0-5 cm, as measured from an outer edge of the control or a center portion of the control). In some embodiments, the user is further enabled to direct the user's input to the control by paying attention to the control (e.g., gazing at the control) and, while paying attention to the control, the user initiates the gesture (e.g., at any position that is detectable by the computer system). For example, if the user is paying attention to the control, the gesture need not be initiated at a position that is at, or near, the control.

In some embodiments, the second user interface object 7018' is displayed at a position in the three-dimensional environment that appears in front of the user within a predefined distance (e.g., within 20 cm or 50 cm of the user, or within arm's reach), such that the user is easily enabled to interact with the second user interface object 7018' with the user's other hand (e.g., other than hand 7020). For example, as explained below, the position of the second user interface object is further determined in accordance with the current position of the user's hand 7020, such that the user can easily position the second user interface object 7018' close enough to the user (by moving the user's hand 7020 towards the user), and the user is enabled to use the user's other hand to interact with selectable user interface elements displayed in the second user interface object 7018'.

In some embodiments, the positions of the first user interface object 7016' and the second user interface object 7018' are updated in accordance with translational movement of the user's hand (e.g., as the user's hand 7020 moves along axes that extend in the x, y and z directions). For example, movements of the user's hand 7020 in the horizontal direction (left/right), vertical direction (up/down) or in depth (forward/backward) in the physical environment (which causes the representation of the user's hand 7020' to move in the displayed three-dimensional environment relative to the viewpoint of the user), cause the position of the first user interface object 7016' and the second user interface object 7018' to also be updated (e.g., to follow the user's hand movements). For example, as illustrated in FIGS. 7C-7D, as the user moves the user's hand 7020 closer (e.g., translational movement along the z-direction), both the first user interface object 7016' and the second user interface object 7018' are also displayed at new positions (e.g., to maintain their relative position to the representation of the user's hand 7020').

For example, in FIG. 7D, the representation of the user's hand 7020' is closer to the user, relative to FIG. 7C, and is thus displayed with a larger size in FIG. 7D than the representation of the user's hand 7020' shown in FIG. 7C. In some embodiments, the respective sizes of the first user interface object 7016' and the second user interface object 7018' are also updated in accordance with the movement of the user's hand forward or backward relative to the user's viewpoint (e.g., the first user interface object 7016' and the second user interface object 7018' are also displayed with larger respective sizes in FIG. 7D than in FIG. 7C, in accordance with the user's hand 7020 moving closer to the user's viewpoint).

In some embodiments, the size of the user interface objects are updated (e.g., proportionally) in accordance with the current size of the user's hand. In some embodiments, the sizes of the user interface objects are selected based on the size of the user's hand (e.g., the size of the first user interface object 7016' is determined based on the size of the user's hand 7020 such that the user interface object appears to fit within the user's hand). For example, the size of the first user interface object 7016' (e.g., and/or second user interface object 7018') are updated as the user opens and/or closes the user's hand (e.g., into a fist). For example, the user interface object 7016' is updated to appear smaller as the user closes the user's hand. It will be understood that the user's hand 7020 moving in other translational movements (e.g., other lateral movements) cause the user interface object 7016' and 7018' to be updated accordingly.

In some embodiments, only one of the user interface objects changes orientation in accordance with a change in orientation of the user's hand. For example, the first user interface object 7016' is oriented relative to the user's hand 7020. For example, as illustrated in FIGS. 7B-7C, as the user's hand rotates (e.g., to a second orientation in FIG. 7C where the user's palm is more parallel to the representation of the floor 7008'). As illustrated in FIG. 7C, the orientation of the first user interface object 7016' is updated with the change in orientation of the user's hand (while the orientation of the second user interface object 7018' is not updated with the change in orientation of the user's hand). For example, the second user interface object 7018' is displayed with an orientation that is independent of the user's hand (e.g., the second user interface object 7018' continues to be displayed with a bottom edge parallel to the representation of the floor 7008').

Accordingly, while both user interface object 7016' and 7018' update in position based on translational movement of the user's hand, only one of the user interface objects (e.g., user interface object 7016', which is displayed within the palm of the user's hand) updates in accordance with a change in orientation (e.g., pose) of the user's hand 7020.

In some embodiments, the first user interface object 7016' (e.g., and/or the second user interface object 7018') is visually deemphasized (e.g., blurs, fades, and/or shrinks) while the user's hand rotates, tilts and/or closes (e.g., the user interface object 7016' is displayed in the palm of the user's hand and is visually deemphasized as the user closes the user's hand to cover the user's palm). In some embodiments, as shown in FIG. 7C, the representation of the user's hand, optionally, is also visually deemphasized while the user's hand rotates, tilts and/or closes.

In some embodiments, a second user interface object 7018' is displayed at a position in the three-dimensional environment that is away from the position that corresponds to the location at or near the user's hand 7020 in the physical environment 7000. For example, second user interface object 7018' corresponds to a location at or near a user's hand (e.g., hand 7020, or another hand).

In some embodiments, the second user interface object 7018' is oriented such that down is in accordance with gravity in the physical environment 7000 (e.g., text would appear right-side-up when the ground is at the bottom of the user's current view of the three-dimensional environment). For example, the second user interface object 7018' includes text such that the bottom of the text is directed to the floor 7008 (e.g., and the representation of the floor 7008'). Accordingly, even as the user changes an orientation of the user's head (e.g., turns sideways), the second user interface object remains oriented down relative to the floor.

In some embodiments, the second user interface object 7018' is oriented based on the user's current head position (e.g., not based on the floor). For example, as the user tilts the user's head (e.g., sideways), the second user interface object 7018' is displayed to follow the tilt of the user's head (e.g., to always appear right-side-up relative to the user's current head pose). As such, displayed text appears right-side-up to the user even as the user tilts their head (e.g., such that the user's current view of the three-dimensional environment does not have the ground parallel to the bottom of the user's current view).

In some embodiments, the computer system provides an option to anchor the user interface objects (e.g., the first user interface object 7016' and/or the second user interface object 7018') to the three-dimensional environment 7000' (e.g., instead of the user interface objects being anchored to the user's hand 7020). For example, a button is provided (e.g., in the user's palm and/or hand) that, when selected by the user, places a selected user interface object into the three-dimensional environment 7000' such that the user interface object is positioned relative to the three-dimensional environment (e.g., independent of movement of the user's hand). For example, the user interface object is anchored to an object in the three-dimensional environment and/or the user interface object is placed in the three-dimensional environment 7000' at a predefined position within a current viewpoint (e.g., the object is displayed in the upper left corner of the current viewpoint).

In some embodiments, in accordance with the user interface object being placed in the three-dimensional environment, a control is displayed in the representation of the user's hand 7020' to toggle between minimizing (e.g., ceasing display of) and displaying the user interface object in the three-dimensional environment. In some embodiments, in accordance with a determination that the user interface object is placed in the three-dimensional environment, in response to the user's hand moving out of the current view, the user interface object continues to be displayed (e.g., until the user toggles the user interface object to cease to be displayed). In some embodiments, in accordance with a determination that the user interface object is not placed in the three-dimensional environment 7000' (e.g., and remains anchored to the user's hand), in response to the user's hand moving out of the current view, the computer system ceases to display the user interface object (e.g., until the user's hand returns to be within the view).

Figure 7E:
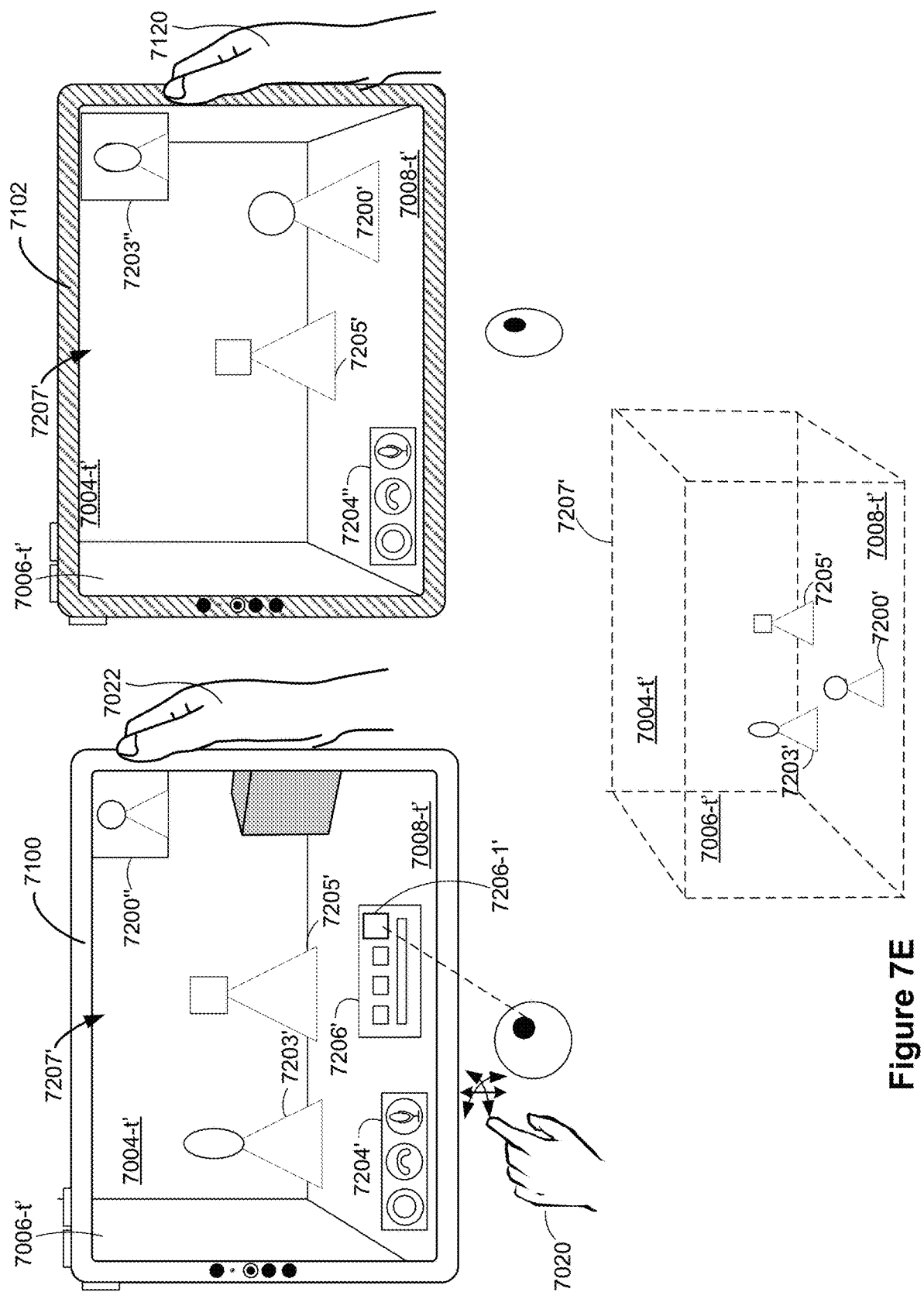
FIGS. 7E-7F are block diagrams illustrating controls displayed for a user while the user is participating in a shared communication session, in accordance with some embodiments, in accordance with some embodiments.
Figure 7F:
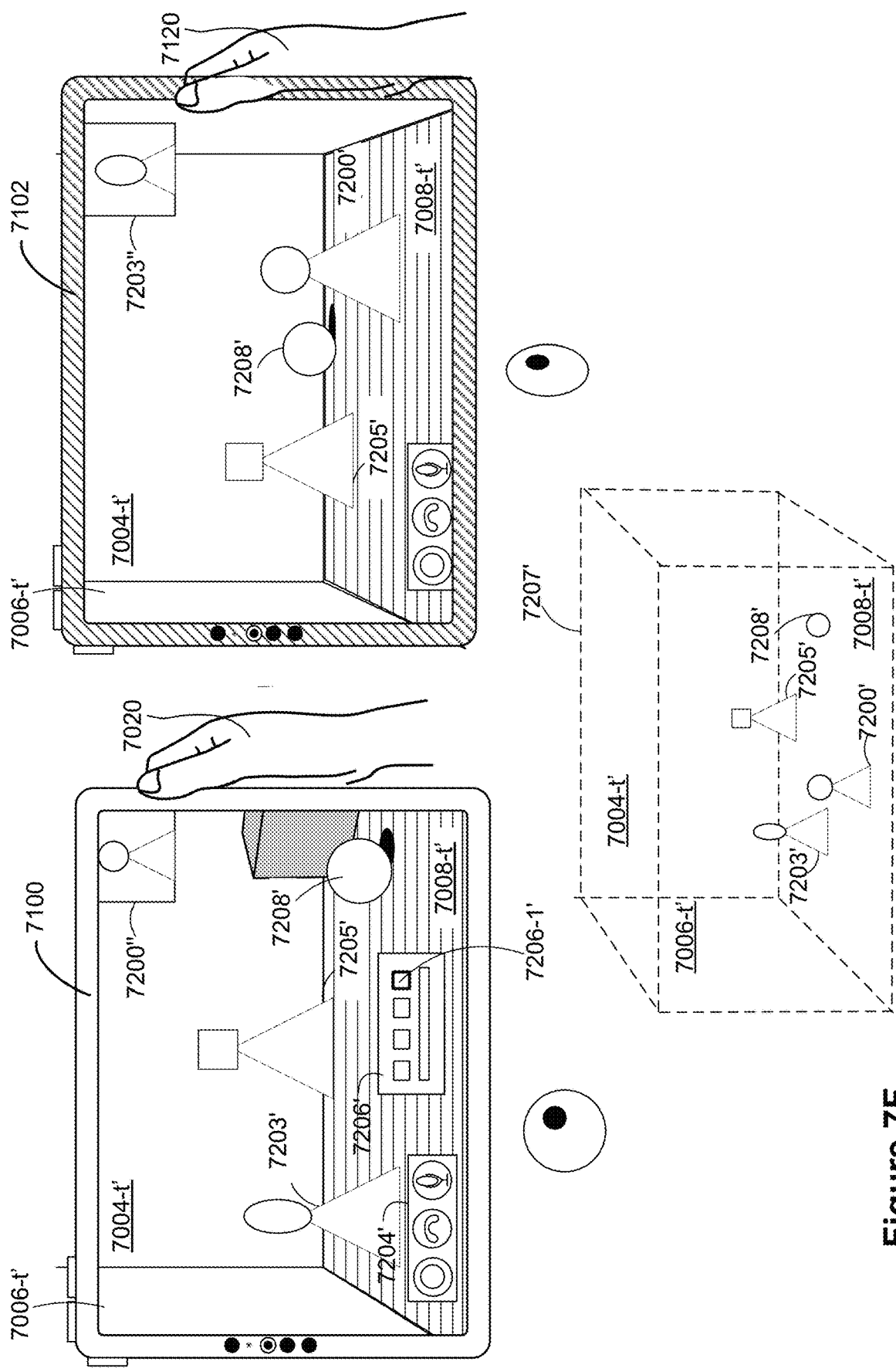

FIGS. 7E-7F are block diagrams illustrating controls displayed for a user while the user is participating in a shared communication session, in accordance with some embodiments. FIGS. 7E-7F illustrate a shared three-dimensional environment (e.g., environment 7207', an environment 7100' as described with respect to FIGS. 7A-7D, another VR, AR, or XR environment) that is accessed by (e.g., displayed for) a plurality of users, each user viewing the shared three-dimensional environment with respective display generation components. For example, a first user (e.g., user 7002, FIG. 7A) views the shared three-dimensional environment 7207' via a first display generation component (e.g., display generation component 7100, the first display generation component described with respect to FIGS. 7A-7D, or other display generation components) that is in communication with a first computer system (e.g., the computer system 101, the computer system described with respect to FIGS. 7A-7D), and a second user views the shared three-dimensional environment via a second display generation component (e.g., display generation component 7102) in communication with a second computer system (e.g., that is associated with the second user).

As shown in FIGS. 7E-7F, the currently displayed view of the three-dimensional environment 7207' for the first user on the first display generation component 7100 also includes one or more user interface objects (e.g., user interface object 7204', user interface object 7206', and/or other user interface objects or virtual objects) displayed at various positions in the three-dimensional environment (e.g., positions that correspond to respective locations of physical objects or surfaces, or positions that do not correspond to locations of physical objects and surfaces). In some embodiments, the behaviors of the user interface (e.g., the three-dimensional environment 7207' and the user interface objects) described with respect to FIGS. 7E-7F are also applicable to the user interface (e.g., the home user interface object and the plurality of user interface objects displayed at positions that are away from the first position that corresponds to the location of the user's hand), as described in FIGS. 7A-7D and 7G-7J.

In some embodiments, users that are active in (e.g., engaged with, viewing and/or participating in) the shared three-dimensional environment are represented within the shared three-dimensional environment 7207'. For example, in FIGS. 7E-7F, three users are active, each user having an associated representation of the user in the three-dimensional environment 7207': a first user representation 7200', a second user representation 7203' and a third user representation 7205'.

In some embodiments, as illustrated in FIG. 7E, the representations of the users are arranged within the shared three-dimensional environment 7207' relative to each other (e.g., such that a respective user views the positions of the other users relative to the viewpoint of the respective user), referred to herein as a copresence communication session (or a spatial communication session). For example, the first user (e.g., corresponding to first user representation 7200') views the shared three-dimensional environment 7207' via the first display generation component 7100. The first user's viewpoint includes the representation of the second user 7203' to the left of the representation of the third user 7205'. In some embodiments, the first display generation component 7100 also includes a displayed representation of the first user 7200" (e.g., where the representation of the user's self is displayed in a dedicated region of the display generation component (e.g., the top-right corner)). In some embodiments, representations of one or more active users in a communication session are not displayed relative to each other (e.g., when the communication session is not a communication session, but the communication session includes active participants displayed in a list or gallery view). In some embodiments, a communication session includes a combination of users that are participating in a copresence communication session (e.g., and view representations of other users as being arranged relative to each other in a three-dimensional environment) and users that do not view other users as being arranged relative to each other in the three-dimensional space (e.g., users that view other participants in a list or gallery view).

In some embodiments, content shared in the three-dimensional environment 7207' is shared among a plurality of users while a communication session is ongoing. For example, in addition to the users being active in the shared three-dimensional environment 7207', the users are enabled to communicate with each other using audio (e.g., via microphones and/or speakers that are in communication with the respective computer systems of the users). In some embodiments, in a copresence communication session (e.g., a spatial communication session), audio received from a respective user is simulated as being received from a position corresponding to the respective user's current position in the three-dimensional environment. For example, while a user is talking in the communication session, the user's voice sounds as if it is coming from the area in which the representation of the user is displayed in the three-dimensional environment.

In some embodiments, the shared three-dimensional environment 7207' updates in real-time while the users are communicating with each other (e.g., using audio, physical movement, and/or shared applications) in a copresence communication session. In some embodiments, the users in the copresence communication session are not collocated with (e.g., within a predefined physical proximity of) each other in the physical environment, but share the three-dimensional environment 7207'. For example, the users view the shared three-dimensional environment (e.g., which may include one or more properties of a physical environment of one or more of the users), from different physical environments.

In some embodiments, the physical environments of each of the users are displayed (e.g., as pass-through content), and the representations of the other users active in the shared three-dimensional environment are augmented within the displayed physical environment (e.g., displayed as pass-through content). For example, the first user 7002 is located in the physical environment 7000, described with reference to FIG. 7A, which includes a physical object 7014. The physical object is also displayed in the first user's view of the shared three-dimensional environment 7207' displayed on display generation component 7100, but a representation of the physical object 7014 is not displayed in the second user's view of the shared three-dimensional environment 7207' displayed on the second display generation component 7102 (e.g., because the physical object 7014 is not present in the physical environment of the second user). Accordingly, in some embodiments, the shared three-dimensional environment 7207' is a mixed reality environment that includes portions of the respective physical environments of the respective users, and includes representations (e.g., virtual representations) of the other active users (e.g., and/or other virtual objects).

In some embodiments, as described above, the shared three-dimensional environment 7207' includes a representation for each of the plurality of users that are participating in the copresence communication session. For example, as illustrated in the three-dimensional environment 7207', the representations of the users 7200', 7203' and 7205' are positioned within the three-dimensional environment relative to each other, wherein the positioning of the representation of the users is maintained across each of the user's devices.

For example, as illustrated in FIG. 7F, in accordance with a determination that a virtual object 7208' (e.g., a virtual ball) is shared in the three-dimensional environment 7207', each of the users is presented, on the user's respective device, with the virtual object 7208' at a location that is consistent across each of the devices. For example, user 7200 perceives the virtual object 7208' as being to the right of the representation of the user 7205', whereas the user 7203 perceives the virtual object 7208' as being in between the representation of the user 7200' and the representation of the user 7205'. Accordingly, the three-dimensional environment 7207' is shared among the users such that as the users, or other virtual objects, move within the three-dimensional environment 7207', the movement is reflected in the viewpoint of each of the respective devices (e.g., display generation components 7100 and 7102).

In some embodiments, as illustrated in FIG. 7E, a representation of the user (e.g., the user's self) is displayed to the user on the display generation component. For example, for the first user 7200 of the display generation component 7100, the computer system displays a representation of the first user 7200". In some embodiments, the representation of the user 7200" comprises an avatar of the user. In some embodiments, the representation of the first user 7200" comprises a real-time camera view of the user (e.g., captured by one or more cameras of the computer system).

In some embodiments, the computer system displays a control user interface object 7206' that corresponds to the communication session (e.g., settings for the communication settings) with the other users. In some embodiments, the control user interface object 7206' is a separate user interface object from the representation of the other users (e.g., representation 7203' and representation 7205') in the three-dimensional environment 7104 displayed during the communication session.

In some embodiments, the control user interface object includes one or more affordances for displaying additional content related to the communication session, such as an affordance for changing the virtual environment (e.g., virtual scenery) for the communication session. For example, the user is enabled to add virtual objects (e.g., by selecting a control user interface object) to the copresence communication session (e.g., virtual object 7208') and/or to control placement of the virtual objects within the shared three-dimensional environment 7207'. In some embodiments, the control user interface object 7206' is only displayed in a copresence (e.g., spatial) communication session. For example, if the representations of the other users are displayed in a list and/or a gallery view (e.g., instead of as representations that are updated relative to each other within the shared three-dimensional environment 7207', as in a copresence communication session), the control user interface object 7206' (e.g., and controls for changing an immersive experience of the shared three-dimensional environment, described below) is not displayed.

For example, the shared three-dimensional environment 7207' provides options (e.g., in control user interface object 7206') for adjusting virtual properties (e.g., an immersive experience) of the shared three-dimensional environment 7207'. For example, the shared three-dimensional environment is enabled to be displayed with one or more themes, referred to herein as immersive experiences (e.g., which include immersive animations or environments) that are applied to the three-dimensional environment 7207'. For example, the user is provided with options for adding, removing, and/or changing virtual scenery, virtual lighting, and/or virtual wallpaper in the three-dimensional environment. In some embodiments, in response to a user selecting to change a current immersive experience, the immersive experience is applied to all of the users participating in the copresence communication session (e.g., the respective display generation components for each participating user displays virtual content for the immersive experience).

In some embodiments, the immersive experience is only displayed to the display generation component of the user that selects the immersive experience (e.g., without sharing it with the other users in the copresence communication session). In some embodiments, one or more options to share and/or remove (e.g., cease sharing) of the current immersive experience are also provided to the user. As such, the user is enabled to share (e.g., by selecting a first control option) the immersive experience to be applied to all of the users participating in the copresence communication session, and is enabled to remove the immersive experience from being applied to the user's view and/or to cease sharing of the immersive experience with the other users in the copresence communication session.

FIG. 7E illustrates a user input (e.g., or series of user inputs) to select an affordance (e.g., included in control user interface object 7206') for changing the virtual scenery. For example, the user's gaze in conjunction with a hand gesture selects affordance 7206-1'. In some embodiments, while the user is paying attention to an affordance in the control user interface object, the affordance is visually emphasized (e.g., enlarged, outlined, and/or highlighted) relative to other affordances displayed in the control user interface object, to provide the user with an indication of which affordance the user currently has selected (e.g., via the user's detected gaze). For example, while the user is gazing at the affordance 7206-1', the affordance 7206-1' is enlarged, indicating that (in response to an additional user input, such as a gesture), the affordance 7206-1' will be selected by the user. In response to the user's selection of the affordance 7206-1' (e.g., using a gesture performed with the user's hand 7020), the immersive experience (e.g., virtual scenery) is updated, as illustrated in FIG. 7F. For example, the virtual floor 7008-*t*' is displayed with different virtual lighting, and the virtual object 7208' is displayed. In some embodiments, the virtual object 7208' is part of the immersive experience that the user selected to update. For example, changing an immersive experience includes updating the virtual lighting, scenery, and/or wallpaper that is displayed in the three-dimensional environment 7207', including adding virtual objects that are included in the virtual scenes. In some embodiments, the other affordances displayed in control user interface object 7206' include other options for immersive experiences (e.g., that change the virtual scenery to include various other virtual lighting, objects, and/or wallpaper).

In some embodiments, the control user interface object 7206' includes one or more selectable user interface objects (e.g., affordances) for controlling a level of immersion of the immersive experience. For example, the user is enabled to change an amount of the physical environment that is displayed (e.g., as pass-through content) and change an amount of virtual content that is displayed in the three-dimensional environment. For example, the user selects a user interface object to increase the amount of pass-through content (e.g., decrease the level of immersion), which causes the computer system to cease display of at least a portion of the virtual content (and display more of the user's physical environment).

In some embodiments, the computer system displays additional controls 7204' for controlling the first user's settings in the shared communication session. For example, the additional controls 7204' provide a button for the user to mute the user (e.g., turn off the user's microphone) in the communication session (and/or to mute other users participating in the communication session), an option to hide the representation of the user (e.g., to cease display of the avatar or representation of the user in the communication session), an option to record the communication session, and option to end the communication session, an option to add a message (e.g., a text message) (e.g., to another user), and/or an option to begin a collaborative drawing session.

For example, the computer system displays an option to add a message to be displayed in the shared communication session, such that the message is displayed in the shared three-dimensional environment 7207'. In some embodiments, the message is shared with all of the users participating in the shared communication session. In some embodiments, the message is only shared with a subset, less than all, of the users participating in the shared communication session (e.g., a private message sent to one or more other users in the shared communication session). In response to the user adding a message, the message is displayed in a current view displayed on the respective display generation components of the users with whom the message was shared.

In some embodiments, the computer system displays an option to start a collaborative drawing session, in which the participating users in the communication session are enabled to add and modify drawings to be viewed by the active users in the communication session. In some embodiments, the option to start a collaborative drawing session is displayed for a spatial communication session, and is not displayed for a communication that is not a spatial communication session. For example, if the representations of participating users are shown in a list and/or a gallery view (e.g., as opposed to representations in the shared three-dimensional environment that are displayed relative to other participants), the option to start a collaborative drawing session is not provided. In some embodiments, users are enabled to draw on (e.g., add content to) the collaborative drawing session using air gestures (e.g., gestures performed with the user's hand 7020 that are detected by one or more sensors and/or input devices of the computer system).

In some embodiments, the computer system displays additional information for the shared communication session. For example, one or more applications (e.g., application windows) are shared during the communication session, such that the one or more applications (e.g., application windows for the applications) are displayed in the shared three-dimensional environment 7207' (e.g., and the application windows are updated, in real-time, on each respective display generation component for respective users participating in the shared communication session). In some embodiments, the computer system optionally displays indications of one or more active applications (e.g., applications that are shared in the ongoing communication session). For example, an indication of an active application is displayed in a current view of the user, even if the user is not currently viewing the application window for the active application (e.g., the application window is displayed in a portion of the shared three-dimensional environment 7207' that is not in the current view of the user). In some embodiments, an indication of the user that initiated the sharing of the respective application is displayed. For example, the indication of the user (e.g., the user's name, an avatar for the user, and/or the user's initials) is displayed with (e.g., overlaps, or is displayed close to) the respective active application (and/or with the indication of the active application).

In some embodiments, the computer system displays an option to remove (e.g., close) a shared application, and in response to a user selecting the option to remove the shared application, the shared active application ceases to be shared and/or displayed. In some embodiments, only the user that shared the application is provided with the option to remove the shared application. In some embodiments, the option to remove the shared application is displayed for (e.g., and selectable by) all of the participating users in the shared communication session. As such, in some embodiments, users are provided with different controls for interacting with the shared three-dimensional environment (e.g., controls displayed for a first user are not displayed for a second user).

In some embodiments, the computer system displays an indication of a current level of immersion. For example, the computer system provides information regarding how much of the physical environment is displayed using passthrough, as compared with how much of the three-dimensional environment is virtual (e.g., generated). As described above, in some embodiments, the user is enabled to control a current level of immersion (e.g., and control an immersive experience).

In some embodiments, as described above, the representations of the other users participating in the communication session (e.g., representation of the second user 7203' and representation of the third user 7205') are displayed, and additional controls for controlling the participants are displayed (e.g., with the representations of the participating users). For example, the display generation component displays an option to remove users from the shared communication session (e.g., including the user's self). In some embodiments, the computer system further displays a status indicator of the other users in the communication session. For example, the computer system displays an indication of a device type that each of the participants in the communication session are using to participate in the communication session and/or an indication of whether a participant is currently active or inactive.

In some embodiments, the computer system enables the user to request a spatial cue that identifies where a particular application and/or user is located within the three-dimensional environment 7207'. For example, the user provides an input (e.g., a tap input) on a particular representation of an application and/or a representation of another user participating in the shared communication session, and in response to the input, the computer system plays a spatial audio cue (e.g., the audio cue is simulated as coming from the application and/or other user), to indicate where the application and/or user is located relative to the user within the three-dimensional environment. For example, an application window and/or a representation of a participating user is located at a position in the three-dimensional environment, but is not displayed in the user's current view.

In some embodiments, indications of the applications and/or participating users are displayed in the user's current view, such that even if the application window and/or representation of the participating user is not within the user's current view, the indication of active applications and/or participants are displayed (e.g., as a list, or in a gallery view), such that the user can request a spatial audio cue (e.g., and/or spatial visual cue) that indicates where the application window and/or representation of the participating user is located in the three-dimensional environment, relative to the user's current view. For example, the user perceives the spatial audio cue as audio coming from a location in the three-dimensional environment at which the application window and/or representation of the participating user is located. In some embodiments, the requested cue is a visual cue, and the computer system displays a visual cue (e.g., an arrow, or other visual indication) that indicates where the application and/or user is located relative to the user within the three-dimensional environment.

In some embodiments, in response to the user looking away from the control user interface object 7206' (e.g., a gaze input is not detected), the computer system ceases display of the user interface object 7206'. For example, as illustrated in FIG. 7E, the first user 7202 is gazing at an affordance in the control user interface object 7206', which remains displayed for the first user. The second user (e.g., using display generation component 7102) is not gazing at the display generation component, and the computer system for the second user does not display a control user interface object 7206' for the second user. For example, in response to the second user gazing at the display generation component, the control user interface object 7206' is displayed for the second user on display generation component 7102. In some embodiments, a user is enabled to close the control user interface object 7206' (e.g., by performing a gesture to remove the control user interface object 7206', such as a swipe down air gesture).

FIGS. 7G-7J are block diagrams illustrating user interface objects in a modal user interface object that are displayed for a user while the user is paying attention to the modal user interface object. For example, if the modal user interface object is placed in front of the user within a predefined portion of the three-dimensional environment, the modal user interface object is automatically dismissed if the user looks away from the modal user interface object, if the modal user interface object is placed into the three-dimensional environment (e.g., such that the modal user interface object is anchored to the three-dimensional environment), the modal user interface object is not automatically dismissed if the user looks away from the modal user interface object, in accordance with some embodiments. In some embodiments, a modal user interface object comprises a control panel user interface object (e.g., first user interface object 7016', second user interface object 7018', or control user interface object 7206').

As shown in FIGS. 7G-7J, a three-dimensional environment (e.g., environment 7000', an environment as described with respect to FIGS. 7A-7D and/or FIGS. 7E-7F, another VR, AR, or XR environment) is displayed via a display generation component (e.g., display generation component 7100, the first display generation component described with respect to FIGS. 7A-7D and/or FIGS. 7E-7F, or other display generation component) in communication with a computer system (e.g., the computer system 101, the computer system described with respect to FIGS. 7A-7D and/or 7E-7F). As shown in FIGS. 7G-7J, the currently displayed view of the three-dimensional environment 7000' includes one or more user interface objects (e.g., user interface object 7304' (e.g., a modal user interface object), and one or more constituent user interface objects 734-1 and 7304-2 of the modal user interface object 7304', user interface object 7302', and/or other user interface objects or virtual objects) displayed at various positions in the three-dimensional environment 7000' (e.g., positions that correspond to respective locations of physical objects or surfaces, or positions that do not correspond to locations of physical objects and surfaces).

As shown in FIGS. 7G-7J, the computer system displays a view of a three-dimensional environment (e.g., environment 7000', a virtual three-dimensional environment, an augmented reality environment, a pass-through view of a physical environment, or a camera view of a physical environment), for example as described above with reference to FIGS. 7A-7B. In some embodiments, the three-dimensional environment is a virtual three-dimensional environment without a representation of a physical environment. In some embodiments, the three-dimensional environment is a mixed reality environment that is a virtual environment augmented by sensor data corresponding to the physical environment. In some embodiments, the three-dimensional environment is an augmented reality environment that includes one or more virtual objects and a representation of at least a portion of a physical environment (e.g., representations 7004' and 7006' of walls, representation 7008' of a floor, and/or representation 7014' of a physical object) surrounding the first display generation component. In some embodiments, the representation of the physical environment includes a camera view of the physical environment. In some embodiments, the representation of the physical environment includes a view of the physical environment through a transparent or semitransparent portion of the first display generation component.

Figure 7H:
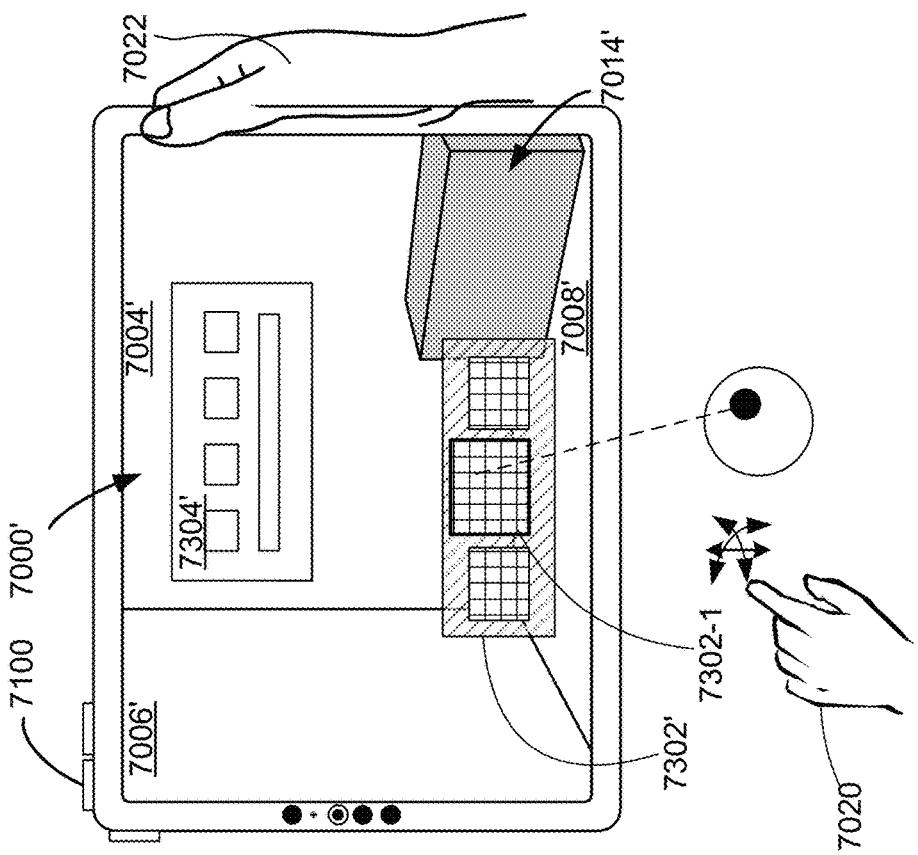
FIGS. 7G-7J are block diagrams illustrating user interface objects in a modal user interface object that are displayed for a user while the user is paying attention to the modal user interface object, in accordance with some embodiments.
Figure 7G:
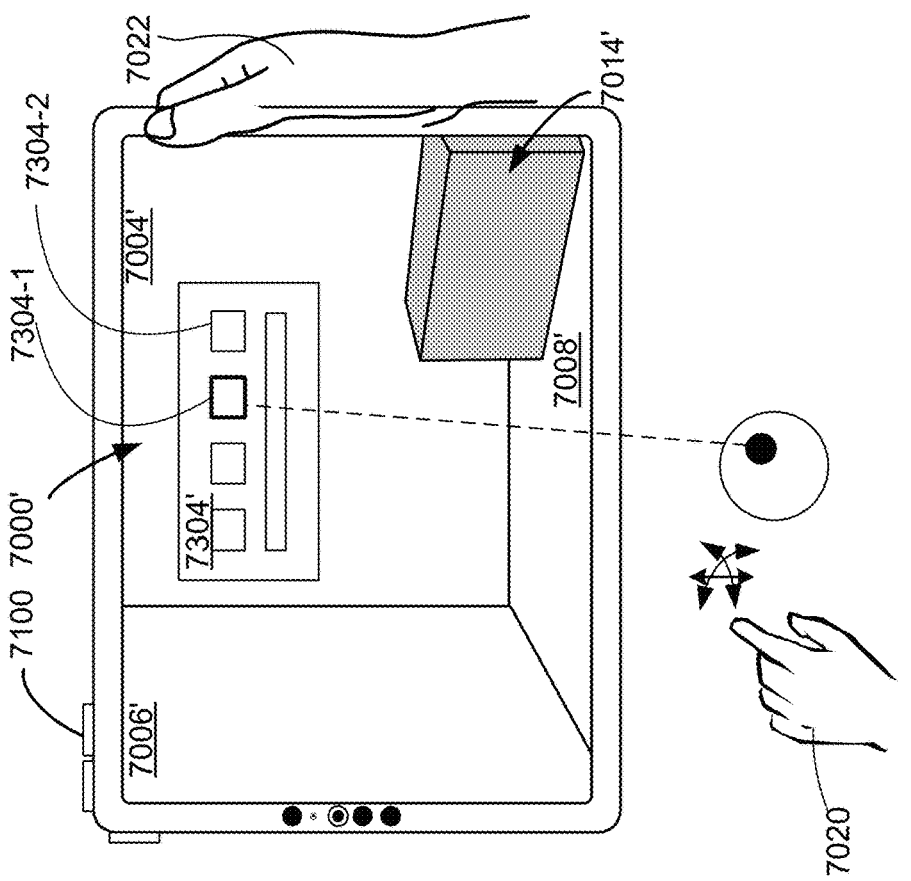

In FIG. 7G, the computer system displays a first user interface object 7304' (e.g., a modal user interface object), which includes a plurality of constituent user interface objects, including user interface objects 7304-1 and 7304-2. In some embodiments, the user interface object 7304' is displayed at a position in the three-dimensional environment 7000' that is anchored within the three-dimensional environment (e.g., anchored to its position in front of representation 7004' of a wall). In some embodiments, as the user's head and/or the user's torso moves (e.g., rotates or moves laterally), the user interface object 7304' continues to be displayed at a same position in the three-dimensional environment relative to other objects displayed in the three-dimensional environment (e.g., independent of the user's movement). In some embodiments, the position of the user interface object 7304' is positioned in the three-dimensional environment at more than a predefined distance away from the user. For example, while the user interface object 7304' is anchored within the three-dimensional environment, the user interface object 7304' is positioned at more than an arm's length in distance away from the user.

FIG. 7H illustrates a second user interface object 7302' (e.g., a modal user interface object) that is displayed at a position in the three-dimensional environment that is determined in accordance with a current viewpoint of the user. In some embodiments, the user interface object 7302' is tied to the user's head and/or the user's torso in the physical environment 7000. In some embodiments, the user interface object 7304' is displayed within the user's personal space (e.g., within an arm's length of distance from the user). For example, as the user's head and/or the user's torso moves (e.g., rotates or moves laterally), the user interface object 7302' continues to be displayed at a same position relative to the user (e.g., within the user's personal space). Accordingly, the user interface object 7302' is easily accessible to the user by allowing the user to interact with the user interface object 7302', which is displayed at a position in front of the user, even as the user moves within the physical environment.

In some embodiments, the user interface object 7304' is displayed while the user is gazing at a portion of the user interface object 7304'. For example, in FIG. 7G, the user is gazing at user interface object 7304-1 (e.g., a constituent user interface object within user interface object 7304'). In some embodiments, in response to detecting a gaze on a portion of the user interface object 7304-1, the computer system modifies one or more visual properties of the user interface object 7304-1. For example, in FIG. 7G, the user interface object 7304-1 is displayed with an outline (e.g., is highlighted). Additional and/or alternative visual properties may also be applied to a user interface object that the user is currently gazing at (e.g., changing a size of the object (e.g., enlarging the object relative to other displayed virtual and/or physical objects), and/or changing an opacity and/or translucency of the object).

In some embodiments, the user interface object 7304' continues to be displayed in the three-dimensional environment, even after determining that the user is no longer paying attention to the user interface object 7304'. For example, in FIG. 7H, the user has changed the user's attention (e.g., as indicated by the dashed line from the user's eye) to another user interface object 7302-1. Because the user interface object 7304' is anchored to a position in the three-dimensional environment (e.g., the user interface object 7304' is anchored to a position in front of the representation 7004' of a wall), the user interface object 7304' remains displayed while the portion of the three-dimensional environment at which the user interface object 7304' is anchored remains within the user's current view of the three-dimensional environment.

In some embodiments, as illustrated in FIG. 7G, the user performs a selection input (e.g., a gaze and/or a gesture using the user's hand 7020) directed to the user interface object 7304-1. In response to detecting the selection input, the computer system displays (e.g., opens and/or launches) a second user interface object 7302', as illustrated in FIG. 7H. For example, the user interface object 7304-1, is an application icon that, when selected, opens a user interface object (e.g., user interface object 7302') for the application of the application icon. In some embodiments, the user interface object 7302' is opened (e.g., displayed) at a predefined portion of the user's current view in the three-dimensional environment, the predefined portion of the user's current view corresponding to a portion of the three-dimensional environment that is directly in front of the user (and/or at the bottom of the user's current view).

In some embodiments, in response to the user directing the user's attention to a predefined portion of the user's current view in the three-dimensional environment (e.g., the user gazes at an area directly in front of the user in the three-dimensional environment), a second user interface object 7302' is displayed. For example, the second user interface object 7302' is a control modal that is displayed in front of the user when the user looks at the predefined portion of the user's current view (e.g., directly in front of the user at the bottom of the user's current view). It will be understood that the predefined portion of the user's current view can be located at other positions within the three-dimensional environment (e.g., in front of the user at the top of the user's current view or at the left edge of the user's current view). In some embodiments, the predefined portion of the user's current view at which the user interface object 7302' is displayed is within a predefined distance away from the user (e.g., close to the user), such as within an arm's reach of the user.

In some embodiments, while the user is paying attention to a user interface object 7302-1 that is displayed in the user interface object 7302', the user interface object 7302-1 is visually emphasized (e.g., relative to other user interface objects displayed in the user interface object 7302'). For example, the user interface object 7302-1 is enlarged and outlined (e.g., or otherwise highlighted) to indicate that the user's attention is currently detected as being directed to the user interface object 7302-1.

In some embodiments, in response to the user performing a user input selecting the user interface object 7302-1 (e.g., by gazing and/or performing a gesture), the computer system adds a virtual object 7306 to the three-dimensional environment. For example, the user interface object 7302-1 is a control for adding the virtual object 7306 to the three-dimensional environment.

Figure 7J:
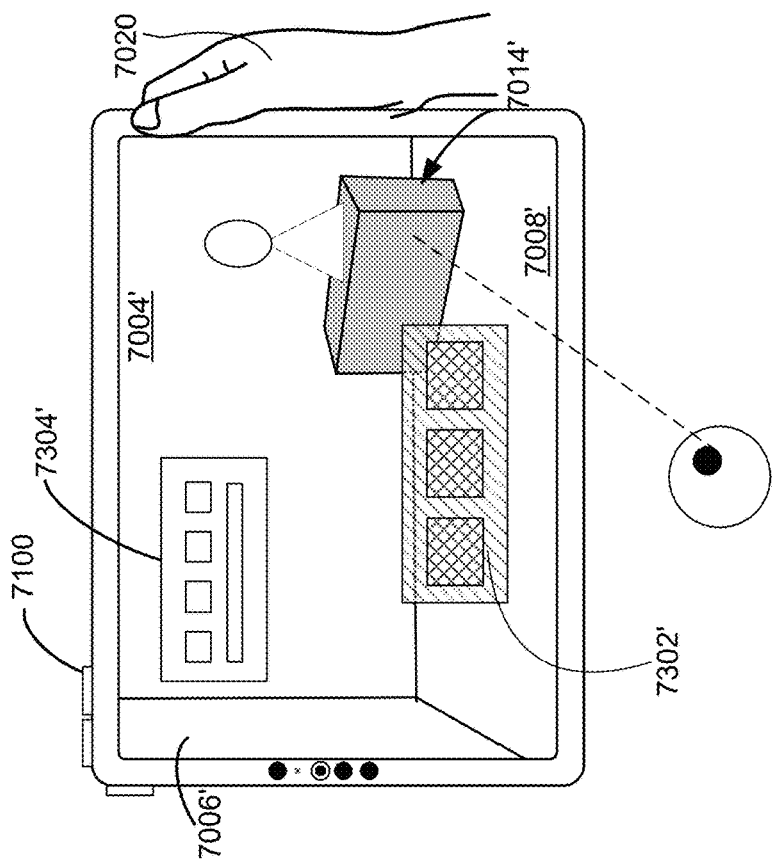
Figure 7I:
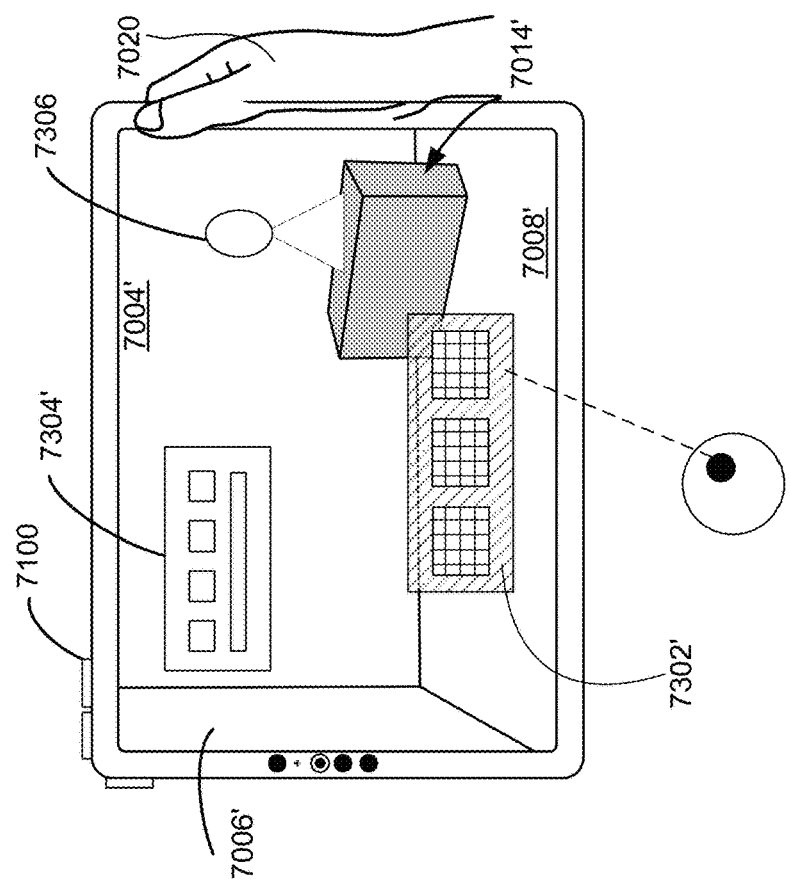

In some embodiments, as illustrated in FIG. 7I, in response to determining that the user is not gazing at the user interface object 7302-1, but the user continues to pay attention to a portion of the user interface object 7302', the user interface object 7302' remains displayed at the predefined portion of the three-dimensional environment.

FIG. 7J illustrates the user paying attention to a representation 7014' of a physical object. In some embodiments, in response to the user no longer paying attention to the user interface object 7302', as shown in FIG. 7J, the user interface object 7302' is visually deemphasized. In some embodiments, the user interface object 7302' disappears (e.g., is no longer displayed).

In some embodiments, the user is enabled to change a position (e.g., and change an anchor) of the user interface object 7302' in the three-dimensional environment. For example, the user can move the user interface object 7302' from the predefined portion of the three-dimensional environment (e.g., in front of the user) to a location within the three-dimensional environment. In some embodiments, in response to the user moving the user interface object 7302' outside of the predefined portion of the three-dimensional environment, the user interface object 7302' is anchored to a position within the three-dimensional environment (e.g., instead of being anchored to the predefined position that is updated relative to the user's current view of the three-dimensional environment). For example, after the user interface object 7302' has been anchored to the three-dimensional environment, the user interface object 7302' does not follow the user's current view as the user moves in the physical environment. For example, the user interface object 7302' has behavior similar to user interface object 7304' (e.g., which is anchored to the three-dimensional environment).

In some embodiments, the user selects where, within the three-dimensional environment (e.g., outside of the predefined portion) to place the user interface object 7302'. For example, the user selects the position at which to anchor the user interface object 7302' in the three-dimensional environment. For example, the user can select a position within the three-dimensional environment that is not shown in the current view of FIG. 7J (e.g., the user can select (e.g., using a pinch gesture) the user interface object 7302' and drag the user interface object to a position within the three-dimensional environment (e.g., and release the pinch gesture and/or otherwise perform a gesture to place the user interface object at the position). For example, the user interface object is anchored to the position at which the user ends the drag input (e.g., where the user places the user interface object).

In some embodiments, the user is enabled to bring a user interface object that is anchored to a position in the three-dimensional (e.g., independent of the user's current view), into the predefined portion of the three-dimensional environment, such that the user interface object is then anchored to the user's current view of the three-dimensional environment (e.g., and follows the user as the user moves in the physical environment). For example, the user can move user interface object 7304' to the predefined portion in front of the user (e.g., where user interface object 7302' is displayed) to anchor the user interface object 7304' to the user's current view (and have the same behaviors described above with reference to user interface object 7302', such as being visually deemphasized when the user is not paying attention to the user interface object that is anchored to the user's current view).

In some embodiments, while a user interface object is anchored to the three-dimensional environment, other users (e.g., participating in a communication session, as described above), are enabled to view the user interface object. For example, the user interface object is in a public world view while it is anchored to the three-dimensional environment during a communication session.

In some embodiments, while the user interface object is anchored to the predefined portion, relative to the user (e.g., in front of the user) in the three-dimensional environment, during a communication session, other users cannot view the user interface object (e.g., the user interface object(s) placed within the predefined portion that is anchored to the user's current view are private to the user and not shared/viewable by other users).

In some embodiments, the user is enabled to change a position of the user interface object 7302' from being anchored to the predefined portion of the three-dimensional environment (e.g., in front of the user) to being anchored to a portion of the user's body. For example, the user is enabled to anchor the user interface object to the user's hand (e.g., like user interface object 7016' and/or 7018' described with reference to FIGS. 7C-7D). In some embodiments, while the user interface object 7302' is anchored to the user's hand, the user interface object 7302' is only displayed while the user's hand is in the user's current view of the three-dimensional environment. In some embodiments the user is enabled to pinch (e.g., to select) the user interface object, and drag the user interface object from its anchored position in the predefined portion of the three-dimensional environment to the user's hand (e.g., wherein releasing the drag input over the user's hand causes the user interface object to be anchored to the user's hand). In some embodiments, the user is enabled to grab (e.g., by reaching out and closing a fist over the user interface object with the user's hand 7020) the user interface object from the predefined portion, and in response to grabbing the user interface object, the user interface object is anchored to the user's hand. In some embodiments, a selectable user interface icon is displayed with the representation of the user's hand, the selectable user interface icon corresponding to an option to move a user interface object to be anchored to the user's hand. For example, in response to the user selecting (e.g., via a gaze input or a pinch input) the selectable user interface icon, the user interface object that is anchored to the predefined portion of the three-dimensional environment (e.g., in front of the user) is moved to be anchored to the user's hand (e.g., without requiring the user to drag the user interface object into the user's hand).

In some embodiments, the user is enabled to move the user interface object from being anchored to the user's hand, to the predefined portion of the three-dimensional environment (e.g., in front of the user) and/or to anchor the user interface object within the three-dimensional environment. In some embodiments, the user input to move the user interface object from being anchored to the user's hand to being placed in the predefined portion (relative to the user's current view) of the three-dimensional environment comprises a pinch and grab gesture. For example, the user input comprises selecting (e.g., using a pinch gesture) the user interface object anchored to the user's hand and to simulate throwing (e.g., reaching out the user's hand 7020 and opening a fist to release) the user interface object out into the three-dimensional environment (e.g., within the predefined portion and/or within other portions of the three-dimensional environment).

In some embodiments, input gestures used in the various examples and embodiments described herein (e.g., with respect to FIGS. 7A-7J, and FIGS. 8-10) include air gestures performed by movement of the user's finger(s) relative to other finger(s) or part(s) of the user's hand) for interacting with a virtual or mixed-reality environment, in accordance with some embodiments.

In some embodiments, input gestures (e.g., air gestures) used in the various examples and embodiments described herein (e.g., with respect to FIGS. 7A-7J, and FIGS. 8-10) include pinch inputs and tap inputs, for interacting with a virtual or mixed-reality environment, in accordance with some embodiments. For example, the pinch inputs and tap inputs described below are performed as air gestures.

In some embodiments, input gestures used in the various examples and embodiments described herein (e.g., with respect to FIGS. 7A-7J, and FIGS. 8-10) optionally include discrete, small motion gestures performed by movement of the user's finger(s) relative to other finger(s) or part(s) of the user's hand, optionally, without requiring major movement of the user's whole hand or arm away from their natural location(s) and posture(s)) to perform operations immediately prior to or during the gesture) for interacting with a virtual or mixed-reality environment, in accordance with some embodiments.

In some embodiments, the input gestures are detected by analyzing data or signals captured by a sensor system (e.g., sensors 190, FIG. 1; image sensors 314, FIG. 3). In some embodiments, the sensor system includes one or more imaging sensors (e.g., one or more cameras such as motion RGB cameras, infrared cameras, and/or depth cameras). For example, the one or more imaging sensors are components of or provide data to a computer system (e.g., computer system 101 in FIG. 1 (e.g., a display generation component 7100, 7102 or an HMD)) that includes a display generation component (e.g., display generation component 120 in FIGS. 1, 3, and 4 (e.g., a touch-screen display that serves as a display and a touch-sensitive surface, a stereoscopic display, and/or a display with a pass-through portion). In some embodiments, the one or more imaging sensors include one or more rear-facing cameras on a side of a device opposite from a display of the device. In some embodiments, the input gestures are detected by a sensor system of a head mounted system (e.g., a VR headset that includes a stereoscopic display that provides a left image for the user's left eye and a right image for the user's right eye). For example, one or more cameras that are components of the head mounted system are mounted on the front and/or underside of the head mounted system. In some embodiments, one or more imaging sensors are located in a space in which the head mounted system is used (e.g., arrayed around head mounted system in various locations in a room) such that the imaging sensors capture images of the head mounted system and/or the user of the head mounted system. In some embodiments, the input gestures are detected by a sensor system of a heads up device (such as a heads up display, automotive windshield with the ability to display graphics, window with the ability to display graphics, lens with the ability to display graphics). For example, one or more imaging sensors are attached to interior surfaces of an automobile. In some embodiments, the sensor system includes one or more depth sensors (e.g., an array of sensors). For example, the one or more depth sensors include one or more light-based (e.g., infrared) sensors and/or one or more sound-based (e.g., ultrasonic) sensors. In some embodiments, the sensor system includes one or more signal emitters, such as a light emitter (e.g. infrared emitter) and/or sound emitter (e.g., ultrasound emitter). For example, while light (e.g., light from an array of infrared light emitters having a predetermined pattern) is projected onto a hand (e.g., hand 7102), an image of the hand under illumination of the light is captured by the one or more cameras and the captured image is analyzed to determine a position and/or configuration of the hand. Using signals from image sensors directed to the hand to determine input gestures, as opposed to using signals of touch-sensitive surfaces or other direct contact mechanism or proximity-based mechanisms allow the user to freely choose whether to execute large motions or remaining relatively stationary when providing the input gestures with his/her hand, without experiencing constraints imposed by a specific input device or input region.

In some embodiments, a tap input is, optionally, a tap input of a thumb over index finger (e.g., over a side of the index finger adjacent to the thumb) of a user's hand. In some embodiments, a tap input is detected without requiring lift-off of the thumb from the side of the index finger. In some embodiments, a tap input is detected in accordance with a determination that downward movement of the thumb are followed by upward movement of the thumb, with the thumb making contact with the side of the index finger for less than a threshold amount of time. In some embodiments, a tap-hold input is detected in accordance with a determination that the thumb moves from the raised position to the touch-down position and remains in the touch-down position for at least a first threshold amount of time (e.g., the tap time threshold or another time threshold that is longer than the tap time threshold). In some embodiments, the computer system requires that the hand as a whole remains substantially stationary in location for at least the first threshold amount of time in order to detect the tap-hold input by the thumb on the index finger. In some embodiments, the touch-hold input is detected without requiring that the hand as a whole is kept substantially stationary (e.g., the hand as a whole may move while the thumb rests on the side of the index finger). In some embodiments, a tap-hold-drag input is detected when the thumb touches down on the side of the index finger and the hand as a whole moves while the thumb rests on the side of the index finger.

In some embodiments, a flick gesture is, optionally, a push or flick input by a movement of a thumb across index finger (e.g., from the palm side to the back side of the index finger). In some embodiments, the extension movement of the thumb is accompanied by upward movement away from the side of the index finger, e.g., as in an upward flick input by the thumb. In some embodiments, the index finger moves in the opposite direction from that of the thumb during the forward and upward movement of the thumb. In some embodiments, a reverse flick input is performed by the thumb moving from an extended position to a retracted position. In some embodiments, the index finger moves in the opposite direction from that of the thumb during the backward and downward movement of the thumb.

In some embodiments, a swipe gesture is, optionally, a swipe input by a movement of a thumb along index finger (e.g., along a side of the index finger adjacent to the thumb or on the side of the palm). In some embodiments, the index finger is optionally in an extended state (e.g., substantially straight) or a curled up state. In some embodiments, the index finger moves between the extended state and the curled up state during the movement of the thumb in a swipe input gesture.

In some embodiments, different phalanges of various fingers correspond to different inputs. A tap input of thumb over various phalanges of various fingers (e.g., index finger, middle finger, ring finger, and, optionally, pinky finger) are optionally mapped to different operations. Similarly, in some embodiments, different push or click inputs can be performed by the thumb across different fingers and/or different parts of a finger to trigger different operations in a respective user interface contact. Similarly, in some embodiments, different swipe inputs performed by the thumb along different fingers and/or in different directions (e.g., toward the distal or proximal end of a finger) trigger different operations in a respective user interface context.

In some embodiments, the computer system treats tap inputs, flick inputs, and swipe inputs are treated as different types of inputs based on movement types of the thumb. In some embodiments, the computer-system treats inputs having different finger locations that are tapped, touched, or swiped by the thumb as different sub-input-types (e.g., proximal, middle, distal subtypes, or index, middle, ring, or pinky subtypes) of a given input type (e.g., a tap input type, a flick input type, or a swipe input type). In some embodiments, the amount of movement performed by the moving finger (e.g., thumb) and or other movement metrics associated with the movement of the finger (e.g., speed, initial speed, ending speed, duration, direction, and/or movement pattern) is used to quantitatively affect the operation that is triggered by the finger input.

In some embodiments, the computer-system recognizes combination input types that combines a sequence of movements by the thumb, such as a tap-swipe input (e.g., touch-down of thumb on a finger followed by swiping along the side of the finger), a tap-flick input (e.g., touch-down of thumb over a finger followed by a flick across the finger from palm side to back side of the finger), and a double tap input (e.g., two consecutive taps on the side of a finger at about the same location).

In some embodiments, the gesture inputs are performed by an index finger instead of the thumb (e.g., index finger performs the tap or swipe on the thumb, or the thumb and the index finger move toward each other to perform a pinch gesture). In some embodiments, a wrist movement (e.g., a flick of the wrist in a horizontal direction, or a vertical direction) is performed immediately preceding, immediately succeeding (e.g., within a threshold amount of time) or contemporaneously with the finger movement inputs to trigger additional operations, different operations, or modified operations in the current user interface context, as compared to the finger movement inputs without the modifier input by the wrist movement. In some embodiments, the finger input gestures performed with the user's palm facing the user's face are treated as a different type of gestures from finger input gestures performed with the user's palm facing away from the user's face. For example, a tap gesture performed with the user's palm facing the user performs an operation with added (or reduced) privacy safeguard as compared to an operation (e.g., the same operation) performed in response to a tap gesture performed with the user's palm facing away from the user's face.

Although one type of finger input may be used to trigger a type of operation in the examples provided in this disclosure, other types of finger input are optionally used for trigger the same type of operation in other embodiments.

Additional descriptions regarding FIGS. 7A-7J are provided below in references to methods 8000, 9000, and 10000 described with respect to FIGS. 8-10 below.

Figure 8:
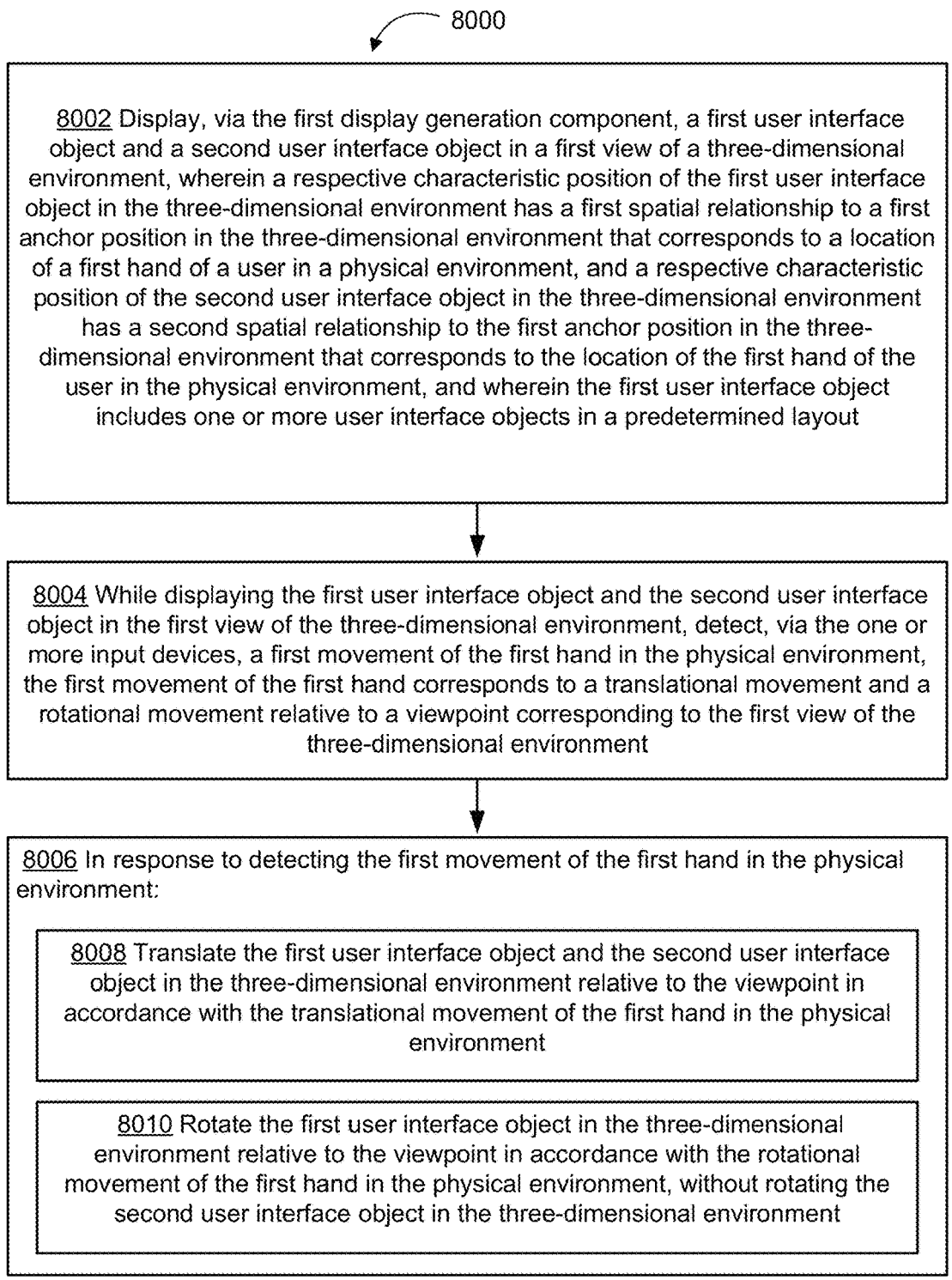
FIG. 8 is a flowchart of a method for displaying a first and second user interface object, with respective spatial relationships relative to an anchor position corresponding to a user's hand, in accordance with some embodiments.

FIG. 8 is a flowchart of a method 8000 for displaying a first and second user interface object, with respective spatial relationships relative to an anchor position corresponding to a user's hand, and in response to detecting movement of the user's hand, translating both the first user interface object and the second user interface object with the translational movement of the user's hand, and rotating the first user interface object but not the second user interface object with rotational movement of the user's hand, in accordance with some embodiments.

In some embodiments, the method 8000 is performed at a computer system (e.g., the computer system 101 in FIG. 1, or the computer system described with respect to FIGS. 7A-7D, FIGS. 7E-7F, FIGS. 7G-7J). In some embodiments, the computer system is in communication with a first display generation component (e.g., display generation component 7100, another display generation component, a heads-up display, a head-mounted display (HMD), a display, a touch-screen, and/or a projector) and one or more input devices (e.g., cameras or other sensors and input devices that detect movement of the user's hand(s), movement of the user's body as whole, and/or movement of the user's head in the physical environment; e.g., controllers, touch-sensitive surfaces, joysticks, buttons, gloves, watches, motion sensors, and/or orientation sensors). In some embodiments, the first display generation component is a display generation component 7100 described with respect to FIGS. 7A-7D, FIGS. 7E-7F, and FIGS. 7G-7J. In some embodiments, the first display generation component is a heads-up display that does not move or rotate with the user's head or the user's body as a whole, but, optionally, changes the viewpoint of the user into the three-dimensional environment in accordance with the movement of the user's head or body relative to the first display generation component. In some embodiments, the first display generation component is optionally moved and rotated by the user's hand relative to the physical environment or relative to the user's head, and changes the viewpoint of the user into the three-dimensional environment in accordance with the movement of the first display generation component relative to the user's head or face or relative to the physical environment. Many of the features of the method 8000 are described with respect to FIGS. 7A-7D, in accordance with some embodiments.

The method 8000 relates to displaying different user interface elements that are tied to a location of a user's hand that is also displayed such that one of the user interface elements changes as an orientation of the user's hand changes, while another user interface element does not change in orientation as the orientation of the user's hand changes. Automatically adjusting a size and/or position and, optionally, the orientation of certain user interface objects relative to a user's hand without adjusting the orientation of other user interface objects relative to the user's hand provides real-time visual feedback as the user moves their hand. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In the method 8000, the computer system displays (8002), via the first display generation component, a first user interface object and a second user interface object in a first view of a three-dimensional environment (e.g., an augmented reality environment, a virtual reality environment, and/or an extended reality environment). A respective characteristic position of the first user interface object in the three-dimensional environment has a first spatial relationship to a first anchor position in the three-dimensional environment that corresponds to a location of a first hand of a user in a physical environment, and a respective characteristic position of the second user interface object in the three-dimensional environment has a second spatial relationship to the first anchor position in the three-dimensional environment that corresponds to the location of the first hand of the user in the physical environment (e.g., the first user interface object is displayed at a first position relative to the representation of the user's hand 7020' and the second user interface object is displayed at a second position relative to the representation of the user's hand 7020'). In some embodiments, the first user interface object includes one or more user interface objects (e.g., user interface objects corresponding to different operations of the computer system, such as system-level operations and/or application-level operations) in a predetermined layout (e.g., a two-dimensional layout or a three-dimensional layout). In some embodiments, the first user interface object is a user interface of a respective application (e.g., a messages application, a communication application, or a news application), a user interface of the operating system (e.g., a launch pad or a control panel), or a preconfigured set of icons, avatars, graphics, user interface objects and/or controls arranged in a container object or over a background in a layout. In some embodiments, the second user interface object is a user interface of a respective application (e.g., a messages application, a communication application, or a news application), a user interface of the operating system (e.g., a launch pad or a control panel), or a preconfigured set of icons, avatars, graphics, user interface objects and/or controls arranged in a container object or over a background in a layout (e.g., also referred to herein as a session user interface object). In some embodiments, the first user interface object and the second user interface object correspond to the same application. In some embodiments, the first user interface object and the second user interface object correspond to different levels of an operation hierarchy in the operating system. In some embodiments, the respective characteristic position of the first and/or second user interface object is the geometric center of a two-dimensional arrangement of the constituent objects of the first and/or second user interface object, respectively. In some embodiments, the characteristic position of the first and/or second user interface object is a geometric center of a front side of a three-dimensional arrangement of constituent objects of the first and/or second user interface object, respectively. In some embodiments, the first anchor position in the three-dimensional environment that corresponds to the location of the first hand of the user is a virtual position of the representation of the first hand. In some embodiments, the first anchor position is the center of the representation of the user's palm or back of the user's hand in the three-dimensional environment.

While displaying the first user interface object and the second user interface object in the first view of the three-dimensional environment (e.g., concurrently with their respective characteristic positions having the first and second spatial relationships to the first anchor position that corresponds to the location of the first hand of the user), the computer system detects (8004), via the one or more input devices, a first movement of the first hand in the physical environment. The first movement of the first hand corresponds to a translational movement (e.g., to the sides, up/down, and/or in depth) and a rotational movement (e.g., around an axis corresponding to the user's wrist) relative to a viewpoint corresponding to the first view of the three-dimensional environment. In some embodiments, the position of the viewpoint corresponds to the virtual position of the user's face or eyes in the three-dimensional environment. In some embodiments, the position of the viewpoint for a respective view of the three-dimensional environment is the virtual position from which the respective view of the three-dimensional environment would be visible to a virtual viewer.

In response to detecting (8006) the first movement of the first hand in the physical environment, the computer system translates (8008) the first user interface object and the second user interface object in the three-dimensional environment relative to the viewpoint in accordance with the translational movement of the first hand in the physical environment (e.g., such that the first spatial relationship between the respective characteristic position of the first user interface object and the first anchor position and the second spatial relationship between the respective characteristic position of the second user interface object and the first anchor position are maintained in the three-dimensional environment) (e.g., the first user interface object and the second user interface object follow the lateral movement of the representation of the first hand relative to the viewpoint corresponding to the first view of the three-dimensional environment).

In response to detecting (8006) the first movement of the first hand in the physical environment, the computer system rotates (8010) the first user interface object in the three-dimensional environment relative to the viewpoint in accordance with the rotational movement of the first hand in the physical environment, without rotating the second user interface object in the three-dimensional environment (e.g., the first user interface object follows the rotation of the first hand relative to the viewpoint but the second user interface object does not follow the rotation of the first hand relative to the viewpoint corresponding to the first view of the three-dimensional environment). In some embodiments, the first spatial relationship shows the first user interface object overlaid on (e.g., or replaces display of) a portion of the representation of the surface of the first hand of the user, while the second spatial relationship shows the second user interface object having a three-dimensional relationship relative to the surface of the first hand of the user (e.g., without overlapping a portion of the surface of the first hand of the user). In some embodiments, the second user interface object is closer to the viewpoint than the representation of the first hand of the user and is in front of the representation of the first hand of the user relative to the viewpoint. In some embodiments, the second user interface object is farther away from the viewpoint than the representation of the first hand of the user and is behind the representation of the first hand of the user relative to the viewpoint. This is shown in FIGS. 7B-7D, for example, which show a first user interface object (e.g., the first user interface object 7016') and a second user interface object (e.g., the second user interface object 7018'). In response to detecting the first movement of the first hand (e.g., as illustrated by movement of the representation of the user's hand 7020'), the computer system translates the first user interface object and the second user interface object in the three-dimensional environment relative to the viewpoint in accordance with the translational movement of the first hand in the physical environment (e.g., both the first user interface object 7016' and the second user interface object 7018' are translated in accordance with translational movement of the representation of the user's hand 7020'). The computer system, however, rotates only the first user interface object in the three-dimensional environment relative to the viewpoint in accordance with the rotational movement of the first hand in the physical environment, without rotating the second user interface object in the three-dimensional environment (e.g., the first user interface object 7016' rotates as the representation of the user's hand 7020' is rotated, as shown in various rotational states in FIGS. 7B-7D, but the second user interface object 7018' is not rotated).

In some embodiments, the first spatial relationship requires that the respective characteristic position of the first user interface object has a same distance or is closer to the viewpoint as compared to the first anchor position, and the second spatial relationship requires that the respective characteristic position of the second user interface object is farther away from the viewpoint as compared to the first anchor position. For example, in some embodiments, the first user interface object appears to overlay or replace display of a portion of the surface of the representation of the first hand of the user, while the second user interface object appears to be displayed behind the representation of the first hand relative to the viewpoint (e.g., beyond an arm's length away from the viewpoint and/or at a viewing distance away from the viewpoint). In some embodiments, the first user interface object moves toward or away from the viewpoint in accordance with the movement of the user's hand toward or away from the user's face, while the second user interface object maintains its distance from the viewpoint irrespective of the movement of the user's hand toward or away from the user's face. In some embodiments, the second user interface object moves sideways and vertically relative to the viewpoint, and in accordance with sideways and vertical movement of the first hand of the user, and does not move in accordance with the first hand moving closer to or father away from the user's face, or rotating around the wrist connected to the first hand. This is shown in FIGS. 7B-7D, where the first user interface object (e.g., the first user interface object 7016') appears closer to the viewpoint as compared to the first anchor position (e.g., the representation of the user's hand 7020'), and the second user interface object (e.g., the second user interface object 7018') is farther away from the viewpoint as compared to the first anchor position. Automatically adjusting a size and/or position and, optionally, the orientation of certain user interface objects relative to a user's hand without adjusting the orientation of other user interface objects relative to the user's hand provides real-time visual feedback as the user moves their hand in the physical environment, thereby providing improved visual feedback to the user.

In some embodiments, the second user interface object is oriented in the first view of the three-dimensional environment in accordance with (e.g., a downward direction of the layout of the second user interface object is aligned with and/or a principle axis of the second user interface object has a relationship with) a direction in the physical environment (e.g., a downward direction in the physical environment (e.g., direction of gravity and/or a downward direction relative to the first display generation component), or a downward direction relative to the orientation of the user in the physical environment (e.g., while the user is on a bed facing upward, on a bed facing sideways, standing facing forward, or standing facing left)). In some embodiments, the second user interface object maintains an upright orientation relative to the user's head and/or to the first display generation component in the currently displayed view of the three-dimensional environment, irrespective of the rotational movement of the user's first hand (e.g., relative to the wrist connected to the first hand in the physical environment). This is shown in FIGS. 7B-7D, for example, where the second user interface object (e.g., the second user interface object 7018') is oriented in the first view of the three-dimensional environment in accordance with a direction in the physical environment (e.g., a downward direction of the layout of the second user interface object 7018' is aligned with the direction of gravity, such that "down" would be directed towards the representation of the floor 7008'). Automatically displaying the orientation of certain user interface objects to remain consistent with respect to the physical environment, or with respect to the user's current perspective of the physical environment, even as a user's perspective changes (e.g., by maintaining an orientation of the user interface object relative to the physical environment as the user's view of the physical space rotates), provides real-time visual feedback as the user changes an orientation relative to the physical environment, thereby providing improved visual feedback to the user.

In some embodiments, the second user interface object is oriented in the first view of the three-dimensional environment in accordance with (e.g., a downward direction of the layout of the second user interface object is aligned with and/or a principle axis of the second user interface object has a relationship with) an upright direction of the first display generation component in the physical environment (e.g., the upright direction of an HMD which corresponds to the upright direction of the head of the user wearing the HMD, the upright direction of a heads-up display which corresponds to the upright direction of the head of the user viewing the content displayed via the heads-up display, or the upright direction of a device with a touch-screen display which corresponds to the upright direction of the head of the user holding up the device for viewing the content displayed via the touch screen). In some embodiments, the upright direction of the first display generation component in the physical environment is not necessarily aligned with the direction of gravity in the physical environment, and is, optionally, at an angle relative to the direction of gravity depending on the tilt angle of the first display generation component in the forward/backward and clockwise/counter-clockwise directions relative to the direction of gravity. In some embodiments, in contrast to the second user interface object, the first user interface object is oriented independently of the orientation of the first display generation component in the physical environment, and is oriented in accordance with an orientation of a surface of the first hand of the user (e.g., the user's palm or the back of the user's hand) in the physical environment. For example, as described with reference to FIGS. 7C-7D, second user interface object 7018' is oriented such that text displayed on the second user interface object 7018' appears right-side-up based on the current orientation of the user's head (e.g., or orientation of the HMD). Automatically displaying the orientation of certain user interface objects to remain consistent with respect to the orientation of the display such that as the user rotates the viewpoint (e.g., by rotating the display), the orientations of the certain user interface objects are maintained, provides real-time visual feedback as the user moves the display, thereby providing improved visual feedback to the user.

In some embodiments, while displaying the second user interface object in a respective view of the three-dimensional environment (e.g., concurrently with the first user interface object in the first view of the three-dimensional environment, or while the first user interface object is not concurrently displayed in the respective view of the three-dimensional environment), the computer system detects a first user input that corresponds to a request to display the second user interface object in the three-dimensional environment without regard to the second spatial relationship to the first anchor position in the three-dimensional environment. In response to detecting the first user input, the computer system moves the second user interface object away from the respective characteristic position that has the second spatial relationship to the first anchor position, to a position that is independent of the location of the first hand of the user in the physical environment. In some embodiments, the position that is independent of the location of the first hand of the user corresponds to a location of the physical environment (e.g., a location selected by the first user input and/or a default location for the second user interface object in the physical environment). In some embodiments, in accordance with movement of the viewpoint of the currently displayed view of the three-dimensional environment, the computer system shows, via the first display generation component, the second user interface object as continuing to be anchored to its position that is independent of the location of the first hand of the user in the physical environment. In some embodiments, the first anchor position moves (e.g., the representation of the user's hand moves in accordance with the user moving the user's hand in the physical environment) and the second user interface object does not move. For example, the second user interface object (e.g., a session user interface object) is placed on a representation of a physical object or a virtual object that moves in the three-dimensional environment. Before placing the second user interface object (e.g., user interface object 7018') on such an object (e.g., a representation of a physical object or a virtual object), the object moves in the three-dimensional environment while the second user interface object is tied to the representation of the hand and does not move with the object. In some embodiments, after the second user interface object is placed on the object, the second user interface object moves with the object and no longer moves with the hand. Allowing a user to easily change an anchor of a user interface object, using an input (e.g., gesture) detected by the computer system, such that the user interface object will no longer follow the user as the user moves, allows the user to use gestures to control the anchor position of the user interface object without requiring the user to navigate through complex menu hierarchies, thereby providing additional control options to the user without cluttering the user's view with additional displayed controls.

In some embodiments, detecting the first user input that corresponds to the request to display the second user interface object in the three-dimensional environment without regard to the second spatial relationship to the first anchor position in the three-dimensional environment includes detecting a first gesture (e.g., an in-air tap gesture or a pinch gesture with two fingers moving away from each other from a touching state, and/or two fingers moving into a touching state) of a second hand of the user. In some embodiments, the first gesture is directed to a first control object displayed at a position in the three-dimensional environment that corresponds to a location of the first hand of the user in the physical environment (e.g., the first gesture is detected when a gaze input is detected at the first control object displayed at the position that corresponds to the location of the first hand, when the first gesture is performed by the second hand at or near a portion of the first hand that corresponds to a display position of the first control object, and/or when the first control object has input focus). In some embodiments, the first control object is a constituent object of the first user interface object. In some embodiments, the first control object is a constituent object of the second user interface object. In some embodiments, the first control object is separate from the first user interface object and the second user interface object in the three-dimensional environment. For example, as described with reference to FIGS. 7H-7I, the user selects a user interface object 7302-1, and in response to the user input, an object 7306 is displayed with the representation 7014' of a physical object (e.g., wherein, in some embodiments, the position of object 7306 was previously tied to the position of the representation of the hand of the user). Providing a button or other user interface control that allows a user to change an anchor of certain user interface objects to be set (e.g., placed) within the three-dimensional environment instead of the user interface object remaining anchored to the initial anchor, which could be relative to the user's hand, provides additional controls for the user without requiring the user to navigate through complex menu hierarchies, thereby providing additional control options to the user without cluttering the user's current view and providing improved visual feedback to the user without requiring additional user input.

In some embodiments, while the second user interface object is displayed at the position that is independent of the location of the first hand of the user in the physical environment, the computer system displays a second control object at a respective position in the three-dimensional environment that corresponds to the location of the first hand in the physical environment. In some embodiments, the second control object is the same as the first control object that is used to send the second user interface object to the position in the three-dimensional environment that is independent of the location of the first hand of the user. In some embodiments, the second control object is a constituent object in the first user interface object that has the first spatial relationship with the first anchor position that corresponds to the location of the first hand in the physical environment. In some embodiments, the second control object is a newly displayed object that is separate from the first user interface object and the second user interface object, and that is displayed at the respective position that is anchored to the location of the first hand (e.g., location of the palm of the first hand, the second hand, or either hand of the user). In some embodiments, while displaying the second control object at the respective position in the three-dimensional environment that corresponds to the location of the first hand in the physical environment, the computer system detects a second gesture (e.g., an in-air tap gesture, or a pinch gesture with two fingers moving away from each other from a touching state, and/or two fingers moving into a touching state) of a second hand of the user, wherein the second gesture is directed to the second control object displayed at the respective position in the three-dimensional environment that corresponds to the location of the first hand of the user in the physical environment (e.g., the second gesture is detected when a gaze input is detected at the second control object displayed at the position that corresponds to the location of the first hand, when the second gesture is performed by the second hand at or near a portion of the first hand that corresponds to a display position of the second control object, and/or when the second control object has input focus). In some embodiments, in response to detecting the second gesture directed to the second control object, the computer system ceases to display the second user interface object at the position that is independent of the location of the first hand of the user in the physical environment. For example, in some embodiments, the computer system ceases to display the second user interface object in the three-dimensional environment. In some embodiments, the computer system moves the second user interface object back to the position that has the second spatial relationship with the first anchor position that corresponds to the location of the first hand of the user. For example, the second user interface object is moved back to the position that is anchored to the position of the first hand of the user and moves in accordance with lateral movement of the first hand, but maintains its orientation independent of the rotational movement of the first hand. For example, as described with reference to FIGS. 7C-7D, after the user sends the user interface object (e.g., user interface object 7018') into the world, a control is displayed in the representation of the user's hand such that the user can toggle (e.g., by selecting the button using an air-gesture, tap input, pinch input, or other input) the object from being displayed in the three-dimensional environment). Providing a button or other user interface control, accessible from (e.g., tied to) the user's hand, that allows the user to seamlessly minimize (e.g., cease display) and/or redisplay a user interface object that is anchored to the three-dimensional environment, provides additional controls for the user displayed in the user's hand without requiring the user to navigate through complex menu hierarchies, thereby providing additional control options to the user without cluttering the user's view with additional displayed controls and providing improved visual feedback to the user without requiring additional user input.

In some embodiments, while displaying the second user interface object in a respective view of the three-dimensional environment (e.g., concurrently with the first user interface object in the first view of the three-dimensional environment, or while the first user interface object is not concurrently displayed in the respective view of the three-dimensional environment) (e.g., while displaying the second user interface object at the position that has the second spatial relationship with the first anchor position, or while displaying the second user interface object at a respective position in the three-dimensional environment that is independent of the location of the first hand of the user), the computer system detects, via the one or more input devices, a second movement of the first hand in the physical environment, wherein the second movement of the first hand causes a representation of the first hand to move out of the respective view of the three-dimensional environment. In some embodiments, in accordance with a determination that the second movement of the first hand has caused the representation of the first hand to move out of the respective view of the three-dimensional environment, and in accordance with a determination that the second user interface object is currently displayed with its characteristic position having the second spatial relationship with the first anchor position, the computer system ceases to display the second user interface object in the respective view of the three-dimensional environment. In accordance with a determination that the second movement of the first hand has caused the representation of the first hand to move out of the respective view of the three-dimensional environment, and in accordance with a determination that the second user interface object is currently displayed at a position that is independent of the location of the first hand, the computer system maintains display of the second user interface object in the respective view of the three-dimensional environment (e.g., irrespective of whether the representation of the first hand is within the respective view of the three-dimensional environment). For example, as described above with reference to FIGS. 7C-7D, after the user has placed the user interface object in the three-dimensional environment, the object remains displayed even as the user's hand moves out of the current view. Automatically maintaining display of certain user interface objects when a user's hand moves out of view, while not maintaining display of other user interface objects when the user's hand moves out of view, depending on whether the respective user interface object is anchored to the user's hand or not, provides real-time visual feedback as the user moves the user's hand out of view and automatically removes certain user interface objects that are tied to the user's hand, thereby providing improved visual feedback to the user when a set of conditions has been met without requiring further user input.

In some embodiments, while displaying the second user interface object in the first view of the three-dimensional environment (e.g., concurrently with their respective characteristic positions having the first and second spatial relationships to the first anchor position that corresponds to the location of the first hand of the user), the computer system detects, via the one or more input devices, a third movement of the first hand in the physical environment, wherein the third movement of the first hand corresponds to a movement of the first anchor position toward or away from the viewpoint corresponding to the first view of the three-dimensional environment. In some embodiments, the position of the viewpoint corresponds to the virtual position of the user's face or eyes in the three-dimensional environment. In some embodiments, the position of the viewpoint corresponds to the virtual position of one or more cameras or the display generation component in the three-dimensional environment. In some embodiments, the position of the viewpoint for a respective view of the three-dimensional environment is the virtual position from which the respective view of the three-dimensional environment would be visible to a virtual viewer. In response to detecting the third movement of the first hand in the physical environment, the computer system changes a size of the second user interface object in accordance with the movement of the first anchor position toward or away from the viewpoint, while maintaining the second spatial relationship between the respective characteristic position of the second user interface object and the first anchor position in the three-dimensional environment (e.g., the second user interface object is enlarged or decreased in size while following the first hand moving toward or away from the face of the user). In some embodiments, the change in size of the second user interface object that is caused by the movement of the first hand is more than the effect of the changed viewing distance of the second user interface object. For example, the angular extent of the second user interface object is enlarged or reduced as a result of the movement of the second user interface object toward or away from the viewpoint that is caused by the movement of the first hand toward or away from the user's face, in accordance with some embodiments. This is shown in FIGS. 7B and 7C, for example, where the third movement of the hand corresponds to a movement of the first anchor position away from the viewpoint corresponding to the first view of the three-dimensional environment (e.g., as reflected in movement of the representation of the user's hand 7020' away from the viewpoint, as shown in FIGS. 7B to 7C), and in response, the computer system changes a size of the second user interface object in accordance with the movement of the first anchor position away from the viewpoint (e.g., the computer system reduces the size of the second user interface object 7018' in FIG. 7C, as compared to FIG. 7B), while maintaining the second spatial relationship between the respective characteristic position of the second user interface object and the first anchor position in the three-dimensional environment (e.g., the second user interface object 7018' remains the same distance from the representation of the user's hand 7020'). Automatically updating a size of certain user interface objects when a user's hand moves closer or farther from the user's view, to maintain a relative scale between the user interface objects and the user's hand, provides real-time visual feedback as the user moves the user's hand closer or farther from the user's view, thereby providing improved visual feedback to the user.

In some embodiments, a size of the second user interface object in the three-dimensional environment (e.g., while the second user interface object is displayed at the respective characteristic position with the second spatial relationship to the first anchor position) is selected based at least in part on a size of the first hand. In some embodiments, a size of the first user interface object in the three-dimensional environment (e.g., while the first user interface object is displayed at the respective characteristic position with the first spatial relationship to the first anchor position) is selected based on a size of the first hand. In some embodiments, the computer system dynamically adjust the sizes of the first user interface object and/or the second user interface object in accordance with the spatial extent of the first hand in the physical environment (e.g., as the first hand opens or closes), as described above with reference to FIG. 7D. Automatically displaying certain user interface objects at a size that is determined based on the user's current hand position such that the user interface object appears at a predefined scale relative to the user's hand, provides real-time visual feedback as the user moves the user's hand to open or close (e.g., which enlarges or reduces the size of the user's hand), thereby providing improved visual feedback to the user.

In some embodiments, an orientation of the first user interface object (e.g., and controls and/or icons displayed in the first user interface object) is selected based on a characteristic orientation of the first hand (e.g., the hand orientation at the time when the first user interface is initially displayed in the three-dimensional environment, or an average hand orientation for a period of time prior to the initial display of the first user interface object). For example, in some embodiments, the direction in which the fingers of the first hand extend away from the palm of the first hand is defined as the upright orientation of the first user interface object that is displayed overlaying (e.g., or replacing display of) a portion of the representation of the palm of the first hand. In some embodiments, the direction in which the thumb of the first hand extends away from the palm of the first hand is defined as the upright orientation of the first user interface object. In some embodiments, the first user interface object appears to be overlaid on, or adhered to, the surface of the representation of the first hand (e.g., on the surface of the palm, or the surface of the back of hand) in the view of the three-dimensional environment. In some embodiments, the first user interface object appears to be positioned perpendicular to the surface of the representation of the first hand (e.g., perpendicular to the surface of the palm, or the surface of the back of hand). This is shown in FIGS. 7B-7D, for example, where the orientation first user interface object (e.g., the first user interface object 7016') is selected based on a characteristic orientation of the first hand (e.g., as reflected by the various rotational states of the representation of the user's hand 7020' in FIGS. 7B-7D). Automatically displaying certain user interface objects as having an orientation that is updated based on the orientation of the user's hand as the user's hand moves, provides real-time visual feedback as the user moves the user's hand, thereby providing improved visual feedback to the user.

In some embodiments, the first user interface object is a control panel including a plurality of user interface objects corresponding to different device control functions (e.g., volume control, display brightness control, network connection control, and/or media player controls) of the computer system (e.g., and/or the input devices, output devices, network equipment, peripheral devices and/or other devices that are in communication with the computer system). In some embodiments, the first user interface object that includes the control panel is displayed overlaying, or replacing display of, a representation of the back of the first hand in the first view of the three-dimensional environment. In some embodiments, when the representation of the palm of the first hand is displayed in the first view of the three-dimensional environment, the computer system ceases to display the control panel, and displays another user interface object (e.g., a launch pad, a dock and/or a home button) overlaying, or replacing display of, the representation of the palm of the first hand. For example, as described with reference to FIGS. 7B-7D, a second set of controls (e.g., a control center including a plurality of selectable user interface elements for controlling various device functions) is anchored to a the back of the user's hand (e.g., while another set of controls in anchored to the user's palm). Providing a button or other user interface control for controlling system functions of the device that is easily accessible and tied to the user's hand, provides additional controls for the user that are easily accessed by the user moving the user's hand into view, without requiring the user to navigate through complex menu hierarchies, thereby providing additional control options to the user without cluttering the user's view with additional displayed controls and providing improved visual feedback to the user without requiring additional user input.

In some embodiments, the first user interface object is a dock including a plurality of user interface objects corresponding to different applications or experiences (e.g., application icons, icons that when activated causes display of corresponding computer-generated reality experiences and/or icons that correspond to users that, when activated, causes initiation of communication sessions with the users), wherein a respective user interface object in the dock, when activated, causes the computer system to initiate display of a respective application or computer-generated reality experience. In some embodiments, the first user interface object that includes the dock is displayed overlaying, or replacing display of, a representation of the palm of the first hand in the first view of the three-dimensional environment. In some embodiments, when the representation of the back of the first hand is displayed in the first view of the three-dimensional environment, the computer system ceases to display the dock, and displays another user interface object (e.g., a control panel and/or media player controls) overlaying, or replacing display of, the representation of the back of the first hand, as described above with reference to FIGS. 7B-7D. In some embodiments, the placement of the control panel and the dock are reversed (e.g., control panel is displayed when the palm of the first hand is displayed, and dock is displayed when the back of the first hand is displayed). Providing different sets of user interface controls such that one set is available on the front of the user's hand (e.g., in the user's palm) and another set is available on the back of the user's hand, provides additional controls for the user, such that the user can easily access the desired controls by flipping the user's hand to display the front or back of the user's hand to switch the set of controls that are displayed, without requiring the user to navigate through complex menu hierarchies, thereby providing additional control options to the user without cluttering the user's view with additional displayed controls and providing improved visual feedback to the user without requiring additional user input.

In some embodiments, while displaying the first user interface object (and, optionally, the second user interface object) in the first view of the three-dimensional environment (e.g., with their respective characteristic positions having the first and second spatial relationships to the first anchor position that corresponds to the location of the first hand of the user), the computer system detects, via the one or more input devices, a second movement of the first hand in the physical environment. In some embodiments, the second movement of the first hand causes a first side of the first hand (e.g., the side of the first hand that is currently visible in the first view and/or the side of the first hand that is facing toward the user) to turn away from the viewpoint corresponding to the first view of the three-dimensional environment. In response to detecting the second movement of the first hand in the physical environment and in accordance with a determination that the visibility of the first side of the first hand in the first view of the three-dimensional environment is below a threshold amount of visibility (e.g., less than a threshold portion of the first side of the first hand remains in the first view and/or the angle of the first side of the first hand is outside a range of angles relative to the viewpoint), the computer system displays a third user interface object, different from the first and second user interface objects, overlaying or replacing display of a portion of a second side of the first hand in the three-dimensional environment (and, optionally, the computer system ceases to display the first user interface object in the three-dimensional environment). In some embodiments, the first user interface object gradually fades out as the first side of the first hand turns away from the viewpoint, and the second side of the first hand turns toward the viewpoint. In some embodiments, in response to detecting the second movement of the first hand in the physical environment, and in accordance with a determination that visibility of the first side of the first hand in the first view of the three-dimensional environment is above the threshold amount of visibility (e.g., more than a threshold portion of the first side of the first hand remains in the first view and/or the angle of the first side of the first hand is within a range of angles relative to the viewpoint), the computer system forgoes display of the third user interface object in the three-dimensional environment (and optionally, rotates the first user interface object in accordance with turning of the first side of the first hand in the three-dimensional environment (e.g., such that the first spatial relationship between the respective characteristic position of the first user interface object and the first anchor position is maintained in the three-dimensional environment) (e.g., the first user interface object rotates with the rotational movement of the representation of the first side of the first hand away from the viewpoint). For example, as described with reference to FIG. 7C, the first user interface object 7016' is visually deemphasized (e.g., blurs, fades, and/or shrinks) while the user's hand rotates. Automatically displaying certain user interface objects with visual effects, such as fading the objects, that are applied gradually in accordance with an amount of change in rotation or orientation of the user's hand, provides real-time visual feedback as the user rotates the user's hand, thereby providing improved visual feedback to the user.

In some embodiments, while displaying at least one of the first user interface object and the second user interface object in the first view of the three-dimensional environment (e.g., with their respective characteristic positions having the first and second spatial relationships to the first anchor position that corresponds to the location of the first hand of the user), the computer system detects, via the one or more input devices, a third movement of the first hand in the physical environment, wherein the third movement of the first hand reduces a spatial extent of a representation of a first side of the first hand (e.g., the side of the first hand that is currently visible in the first view and/or the side of the first hand that is facing toward the user) in the first view of the three-dimensional environment (e.g., due to turning/tilting of the first hand and/or closing of the first hand). In some embodiments, in response to detecting the third movement of the first hand in the physical environment, the computer system reduces the visual prominence of the at least one of the first user interface object and the second user interface object in the first view of the three-dimensional environment (e.g., by blurring, darkening, fading out, making more translucent and/or shrinking the at least one of the first user interface object and the second user interface object, where a magnitude of the change of visual prominence is based on a magnitude of the third movement of the first hand). In some embodiments, only one of the first and second user interface objects (e.g., the first user interface object and not the second user interface object, or the second user interface object and not the first user interface object) undergoes the reduction of visibility described above. In some embodiments, both the first and the second user interface objects undergo the reduction of visibility described above. For example, as described with reference to FIG. 7C, the first user interface object 7016' is visually deemphasized (e.g., blurs, fades, and/or shrinks) while the user's hand tilts or closes. Automatically displaying certain user interface objects with different visual effects, such as fading the objects, in accordance with an orientation or position of the user's hand changing, provides real-time visual feedback as the user tilts or performs other movements with the user's hand, thereby providing improved visual feedback to the user.

In some embodiments, while displaying at least one of the first user interface object and the second user interface object (e.g., the first user interface object and not the second user interface object or the second user interface object and not the first user interface object, the first and second user interface objects) in the first view of the three-dimensional environment (e.g., with their respective characteristic positions having the first and second spatial relationships to the first anchor position that corresponds to the location of the first hand of the user), the computer system detects, via the one or more input devices, a fourth movement of the first hand in the physical environment. In some embodiments, in response to detecting the fourth movement of the first hand in the physical environment, in accordance with a determination that the fourth movement of the first hand causes a representation of the first hand to exit the first view of the three-dimensional environment (e.g., due to translation of the first hand out of the field of view of the cameras), and a determination that a first side of the first hand (e.g., palm side or back of hand) was facing toward the viewpoint of the first view of the three-dimensional environment when the representation of the first hand exited the first view of the three-dimensional environment, the computer system maintains display the at least one of the first user interface object and the second user interface object in the first view of the three-dimensional environment (e.g., at the edge of the first view and/or at a default position in the first view). In some embodiments, in accordance with a determination that the fourth movement of the first hand causes the representation of the first hand to exit the first view of the three-dimensional environment (e.g., due to translation of the first hand out of the field of view of the cameras), and a determination that the first side of the first hand (e.g., palm side or back of hand) was not facing toward the viewpoint of the first view of the three-dimensional environment when representation of the first hand exited the first view of the three-dimensional environment (e.g., due to turning or closing of the first hand), the computer system ceases display of the at least one of the first user interface object and the second user interface object in the first view of the three-dimensional environment. In some embodiments, the computer system ceases to display the at least one of the first and second user interface objects in accordance with a determination that the first side of the first hand (e.g., palm side or back of hand) is no longer facing toward the viewpoint of the first view of the three-dimensional environment (e.g., due to turning or closing of the first hand), without requiring the representation of the first hand to exit the first view of the three-dimensional environment, as described with reference to FIGS. 7B-7D. Automatically maintaining display of certain user interface objects when a user's hand moves out of view based on the hand facing in (e.g., turned to) a first direction, while not maintaining display of other user interface objects when a user's hand is facing in a second direction, provides real-time visual feedback as the user moves the user's hand to face different directions and out of view and automatically updates the user's current view based on the position of the user's hand, thereby providing improved visual feedback to the user automatically when a set of conditions has been met without requiring further user input.

In some embodiments, the first hand is a non-dominant hand associated with the user, and in accordance with a determination that the first hand is the non-dominant hand associated with the user, the computer system displays the first user interface object and the second user interface object with the first and second spatial relationships to the first anchor position in the three-dimensional environment that corresponds to the location of the first hand, while both the first hand and a second hand of the user are visible in the first view of the three-dimensional environment. For example, in some embodiments, the computer system registers or detects that the first hand is a non-dominant hand of the user, and places one or both of the first user interface object and the second user interface object relative to the representation of the first hand, even though representations of both hands of the user may be within the first view of the three-dimensional environment (e.g., at the moment). In some embodiments, the computer system, by default, positions one of the first and second user interface objects (e.g., the first user interface object and not the second user interface object, or the second user interface object and not the first user interface object) relative to the position of the representation of the non-dominant hand in the three-dimensional environment, and does not impose such restriction on the other of the first and second user interface objects. In some embodiments, the non-dominant hand is selected automatically by the computer system based on monitored usage of the hand. In some embodiments, the non-dominant hand is set by the user (e.g., in a settings interface), or is selected during an initial set-up of the computer system, as described above with reference to FIG. 7B. Automatically determining a user's non-dominant hand and assigning a user interface object as being tied to the user's non-dominant hand, provides the user with real-time visual feedback that automatically displays the user interface object when the user's non-dominant hand is detected as being within the user's current view, thereby performing an operation when a set of conditions has been met without requiring further user input.

In some embodiments, prior to displaying the second user interface object with the respective characteristic position of the second user interface object having the second spatial relationship to the first anchor position in the three-dimensional environment, the computer system moves the second user interface object from an initial position to the respective characteristic position of the second user interface object in the first view of the three-dimensional environment, wherein the initial position of the second user interface object is closer to the first anchor position in the three-dimensional environment than respective characteristic position of the second user interface object with the second spatial relationship with the first anchor position. For example, as described with reference to FIGS. 7C-7D, in some embodiments, the computer system shows the second user interface object popping out of the representation of the first hand and moving to the position that has the second spatial relationship to the first anchor position on the representation of the first hand. Automatically updating the display of the user's hand to display a user interface object appearing from the user's hand, before the user interface object follows the representation of the user's hand as the user's hand moves within the three-dimensional environment, provides real-time visual feedback as the user moves the user's hand closer or farther from the user's view, thereby providing improved visual feedback to the user.

In some embodiments, while displaying at least one of the first user interface object and the second user interface object (e.g., the first user interface object and not the second user interface object, the second user interface object and not the first user interface object or the first and second user interface objects) in the first view of the three-dimensional environment (e.g., with their respective characteristic positions having the first and second spatial relationships to the first anchor position that corresponds to the location of the first hand of the user), the computer system detects, via the one or more input devices, an input directed to a respective user interface object of the at least one of the first user interface object and the second user interface object. In response to detecting the input that is directed to the respective user interface object of the at least one of the first user interface object and the second user interface object, and in accordance with a determination that the input meets activation criteria, the computer system performs an operation corresponding to the activation of the respective user interface object of the at least one of the first user interface object and the second user interface object, wherein the activation criteria are capable of being met by either: a gaze input directed to the respective user interface object in conjunction with a first gesture of a second hand of the user detected away from the characteristic position of the respective user interface object, or a second gesture detected at a location corresponding to the characteristic position of the respective user interface object, as described above with reference to FIGS. 7C-7D. Automatically performing an operation in response to detecting any one of a plurality of possible user inputs (e.g., gestures), provides additional controls for the user without requiring the user to navigate through complex menu hierarchies, and provides the user with flexibility to perform an operation in response to a variety of gestures, thereby providing improved visual feedback to the user and reducing the number of inputs needed to perform an operation.

In some embodiments, while displaying at least one of the first user interface object and the second user interface object (e.g., the first user interface object and not the second user interface object, or the second user interface object and not the first user interface object, the first and second user interface objects) in the first view of the three-dimensional environment (e.g., with their respective characteristic positions having the first and second spatial relationships to the first anchor position that corresponds to the location of the first hand of the user), the computer system detects, via the one or more input devices, a first gaze input directed to a respective user interface object of the at least one of the first user interface object and the second user interface object. In some embodiments, in response to detecting the first gaze input that is directed to the respective user interface object of the at least one of the first user interface object and the second user interface object, the computer system displays an expanded version of the respective user interface object (e.g., enlarging, showing additional information, and/or displaying additional constituent objects of the respective user interface object), as described above with reference to FIGS. 7C-7D. Displaying an expanded view of a user interface object in response to the user gazing at the user interface object, without requiring additional user input, such that the expanded user interface object includes additional controls, provides real-time visual feedback to the user as the user gazes at various objects and provides additional controls for the user without requiring the user to navigate through complex menu hierarchies, thereby providing improved visual feedback to the user and reducing the number of inputs needed to perform an operation.

It should be understood that the particular order in which the operations in FIG. 8 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 9000 and 10000) are also applicable in an analogous manner to method 8000 described above with respect to FIG. 8. For example, the gestures, gaze inputs, physical objects, user interface objects, controls, movements, criteria, three-dimensional environment, display generation component, surface, representation of physical object, virtual objects, and/or animations described above with reference to method 8000 optionally have one or more of the characteristics of the gestures, gaze inputs, physical objects, user interface objects, controls, movements, criteria, three-dimensional environment, display generation component, surface, representation of physical object, virtual objects, and/or animations described herein with reference to other methods described herein (e.g., methods 9000 and 10000). For brevity, these details are not repeated here.

Figure 9:
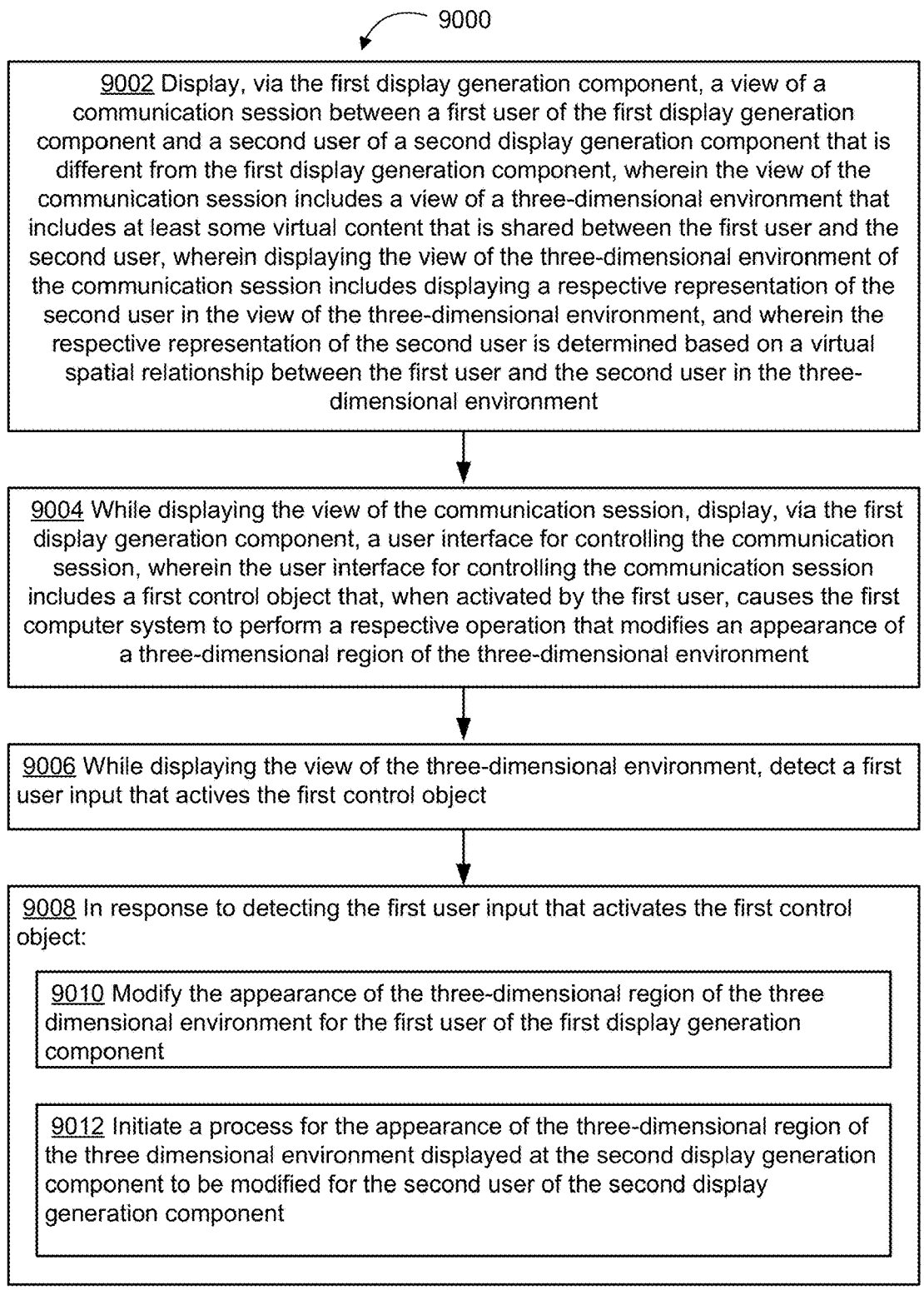
FIG. 9 is a flowchart of a method for modifying the appearance of a shared view of a communication session between multiple users, in accordance with some embodiments.

FIG. 9 is a flowchart of a method 9000 for modifying the appearance of a shared view of a communication session (e.g., a shared three-dimensional environment) between multiple users, in accordance with some embodiments.

In some embodiments, the method 9000 is performed at a first computer system (e.g., the computer system 101 in FIG. 1, the computer system described with respect to FIGS. 7A-7D, FIGS. 7E-7F, and FIGS. 7G-7J). In some embodiments, the first computer system is in communication with a first display generation component (e.g., display generation component 7100, another display generation component, a heads-up display, a head-mounted display (HMD), a display, a touchscreen, and/or a projector) and one or more input devices (e.g., cameras or other sensors and input devices that detect movement of the user's hand(s), movement of the user's body as whole, and/or movement of the user's head in the physical environment; e.g., controllers, touch-sensitive surfaces, joysticks, buttons, gloves, watches, motion sensors, and/or orientation sensors). In some embodiments, the first display generation component is a display generation component 7100 described with respect to FIGS. 7A-7D, FIGS. 7E-7F, and FIGS. 7G-7J. In some embodiments, the first display generation component is a heads-up display that does not move or rotate with the user's head or the user's body as a whole, but, optionally, changes the viewpoint of the user into the three-dimensional environment in accordance with the movement of the user's head or body relative to the first display generation component. In some embodiments, the first display generation component is optionally moved and rotated by the user's hand relative to the physical environment or relative to the user's head, and changes the viewpoint of the user into the three-dimensional environment in accordance with the movement of the first display generation component relative to the user's head or face or relative to the physical environment. Many of the features of the method 9000 are described with respect to FIGS. 7E-7F, in accordance with some embodiments.

The method 9000 disclosed herein relates to displaying selectable controls that allow a user to adjust various applications and other settings related to other users that are currently interacting with the user (e.g., in a communication session). Displaying selectable options for activating applications and receiving selection and/or activation inputs directed to the selectable options, including options to modify a shared three-dimensional environment during a communication session provides real-time visual feedback as the user selects various options, provides real-time visual feedback as the user activates various options to modify the shared three-dimensional environment, and provides additional controls to the user while the user is participating in a communication session without requiring the user to navigate through complex menu hierarchies. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In the method 9000, the first computer system displays (9002), via the first display generation component, a view of a communication session between a first user of the first display generation component and a second user of a second display generation component that is different from the first display generation component (e.g., the first user and the second user are engaged in a meeting and/or a game in a shared three-dimensional environment), wherein the view of the communication session includes a view of a three-dimensional environment that includes at least some virtual content that is shared between the first user and the second user. Displaying the view of the three-dimensional environment of the communication session includes displaying a respective representation of the second user in the view of the three-dimensional environment, and the respective representation of the second user is determined based on a virtual spatial relationship between the first user and the second user in the three-dimensional environment.

While displaying the view of the communication session, the first computer system displays (9004) (e.g., within the view of the communication session, within the view of the three-dimensional environment, or next to the view of the three-dimensional environment), via the first display generation component, a user interface for controlling the communication session. In some embodiments, the user interface for controlling the communication session includes a first control object that, when activated by the first user (e.g., by a gesture in combination with a gaze input directed to the first control object (e.g., an indirect gesture), or by a gesture detected at a location that corresponds to the position of the first control object (e.g., a direct gesture)), causes the first computer system to perform a respective operation that modifies an appearance of a three-dimensional region of the three-dimensional environment (e.g., changes the virtual wallpaper of the three-dimensional environment, changes virtual lighting in the three-dimensional environment, adds, removes, and/or changes virtual scenery, virtual lighting, and/or virtual wallpaper in the three-dimensional environment).

While displaying the view of the three-dimensional environment, the first computer system detects (9006) a first user input that actives the first control object.

In response to detecting (9008) the first user input that activates the first control object, the first computer system modifies (9010) the appearance of the three-dimensional region of the three dimensional environment for the first user of the first display generation component (e.g., changes the virtual augmentation of the representation of the physical environment in the view of the three-dimensional environment) (e.g., changes the virtual wallpaper of the three-dimensional environment, changes virtual lighting in the three-dimensional environment, adds, removes, or changes virtual scenery, virtual lighting, and/or virtual wallpaper in the three-dimensional environment).

The first computer system initiates (9012) a process for (e.g., causes) the appearance of the three-dimensional region of the three dimensional environment displayed at the second display generation component to be modified for the second user of the second display generation component. For example, in some embodiments, the same modifications that are applied to the appearance of the three-dimensional region of the three-dimensional environment (e.g., the change in virtual wallpaper, virtual lighting, and/or virtual scenery applied to the three-dimensional region shown to the first user via the first display generation component) are also applied to the three-dimensional region shown to the second user via the second display generation component. In some embodiments, the modifications that are applied to the appearance of the three-dimensional region shown to the second user via the second display generation component are determined in accordance with (e.g., in accordance with a correspondence relationship (e.g., offset in timing (e.g., a difference in time of day or season between locations of the first user and the second user), offset in direction (e.g., facing opposite directions, or facing directions selected based on current facing directions of the first and second users), offset in spatial location (e.g., separated according virtual locations of the first and second users), or other properties that are offset between the first user and the second user)) the modifications that are applied to the appearance of the three-dimensional region of the three-dimensional environment (e.g., the change in virtual wallpaper, virtual lighting, and/or virtual scenery) applied to the three-dimensional region shown to the first user via the first display generation component. This is shown in FIGS. 7E and 7F, for example, where the first computer system displays a user interface for controlling the communication session (e.g., user interface 7206'), including a first control object (e.g., affordance 7206-1'). When the first control object is activated, the first computer system modifies the appearance of a three-dimensional region of the three dimensional environment for the first user of the first display generation component (e.g., the computer system modifies the virtual floor **7008-*t'* as shown on the display generation component 7100). The first computer system also initiates a process for the appearance of the three-dimensional region of the three dimensional environment displayed at the second display generation component to be modified for the second user of the second display generation component (e.g., the virtual floor 7008-*t'* is also modified for the display generation component 7102**).

In some embodiments, while displaying the view of the communication session, the first computer system displays (e.g., within the view of the communication session, within the view of the three-dimensional environment, or next to the view of the three-dimensional environment) respective user interfaces of one or more applications that are shared in the communication session (e.g., are currently accessible (e.g., viewable, visible, and/or controllable) to the participants of the communication session). In some embodiments, when a respective application is shared by one participant of the communication session, the user interface of the respective application is displayed in the view of the communication session for multiple participants of the communication session. In some embodiments, the respective user interfaces of the one or more shared applications are displayed with respective indications that correspond to the identities of the users that shared the applications. For example, an avatar or color scheme of the first user is displayed on the user interface of a first application that is shared by the first user, and/or an avatar or color scheme of the second user is displayed on the user interface of a second application that is shared by the second user. In some embodiments, an application that is shared in the communication session accepts user inputs provided by multiple participants (e.g., the first user and the second user) of the communication session via their respective input devices. In some embodiments, the application user interface is visible to multiple participants, but only accepts user input from one of the participants (e.g., the user that shared the application, or another user that has current control of the application). For example, as described with reference to FIGS. 7E-7F, the computer system optionally displays indications of one or more active applications (e.g., applications that are shared in the ongoing communication session. Automatically displaying active applications, with an indication of the user who shared the respective application, that are currently being used or shared via a communication session with other users provides real-time visual feedback as the shared active applications are updated in real-time by the user or another user, thereby providing improved visual feedback to the user.

In some embodiments, while displaying the view of the communication session, the first computer system displays (e.g., within the view of the communication session, within the view of the three-dimensional environment, next to the view of the three-dimensional environment, or within the user interface for controlling the communication session) a second control object that, when activated (e.g., by a gesture in combination with a gaze input directed to the second control object, or by a gesture detected at a location that corresponds to the position of the second control object), causes the first computer system to perform a respective operation that ceases to share a first application that is currently shared in the communication session. In some embodiments, while displaying the view of the three-dimensional environment, the first computer system detects a user input from the first user that actives the second control object. In some embodiments, in response to detecting the user input that activates the second control object, the first computer system initiates a process for (e.g., causes) the user interface of the first application to cease to be displayed at the second display generation component (e.g., in accordance with a determination that the first user was the user that initially shared the first application in the communication session). In some embodiments, the first computer system, in response to detecting the user input, optionally, closes the first application at the first computer system, ceases to display the first application in the view of the three-dimensional environment at the first display generation component, or moves the user interface of the first application to another three-dimensional region of the three-dimensional environment that is not shared with other participant of the communication session (e.g., a region that is private to the first user, or private to a smaller subset of the participants identified by the first user). In some embodiments, the first computer system displays the second control object in the user interface for controlling the communication session in response to the first user's request to share the first application in the communication session and in conjunction with sharing the first application in the communication session. In some embodiments, the first computer system ceases to display the second control object in the user interface for controlling the communication session in response to the first user's request to stop sharing the first application (e.g., through activation of the second control object) in the communication session and in conjunction with performing the operation to stop sharing the first application in the communication session. For example, as described with reference to FIGS. 7E-7F, the computer system displays an option to remove (e.g., close) a shared application. Providing a button or other user interface control that allows a user to remove display of a shared application while participating in a communication session, provides additional controls for the user without requiring the user to navigate through complex menu hierarchies, thereby providing improved visual feedback to the user without requiring additional user input.

In some embodiments, while displaying the view of the communication session, the first computer system displays (e.g., within the view of the communication session, within the view of the three-dimensional environment, next to the view of the three-dimensional environment, or within the user interface for controlling the communication session) a respective identifier corresponding to a currently selected virtual augmentation that is applied to the three-dimensional environment (e.g., an icon and/or textual description of a virtual wallpaper, color scheme, environment, theme, and/or virtual scenery). In some embodiments, the first computer system allows the first user to customize the virtual augmentation that is applied to the three-dimensional environment that is shown at the first display generation component, and/or shared among multiple participants of the communication session. In some embodiments, the virtual augmentation includes various virtual elements and/or visual effects that are applied to the view of the physical environment in the three-dimensional environment, or the virtual three-dimensional environment of the communication session. In some embodiments, the virtual augmentation includes virtual objects, surfaces, overlays, lighting, and/or scenery that are designed to make the three-dimensional environment have a look and feel of a selected theme, natural environment, and/or physical scene. In some embodiments, the respective identifier corresponding to the currently selected virtual augmentation is displayed with a selection indicator (e.g., a checkmark in a checkbox, or a selector that visually distinguishes the respective identifier from the identifiers of other unselected virtual augmentations). In some embodiments, selecting the respective identifier by a user input causes the first computer system to display the respective identifier for the currently selected virtual augmentation along a listing of identifiers corresponding to different virtual augmentations that are available to be selected and applied to the three-dimensional environment. In some embodiments, multiple sets of virtual augmentations are simultaneously applied to the three-dimensional environment or the view of the three-dimensional environment shown at the first display generation component, and the respective identifiers of the multiple sets of virtual augmentations are visually indicated in the view of the communication session (e.g., in the user interface for controlling the communication session and/or overlaid on the view of the three-dimensional environment). In some embodiments, each set of virtual augmentation is, optionally, displayed with corresponding sound effects (e.g., sounds of nature, waves, wind, insects, animals, traffic, or music) that correspond to the visual elements of the virtual augmentation. This is shown in FIG. 7F, for example, where the first computer system displays a respective identifier corresponding to a currently selected virtual augmentation that is applied to the three-dimensional environment (e.g., the affordance 2016-1' is displayed with an outline indicating it is the currently selected virtual augmentation). Automatically displaying indications that describe properties of a currently active virtual environment, provides real-time visual feedback as the user views different virtual environments, thereby providing improved visual feedback to the user.

In some embodiments, while displaying the view of the communication session, the first computer system displays (e.g., within the view of the communication session, within the view of the three-dimensional environment, or next to the view of the three-dimensional environment, within the user interface for controlling the communication session) a third control object that, when activated, causes the first computer system to remove a first set of currently selected virtual augmentations that is applied to the three-dimensional environment (e.g., a set of virtual wallpaper, color scheme, environment, virtual decal corresponding to a respective theme, and/or virtual scenery). In some embodiments, the first computer system allows the first user to customize the virtual augmentation that is applied to the three-dimensional environment that is shown at the first display generation component, or shared among multiple participants of the communication session. In some embodiments, the virtual augmentation includes various virtual elements and/or visual effects that are applied to the view of the physical environment in the three-dimensional environment, or the virtual three-dimensional environment of the communication session. In some embodiments, the virtual augmentation includes virtual objects, surfaces, overlays, lighting, and/or scenery that are designed to make the three-dimensional environment have a look and feel of a selected theme, natural environment, and/or physical scene. In some embodiments, the first computer system displays respective identifiers corresponding to the currently selected set(s) of virtual augmentation with respective selection indicators (e.g., a checkmark in a checkbox, or a selector that visually distinguishes the respective identifier from the identifiers of other unselected virtual augmentations), and the selection indicators can be used as the control objects to remove corresponding sets of virtual augmentation individually. In some embodiments, the first computer system provides a control object that, when activated, removes all currently applied sets of virtual augmentation or subsets of the currently applied virtual augmentation from the three-dimensional environment. For example, as described with reference to FIGS. 7E, the user is enabled to change the immersive experience, including removing the immersive experience from the current view (e.g., or decreasing a level of immersion). Providing a button or other user interface control that allows a user to remove display of a currently active virtual environment, provides additional controls for the user without requiring the user to navigate through complex menu hierarchies, thereby providing improved visual feedback to the user without requiring additional user input.

In some embodiments, while displaying the view of the communication session, the first computer system displays (e.g., within the view of the communication session, within the view of the three-dimensional environment, or next to the view of the three-dimensional environment, within the user interface for controlling the communication session) a fourth control object that, when activated, causes the first computer system to perform a respective operation that shares a respective set of virtual augmentations that is available to be applied to the three-dimensional environment (e.g., a set of virtual wallpaper, color scheme, environment, virtual decal corresponding to a respective theme, and/or virtual scenery) with at least one other participant of the communication session (e.g., the second user and/or a third user using a third display generation component). In some embodiments, after the at least one other participant (e.g., a subset less than all, or all of the other participants) accepts the sharing of the respective set of virtual augmentation, the first computer system, in response to selection of the respective set of virtual augmentation to modify the appearance of the three-dimensional environment by the first user, modifies the appearance of the view of the three-dimensional environment shown at the first display generation component in accordance with the respective set of virtual augmentation, and the first computer system initiates a process to cause the computer system of the at least one other participant to modify the view of the three-dimensional environment displayed to the at least one other participant in accordance with the respective sets of virtual augmentation. For example, as described with reference to FIGS. 7E, the user is enabled to change the virtual scenery of the shared three-dimensional environment 7207'. Providing a button or other user interface control that allows a user to share a currently active virtual environment with one or more other users that are in a communication session with the user, provides additional controls for the user without requiring the user to navigate through complex menu hierarchies, thereby providing improved visual feedback to the user without requiring additional user input.

In some embodiments, while displaying the view of the communication session, the first computer system displays (e.g., within the view of the communication session, within the view of the three-dimensional environment, next to the view of the three-dimensional environment, or within the user interface for controlling the communication session) an indicator of a current level of immersion at which the view of the communication session is displayed, wherein the current level of immersion is selected from a first level of immersion and a second level of immersion, and wherein the second level of immersion includes reduced pass-through of a physical environment in the view of the communication session (e.g., reduced degree or scope of content from the physical environment that is passed through to the three-dimensional environment). In some embodiments, the first level of immersion is an augmented reality view of the physical environment surrounding the first user, and the second level of immersion is a virtual reality view without a representation of the physical environment. In some embodiments, the first level of immersion and the second level of immersion are both augmented reality views of the physical environment, but the view of the communication session displayed at the second level of immersion includes more virtual content that modifies the view of the physical environment than the view of the communication session displayed at the first level of immersion. In some embodiments, the first level of immersion has more audio pass-through of the sounds from the physical environment, while the second level of immersion has less audio pass-through of the sounds from the physical environment. In some embodiments, the first computer system displays a respective control object (e.g., a button, a selector, a switch, or a slider control) that, in accordance with user inputs activating the respective control object, discretely switches between different levels of immersion for the view of the communication session, or gradually adjust the level of immersion for the view of the communication session, as described above with reference to FIG. 7E. Automatically displaying indications that describe a current level of immersion of a virtual environment, and providing the user with control options to change a current level of immersion, provides real-time visual feedback as the user changes an amount of pass-through for a current virtual session, thereby providing improved visual feedback to the user.

In some embodiments, while displaying the view of the communication session, the first computer system displays (e.g., within the view of the communication session, within the view of the three-dimensional environment, next to the view of the three-dimensional environment, or within the user interface for controlling the communication session) respective representations of one or more participants of the communication session in a control region (e.g., displays a listing of avatars of users that are participating in the communication session in a control region of the communication session). In some embodiments, the respective representations of the one or more participants shown in the control region are distinct from respective representations of the one or more participants shown in the view of the three-dimensional environment (e.g., the respective representation of the second user that is displayed in the view of the three-dimensional environment in accordance with the virtual spatial relationship between the first user and the second user in the three-dimensional environment). In some embodiments, as more users join and/or leave the communication session, the first computer system changes the appearances of the respective representations of the users shown in the control region, to indicate whether the users are currently in the communication session (e.g., with their representations lit up, or highlighted) or have left the communication session (e.g., with their representations dimmed or grayed out). In some embodiments, the first computer system changes the appearances of the representations of the participants to indicate whether they are currently active in the communication session. For example, if a participant is currently performing an action, moving, and/or speaking, the participant's respective representation in the control region is highlighted (e.g., lit up or blinking), and if the participant stops actively participating in the communication session (e.g., stops talking, is muted, is missing from the camera view, and/or has not participated for a time period), the participant's respective representation in the control region is no longer highlighted relative to the respective representations of other participants in the control region. For example, as described with reference to FIG. 7E, representations of active users in a communication session are displayed (e.g., with status indicators). Automatically displaying indications that describe properties of a currently active users in a communication session, provides real-time visual feedback as the activity of users in the communication session changes, thereby providing improved visual feedback to the user.

In some embodiments, while displaying the view of the communication session, the first computer system displays a first selectable option in association with a visual indication of a respective participant in the control region, wherein the first selectable option, when activated, removes the respective participant from the communication session. In some embodiments, the selectable option is displayed in association with the respective participant in response to selection of the respective representation of the participant in the control region. In some embodiments, the selectable option is displayed (e.g., in response to selection of the respective representation of the participant) when the participant is active in the communication session, and the selectable option is not displayed when the participant is not active in the communication session. In some embodiments, the first computer system detects a user input activating the first selectable option in association with the second user, and, in response to the user input, the first computer system removes the second user from the communication session, ceases to display the respective representation of the second user in the view of the three-dimensional environment and ceases to display the second user as active in the communication session, and causes the representation of the second user to be removed from views of the three-dimensional environment shown to other participants of the communication session. For example, as illustrated in FIG. 7E, controls 7204' are displayed for that controlling settings of the user (and of other participants) in a communication session. Providing a button or other user interface control that allows a user to remove one or more currently active users that are participating in a communication session, provides additional controls for the user without requiring the user to navigate through complex menu hierarchies, thereby providing improved visual feedback to the users without requiring additional user input.

In some embodiments, while displaying the view of the communication session, the first computer system displays a second selectable option in association with a visual indication of a respective participant in the control region, wherein the second selectable option, when activated, mutes audio input from the respective participant in the communication session. In some embodiments, the selectable option is displayed in association with the respective participant in response to selection of the respective representation of the participant in the control region. In some embodiments, the selectable option is displayed (e.g., in response to selection of the respective representation of the participant) when the participant is active or generating audio output in the communication session, and the selectable option is not displayed when the participant is not active or generating audio output in the communication session. In some embodiments, the first computer system detects a user input activating the second selectable option in association with the second user; and in response to the user input, the first computer system mutes the audio input of the second user in the communication session, so audio output is no longer generated for the first user and other participants of the communication session. In some embodiments, activation of the second selectable option in association with the second user does not mute the second user for other participants of the communication session, and only mutes the second user for the user (e.g., the first user) that activated the second selectable option in association with the second user. For example, as described with reference to FIG. 7E, additional controls 7204' includes a button for the user to mute the user and/or to mute other users participating in the communication session. Providing a button or other user interface control that allows a user to mute the user and/or one or more other users that are in a communication session with the user, provides additional controls for the user without requiring the user to navigate through complex menu hierarchies, thereby providing additional control options to the user without cluttering the user's view with additional displayed controls.

In some embodiments, while displaying the view of the communication session, the first computer system displays a third selectable option in association with a visual indication of a respective participant in the control region, wherein the third selectable option, when activated, causes the respective representation of the respective participant to be removed from the view of the three-dimensional environment. In some embodiments, the respective participant continues to participate in the communication session using his/her computer system and display generation component, and the computer system of the respective participant continues to show a view of the three-dimensional environment that includes the respective representations of other participants in the communication session. In some embodiments, each participant of the communication session is allowed to individually control which other participants are hidden or shown in their own view of the three-dimensional environment. For example, based on the selection of the first user, the first computer system shows the representation of the second user and the representation of a third user in the view of the three-dimensional environment displayed to the first user, and hides the representation of a fourth user in the view of the three-dimensional environment displayed to the first user. At the same time, based on the selection of the second user, the second computer system shows the representation of the first user and the representation of the fourth user in the view of the three-dimensional environment displayed to the second user, and hides the representation of the third user in the view of the three-dimensional environment displayed to the second user. Allowing a user to choose which other participant(s) to see in his/her own view of the three-dimensional environment reduces visual clutter, and make the user's experience in the three-dimensional environment more efficient and reduces input errors. In some embodiments, the selectable option is displayed in association with the respective participant in response to selection of the respective representation of the participant in the control region. In some embodiments, the selectable option is displayed (e.g., in response to selection of the respective representation of the participant) when the participant is active or generating audio output in the communication session, and not displayed when the participant is not active or generating audio output in the communication session. In some embodiments, the first computer system detects a user input activating the third selectable option in association with the second user, and in response to the user input, the first computer system ceases to display the representation of the second user in the view of the three-dimensional environment shown by the first display generation component (e.g., while the second user continues to participate in the communication session, and while the view of the representation of the second user is not affected at the display generation components of other participants of the communication session). In some embodiments, the respective representation of the participants that are hidden from the view of the three-dimensional environment remain displayed in the control region, and the first user is provided with respective selectable options to unhide the hidden participants. For example, as described with reference to FIG. 7E, controls 7204' include a control for hiding an avatar of the user (e.g., and/or of a participant). Providing a button or other user interface control that allows a user to remove an avatar or other visual representation of the user and/or one or more other users that are in a communication session with the user, provides additional controls for the user without requiring the user to navigate through complex menu hierarchies, thereby providing additional control options to the user without cluttering the user's view with additional displayed controls.

In some embodiments, while displaying the view of the communication session, the first computer system displays (e.g., within the view of the communication session, within the view of the three-dimensional environment, next to the view of the three-dimensional environment, or within the user interface for controlling the communication session) a fifth control object that, when activated, causes the first computer system to display an input area (e.g., a textual input area with a virtual keyboard, or dictation tool) in the view of the communication session for composing a text message that is to be displayed in a first three-dimensional region of the three-dimensional environment (e.g., to be displayed in respective views of the three-dimensional region shown to different participants of the communication session). In some embodiments, after the first computer system detects an input from the first user activating the fifth control object, the first computer system displays a text input area for the first user to compose a text message. Once the first computer system detects (e.g., in response to detecting) the first user's request to send the message that has been composed, the first computer system causes the message to be displayed in a three-dimensional region of the three-dimensional environment (e.g., a position at or near the representation of the first user, a message board that is already displayed in the three-dimensional environment, and/or a new message board that is displayed in the three-dimensional environment in response to the first user's input), such that participants of the communication session, including the first user, the second user, and optionally other users, see the message in the respective views of the three-dimensional environment presented to those participants, as described with reference to FIG. 7E. Providing a button or other user interface control that allows a user to compose a text message to share with other users participating in the communication session, and automatically displaying the composed message to the other users, provides additional controls for the user without requiring the user to navigate through complex menu hierarchies, thereby providing additional control options to the user without cluttering the user's view with additional displayed controls and providing improved visual feedback to participants that are enabled to view the shared message.

In some embodiments, while displaying the view of the communication session, the first computer system displays (e.g., within the view of the communication session, within the view of the three-dimensional environment, next to the view of the three-dimensional environment, or within the user interface for controlling the communication session) a sixth control object that, when activated, causes the first computer system to display an input area (e.g., a sketch board for drawing input and/or handwriting input) in a second three-dimensional region of the three-dimensional environment. In some embodiments, the input area is configured to receive drawing inputs from multiple participants of the communication session and present the drawing inputs in the second three-dimensional region of the three-dimensional environment (e.g., in the input region and/or in another output region in the three-dimensional environment) (e.g. displayed in respective views of the three-dimensional region shown to different participants of the communication session). In some embodiments, after the first computer system detects an input from the first user activating the sixth control object, the first computer system displays a shared drawing area for the participants of the communication session to create a drawing or sketch collaboratively. In some embodiments, the sketch inputs from multiple participants are concurrently displayed in the shared drawing area in the respective views of the second three-dimensional region shown by the display generation components used by the participants, as described with reference to FIG. 7E. Providing a button or other user interface control that allows a user to initiate a collaborative drawing session with one or more other participants in a communication session with the user, and automatically updating a shared drawing board in real-time with drawings input by participants in the communication session, provides additional controls for the user without requiring the user to navigate through complex menu hierarchies and provides real-time visual feedback to the user, thereby providing additional control options to the user and providing improved visual feedback to the user.

In some embodiments, while displaying the view of the communication session, in accordance with a determination that the view of the communication session includes respective representations of participants of the communication session at respective first positions in the view of the three-dimensional environment in accordance with virtual spatial relationships of the participants in the three-dimensional environment (e.g., a spatial view of the communication session), the first computer system displays (e.g., within the view of the communication session, within the view of the three-dimensional environment, next to the view of the three-dimensional environment, or within the user interface for controlling the communication session) a sixth control object that, when activated, causes the first computer system to display an input area (e.g., a sketch board for drawing input and/or handwriting input) in a second three-dimensional region of the three-dimensional environment. In some embodiments, the input area is configured to receive drawing inputs from multiple participants of the communication session and present the drawing inputs in the second three-dimensional region of the three-dimensional environment. In some embodiments, in accordance with a determination that the view of the communication session includes representations of the participants of the communication session at respective second positions in the view of the three-dimensional environment (e.g., in a list and/or in a gallery view of the communication session) the first computer system forgoes displaying the sixth control object. For example, as described with reference to FIGS. 7E-7F, if the representations of participating users are shown in a list and/or a gallery view (e.g., as opposed to representations of the participants in the shared three-dimensional environment that are displayed at positions within the three-dimensional environment relative to other participants), the option to start a collaborative drawing session is not provided. Automatically removing an option to initiate a collaborative drawing session when the communication session is not a spatial communication session (e.g., when the user views other participants in a list or gallery view, instead of maintaining a spatial relationship with the other participants in the three-dimensional environment), provides real-time visual feedback to the user that changes based upon the current type of communication session and provides a different set of control options to avoid cluttering the current view of the three-dimensional environment, thereby providing improved visual feedback to the user.

In some embodiments, while displaying the view of the communication session, the first computer system displays (e.g., within the view of the communication session, within the view of the three-dimensional environment, next to the view of the three-dimensional environment, or within the user interface for controlling the communication session) respective status indicators for one or more participants of the communication session (e.g., displaying a listing of avatars of users that are participating in the communication session in a control region of the communication session, along with their status indicators (e.g., active, talking, showing video, participating in spatial mode or non-spatial mode, or another current status)). In some embodiments, the respective status indicators of the one or more participants are indicative of respective manners by which the one or more participants are engaged in the communication session. In some embodiments, the status indicators indicate the types of devices and/or the modes (e.g., spatial mode, non-spatial mode, voice-only mode, or audio-video mode) with which the participants are engaged in the communication session. In some embodiments, the first computer system updates the status indicators in response to detecting a change in the type of device and/or modes with which the participants are engaged in the communication session. For example, as described with reference to FIG. 7E, a status indicator is displayed for participants in the communication session. Automatically displaying a status indicator, such as a device type, for users participating in a communication session, and updating the status indicators in accordance with a current status of the users participating in the communication session, provides real-time visual feedback to the user that changes based upon the current status of the other users such that the user is aware of the different features that may be available depending on the status of the other users, thereby providing improved visual feedback to the user.

In some embodiments, while displaying respective representations of one or more participants of the communication session in the control region of the communication session (e.g., displaying a listing of avatars of users that are participating in the communication session in a control region of the communication session), the first computer system detects a first input (e.g., an in-air tap input, a tap input in conjunction with a gaze input, or an upward swipe gesture) directed to the respective representation of a first participant of the one or more participants of the communication session. In response to detecting the first input, the first computer system provides a first spatial cue (e.g., spatial audio cue and/or visual cue) corresponding to a first spatial location of the first participant in the three-dimensional environment. In some embodiments, providing the first spatial cue includes displaying a visual indication of a spatial direction of the representation of the first participant in the three-dimensional environment relative to the currently displayed region of the three-dimensional environment in the view of the communication session (e.g., when the representation of the first participant is not in the currently displayed region of the three-dimensional environment, e.g., to the left or to the right of the currently displayed region of the three-dimensional environment). In some embodiments, providing the spatial cue includes highlighting the representation of the first participant in the three-dimensional environment in the currently displayed region of the three-dimensional environment in the view of the communication session. For example, as described with reference to FIGS. 7E-7F, the user is enabled to request a spatial cue that identifies where a particular application and/or user is located within the shared three-dimensional environment. Providing the user with an option to select representations of other participants in the communication session, and automatically providing a spatial cue indicating a relative position of the selected participant, as compared to the user, within the three-dimensional environment, allows the user to request spatial cues for a respective participant without navigating through complex menu hierarchies, thereby providing additional control options to the user without cluttering the user's view with additional displayed controls.

In some embodiments, providing the first spatial cue corresponding to the first spatial location of the first participant in the three-dimensional environment includes outputting a first spatial audio output with a first virtual location corresponding to the first spatial location of the first participant in the three-dimensional environment. In some embodiments, spatial audio is audio that has a frame of reference that is separate from the frame of reference of the audio output equipment. The frame of reference of the audio may be tied to the three-dimensional environment, a moving object in the three-dimensional environment, the user's head, the user's hand, a physical object in the physical environment, the physical environment, the HMD, the user, and/or the viewpoint, depending on the particular usage scenarios. For example, as described with reference to FIGS. 7E-7F, in response to a request for a spatial cue, the computer system generates and outputs the spatial cue. Automatically providing an audio indication of a relative position of a selected participant, as compared to the user, within the three-dimensional environment, provides real-time audio feedback to the user as the user and/or the participant moves around the three-dimensional environment, thereby providing improved audio feedback to the user.

Existing stereo and mono audio output modes provide audio with respect to a frame of reference that is tied to the audio output devices. For stationary audio output devices, the sound appears to originate from the locations of the audio output devices in the physical environment, irrespective of movement of the user in the physical environment and irrespective to the changes in the visual content of the computer-generated experience (e.g., changes due to movement of virtual sound sources and/or movement of the viewpoint, in the three-dimensional environment of the computer-generated experience). For wearable audio output devices that stay stationary relative to a portion of the user's body (e.g., ears or head), the sound appears to be locked relative to the portion of the user's body, irrespective of the changes in the visual content of the computer-generated experience (e.g., changes due to movement of the virtual sound sources, and/or changes due to movement of the viewpoint (e.g., movement of the viewpoint caused by a locomotion request by the user or computer system, and not caused by and does not correspond to the movement of the portion of the user's body)) in the three-dimensional environment of the computer-generated experience. In some cases, the audio output devices and the display generation component of the computer system are separately housed and may move relative to each other in the physical environment during the presentation of computer-generated content via the audio output devices and the display generation component. In such cases, the sound still appears to originate from the audio output devices, irrespective the location of the display generation component in the physical environment, or the changes in the visual content of the computer-generated experience (e.g., changes due to movement of a virtual sound source (e.g., the representation of the first participant, in this case) and/or movement of the viewpoint (e.g., movement caused by a locomotion request in the displayed environment, or in response to and in accordance with movement of the user or a portion thereof in the physical environment), in the three-dimensional environment of the computer-generated experience). In general, stereo and mono audio output modes provide a less realistic and less immersive listening experience than a spatial audio output mode, when the audio content of a computer-generated experience is provided to the user using the stereo audio output mode or the mono audio output mode.

In some embodiments, the frame of reference is a frame of reference based on a virtual three-dimensional environment of a computer-generated experience provided via the display generation component of the computer system. In some embodiments, where the frame of reference is based on a virtual three-dimensional environment (e.g., an environment of a virtual three-dimensional movie, a three-dimensional game, or a virtual office), the one or more perceived sound sources have respective spatial positions in the virtual three-dimensional environment. In some embodiments, as the audio output device(s) move about the physical environment, the audio output from the audio output device(s) is adjusted so that the audio continues to sound as though it is coming from the one or more perceived sound sources at the respective spatial positions in the virtual three-dimensional environment. Where the one or more perceived sound sources are moving sources that move through a sequence of spatial positions about the virtual three-dimensional environment, the audio output from the audio output device(s) is adjusted so that the audio continues to sound as though it is coming from the one or more perceived sound sources at the sequence of spatial positions in the virtual three-dimensional environment. In some embodiments, when the audio content is output using spatial audio output mode and a frame of reference based on the three-dimensional environment of the computer-generated experience, the viewpoint of the currently displayed view of the three-dimensional environment changes in accordance with the movement of the user and/or the display generation component in the physical environment; and the user will perceive the sound as coming from the virtual positions of the virtual sound sources and experience the visual content of the three-dimensional environment in the same frame of reference. In some embodiments, when the audio content is output using a spatial audio output mode and a frame of reference based on the three-dimensional environment of the computer-generated experience, the viewpoint of the currently displayed view of the three-dimensional environment changes in accordance with a locomotion request provided by the user and/or in accordance with the movement of the user and/or the display generation component in the physical environment; and the user will perceive the sound as coming from the virtual positions of the virtual sound sources and experience the visual content of the three-dimensional environment in the same frame of reference, with the user's virtual position tied to the viewpoint of the currently displayed view.

In some embodiments, the frame of reference for the spatial audio output mode is fixed to an electronic device, such as a display generation component, that is outputting visual content corresponding to the audio content that is being output via the audio output device (e.g., the sound follows the display generation component). For example, locations of the simulated sources of the audio in a physical environment move corresponding to movement of the display generation component in the physical environment (e.g., when the representation of the first participant is displayed in the peripheral portion of the field of view provided by an HMD), but not corresponding to the movement of the audio output device in the physical environment. For example, in some embodiments, the display generation component is a head-mounted display device, or a hand-held display device, while the audio output devices are placed in the physical environment and do not follow the movement of the user. In some embodiments, the frame of reference of the spatial audio effect is fixed to the display generation component and indirectly to the user, as the display generation component and the user move around the physical environment, relative to the audio output device(s). In some embodiments, when the audio content is output using spatial audio output mode and a frame of reference based on the three-dimensional environment of the computer-generated experience, the viewpoint of the currently displayed view of the three-dimensional environment changes in accordance with a locomotion request provided by the user and/or in accordance with the movement of the user and/or the display generation component in the physical environment; and the user will perceive the sound as coming from the virtual positions of the virtual sound sources and experience the visual content of the three-dimensional environment in the same frame of reference, with the user's virtual position tied to the viewpoint of the currently displayed view.

In some embodiments, providing the first spatial cue corresponding to the first spatial location of the first participant in the three-dimensional environment includes visually highlighting a representation of the first participant in the view of the three-dimensional environment (e.g., shining a virtual spotlight on the representation of the first participant in the view of the three-dimensional environment, displaying an outline around the representation of the first participant in the view of the three-dimensional environment, and/or displaying a blinking arrow pointing at the representation of the first participant in the view of the three-dimensional environment). For example, as described with reference to FIGS. 7E-7F, the computer system provides a visual (e.g., spatial) cue. Automatically providing a visual indication of a relative position of a selected participant, as compared to the user, within the three-dimensional environment, provides real-time visual feedback to the user as the user and/or the participant moves around the shared three-dimensional environment, thereby providing improved visual feedback to the user.

In some embodiments, while displaying the view of the communication session, the first computer system displays (e.g., within the view of the communication session, within the view of the three-dimensional environment, next to the view of the three-dimensional environment, or within the user interface for controlling the communication session) respective representations of one or more applications that are shared in the communication session (e.g., displaying a listing of application icons for applications that are shared in the communication session in a control region of the communication session). While displaying the respective representations of one or more applications that are shared in the communication session, the first computer system detects a second input (e.g., an in-air tap input, a tap input in conjunction with a gaze input, or an upward swipe gesture) directed to the respective representation of a first application of the one or more applications that are shared in the communication session. In response to detecting the second input, the first computer system provides a second spatial cue (e.g., spatial audio cue and/or visual cue) corresponding to a second spatial location of the first application in the three-dimensional environment. In some embodiments, providing the second spatial cue includes displaying a visual indication of a spatial direction of the representation of the first application in the three-dimensional environment relative to the currently displayed region of the three-dimensional environment in the view of the communication session (e.g., when the user interface of the first application is not in the currently displayed region of the three-dimensional environment, e.g., to the left or to the right of the currently displayed region of the three-dimensional environment). In some embodiments, providing the second spatial cue includes highlighting the user interface of the first application in the three-dimensional environment in the currently displayed region of the three-dimensional environment in the view of the communication session, as described above with reference to FIGS. 7E-7F. Providing the user with an option to select representations of shared applications within a communication session, and automatically providing an audio and/or visual spatial indication for a relative position of the selected application, as compared to the user, within the three-dimensional environment, provides real-time audio and/or visual feedback to the user as the user selects different applications, thereby providing improved audio and/or visual feedback to the user.

In some embodiments, providing the second spatial cue corresponding to the second spatial location of the first application in the three-dimensional environment includes outputting a second spatial audio output with a second virtual location corresponding to the second spatial location of the first application in the three-dimensional environment, as described above with reference to FIGS. 7E-7F. Automatically providing an audio indication of a relative position of a selected application, as compared to the user, within the three-dimensional environment, provides real-time audio feedback to the user as the user moves around the three-dimensional environment to indicate a current relative position between the user and the selected application, thereby providing improved audio feedback to the user.

In some embodiments, providing the second spatial cue corresponding to the second spatial location of the first application in the three-dimensional environment includes visually highlighting a user interface of the first application in the view of the three-dimensional environment (e.g., shining a virtual spotlight on the user interface of the first application in the view of the three-dimensional environment, displaying an outline around the application window of the first application in the view of the three-dimensional environment, and/or displaying a blinking arrow pointing at the application window of the first application in the view of the three-dimensional environment), as described above with reference to FIGS. 7E-7F. Automatically providing a visual indication of a relative position of a selected application, as compared to the user, within the three-dimensional environment, provides real-time visual feedback to the user as the user moves around the three-dimensional environment to indicate a current relative position between the user and the selected application, thereby providing improved visual feedback to the user.

In some embodiments, while the user interface for controlling the communication session is displayed, the first computer system detects movement of a gaze input directed to the user interface away from the user interface. In response to detecting the movement of the gaze input away from the user interface, the first computer system ceases to display the user interface in the view of the three-dimensional environment. In some embodiments, the user interface for controlling the communication session has characteristics and behaviors of the second user interface object 7018', as described above with reference to FIGS. 7A-7D and the method 8000. In some embodiments, other user interface objects, selectable controls, control objects described herein are also displayed in the user interface for controlling the communication session. This is shown in FIGS. 7I-7J, for example, where, in response to detecting the movement of the gaze input away from the user interface (the dashed line from the user's eye shown in FIG. 7I is no longer directed to the user interface object 7302' in FIG. 7J), the computer system ceases to display the user interface in the view of the three-dimensional environment (e.g., the user interface object 7302' is visually deemphasized (e.g., as a transition to being no longer displayed) in FIG. 7J). Automatically ceasing display of certain user interface objects in response to the user no longer gazing at, or paying attention to, the user interface objects, provides real-time visual feedback to the user by removing user interface objects as the user shifts the user's gaze away from the user interface objects and reduces the number of inputs needed for the user to remove the user interface object, thereby providing improved visual feedback to the user without requiring additional user input.

In some embodiments, while the user interface for controlling the communication session is displayed, the first computer system detects movement of a hand of the first user in a direction (e.g., a downward swipe in the air or a sideways swipe in the air). In response to detecting the movement of the hand of the first user in the direction, the first computer system ceases to display the user interface in the view of the three-dimensional environment. In some embodiments, the user interface for controlling the communication session has characteristics and behaviors of the second user interface object 7018', as described above with reference to FIGS. 7A-7D and the method 8000. In some embodiments, other user interface objects, selectable controls, and/or control objects described herein are also displayed in the user interface for controlling the communication session. Providing an option for the user to remove certain user interface objects in response to the user performing a gesture, provides additional controls for the user to interact with user interface objects without displaying additional control buttons, or requiring the user to navigate through complex hierarchies, thereby reducing the number of inputs needed to perform an operation.

In some embodiments, while the communication session is ongoing, the first computer system receives a request to display controls for the communication session. In response to receiving the request to display controls for the communication session, in accordance with a determination that the view of the communication session includes respective representations of participants of the communication session at respective first positions in the view of the three-dimensional environment in accordance with virtual spatial relationships of the participants in the three-dimensional environment (e.g., a spatial view of the communication session), the first computer system displays the user interface for controlling the communication session including the first control object. In some embodiments, in accordance with a determination that the view of the communication session includes representations of the participants of the communication session at respective second positions in the view of the three-dimensional environment, the first computer system displays a different user interface for controlling the communication session that includes a plurality of control objects but does not include a control object for modifying an appearance of a three-dimensional region of the three-dimensional environment. In some embodiments, the plurality of control objects are displayed in a list or in a gallery view of the communication session. In some embodiments, other user interface objects, selectable controls, and/or control objects described herein that cause changes to the view of the three-dimensional environment (e.g., avatars of participants shown in a control region, representations of shared and/or available applications shown in a control region, and/or representations of shared and/or available environments) are also displayed in a spatial mode of the communication session, and are not displayed in the non-spatial mode of the communication session, as described with reference to FIGS. 7E-7F. In some embodiments, the different user interface for controlling the communication session includes one or more of the same controls for controlling the communication session that are described above. Automatically displaying different buttons and control options for the user based on whether the communication session is a spatial or non-spatial type of session provides additional control options for the user and real-time visual feedback to the user based on the type of communication session the user is currently participating in, thereby providing improved visual feedback to the user.

It should be understood that the particular order in which the operations in FIG. 9 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000 and 10000) are also applicable in an analogous manner to method 9000 described above with respect to FIG. 9. For example, the gestures, gaze inputs, physical objects, user interface objects, controls, movements, criteria, three-dimensional environment, display generation component, surface, representation of physical object, virtual objects, and/or animations described above with reference to method 9000 optionally have one or more of the characteristics of the gestures, gaze inputs, physical objects, user interface objects, controls, movements, criteria, three-dimensional environment, display generation component, surface, representation of physical object, virtual objects, and/or animations described herein with reference to other methods described herein (e.g., methods 8000 and 10000). For brevity, these details are not repeated here.

Figure 10:
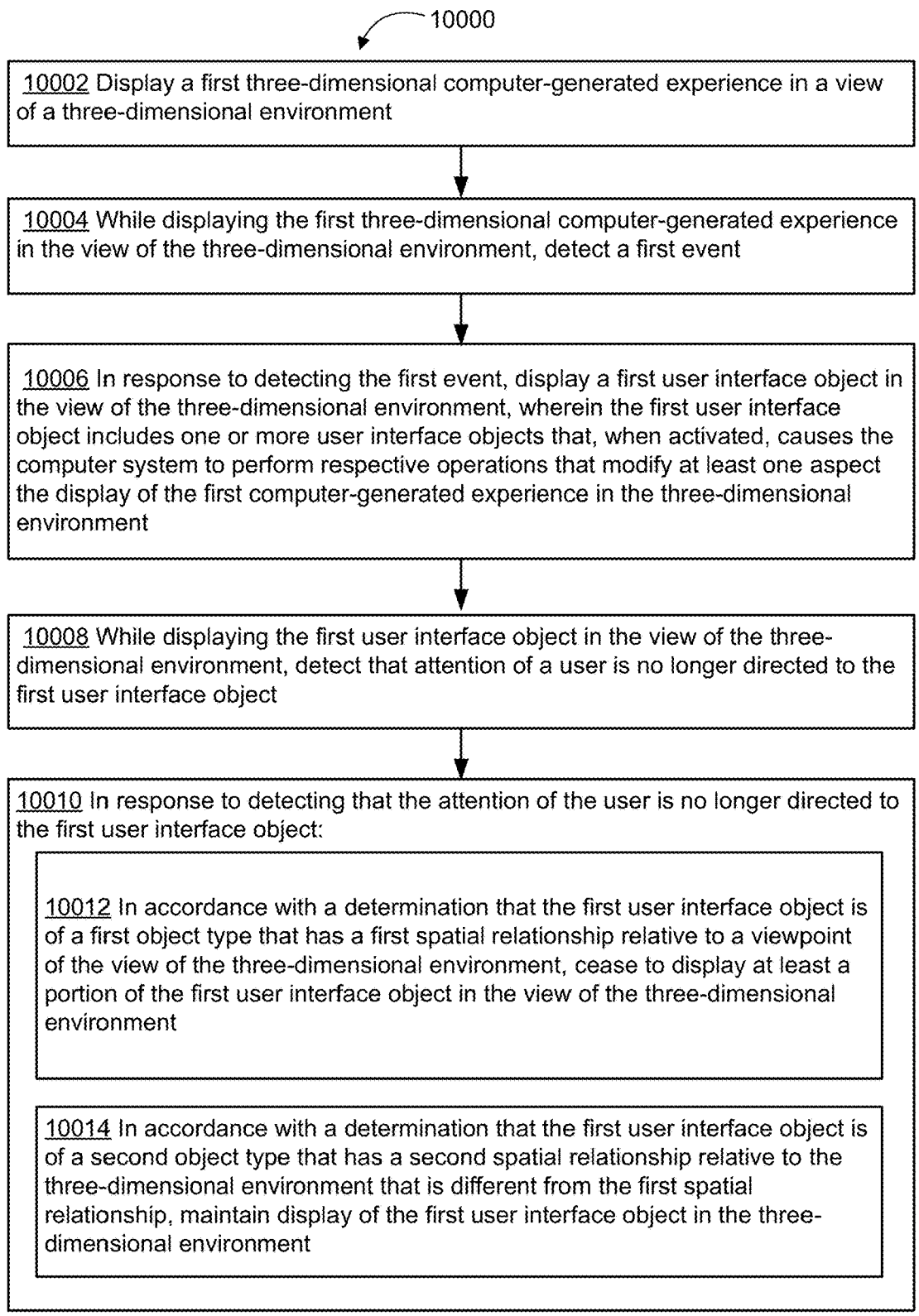
FIG. 10 is a flowchart of a method for determining, when a user's attention is no longer directed to a user interface object, whether to cease displaying at least a portion of the first user interface object in the view of the three-dimensional environment, or to maintain display of the first user interface object in the three-dimensional environment, in accordance with some embodiments.

FIG. 10 is a flowchart of a method 10000 for determining, when a user's attention is no longer directed to the first user interface object, whether to cease display of at least a portion of a first user interface object in the view of the three-dimensional environment, or to maintain display of the first user interface object in the three-dimensional environment, based on the first user interface object's object type and spatial relationship relative to a viewpoint of the view of the three-dimensional environment, in accordance with some embodiments.

In some embodiments, the method 10000 is performed at a computer system (e.g., the computer system 101 in FIG. 1, or the computer system described with respect to FIGS. 7A-7D, FIGS. 7E-7F, FIGS. 7G-7J). In some embodiments, the computer system is in communication with a first display generation component (e.g., display generation component 7100, another display generation component, a heads-up display, a head-mounted display (HMD), a display, a touch-screen, and/or a projector) and one or more input devices (e.g., cameras or other sensors and input devices that detect movement of the user's hand(s), movement of the user's body as whole, and/or movement of the user's head in the physical environment; e.g., controllers, touch-sensitive surfaces, joysticks, buttons, gloves, watches, motion sensors, and/or orientation sensors). In some embodiments, the first display generation component is a display generation component 7100 described with respect to FIGS. 7A-7D, FIGS. 7E-7F, and FIGS. 7G-7J. In some embodiments, the first display generation component is a heads-up display that does not move or rotate with the user's head or the user's body as a whole, but, optionally, changes the viewpoint of the user into the three-dimensional environment in accordance with the movement of the user's head or body relative to the first display generation component. In some embodiments, the first display generation component is optionally moved and rotated by the user's hand relative to the physical environment or relative to the user's head, and changes the viewpoint of the user into the three-dimensional environment in accordance with the movement of the first display generation component relative to the user's head or face or relative to the physical environment. Many of the features of the method 10000 are described with respect to FIGS. 7G-7J, in accordance with some embodiments.

The method 10000 disclosed herein relates to displaying user interface elements for a user in a three-dimensional environment, and for automatically removing certain user interface elements that have not been placed in the three-dimensional environment in response to the user looking away from the user interface elements. Other user interface elements, which have been placed in the three-dimensional environment, are maintained when the user looks away from the other user interface elements.

Maintaining display of one or more user interface elements that have been placed in (e.g., anchored to) the three-dimensional environment, even when the user looks away from the one or more user interface elements, without maintaining display of other user interface elements that have not been placed in the three-dimensional environment when the user looks away from the other user interface elements, provides real-time visual feedback as the user looks away from various user interface elements. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In the method 10000, the computer system displays (10002) a first three-dimensional computer-generated experience (e.g., an application experience, a home or launch pad experience, and/or a copresence experience) (e.g., an augmented reality experience, a mixed reality experience, or a virtual reality experience) in a view of a three-dimensional environment (e.g., an augmented reality environment, a virtual reality environment, or an extended reality environment).

While displaying the first three-dimensional computer-generated experience in the view of the three-dimensional environment, the computer system detects (10004) a first event (e.g., detects a user input that corresponds to a request to open a session user interface for the currently displayed computer-generated experience, detects a system event that opens the session user interface automatically, detects a user input that opens a new window, and/or detects a user input that moves a window from near the viewpoint (e.g., a position that is anchored to the viewpoint, the virtual position of a portion of a user (e.g., head, torso, and/or hand)) to a position within the three-dimensional environment that is anchored to the physical environment).

In response to detecting the first event, the computer system displays (10006) a first user interface object (e.g., a session user interface (e.g., a window) that corresponds to the currently displayed computer-generated experience) in the view of the three-dimensional environment, wherein the first user interface object includes one or more user interface objects (e.g., user interface objects corresponding to different operations of the computer system, such as system-level operations, and/or application-level operations) that, when activated, cause the computer system to perform respective operations that modify at least one aspect the display of the first computer-generated experience in the three-dimensional environment (e.g., change virtual wallpaper, change visual augmentation applied to the representation of the physical environment, and/or provide additional user interface objects for additional functions and parameters of the first computer-generated experiences).

While displaying the first user interface object in the view of the three-dimensional environment, the computer system detects (10008) that attention of a user (e.g., the user that is in position to view the first computer-generated experience via the display generation component) is no longer directed to the first user interface object (e.g., based on movement and/or location of the user's gaze and/or based on head movement of the user or the display generation component that indicate that the attention of the user that was previously directed to the first user interface object is no longer directed to the first user interface object).

In response to detecting (10010) that the attention of the user is no longer directed to the first user interface object, and in accordance with a determination that the first user interface object is of a first object type that has a first spatial relationship relative to a viewpoint of the view of the three-dimensional environment (e.g., a respective object of the first object type has a position in the three-dimensional environment that is anchored to the viewpoint of the view of the three-dimensional environment, and thus is moved as the viewpoint of the user changes), the computer system ceases (10012) to display at least a portion of the first user interface object in the view of the three-dimensional environment (e.g., dismisses, reduces a size, or minimizes the first user interface object in the view of the three-dimensional environment). In some embodiments, the computer system ceases to display at least a portion of the first user interface object in the view of the three-dimensional environment in accordance with a determination that the first user interface object is of an object type that has a position in the three-dimensional environment that is anchored to the position of a portion of the user (e.g., eyes, face, head, torso, and/or hand). For example, as described above with reference to FIGS. 7I-7J, the computer system ceases to display a portion of the user interface object 7302' (e.g., visually deemphasizes the user interface object 7302' or ceases display of the user interface object 7302') in response to detecting that the attention of the user is no longer directed to the user interface object 7302' (e.g., as indicated by the dashed line from the user's eye shown in FIG. 7I, which is no longer directed to the user interface object 7302' in FIG. 7J). For example, user interface object 7302' is the first type of object that has the first spatial relationship relative to the three-dimensional environment that is different from the first spatial relationship (e.g., the user interface object 7302' is displayed at a position relative to a portion of the user (e.g., relative to the user's viewpoint)) (e.g., the user interface object 7302' is displayed at a position that is independent of (e.g., not anchored to) a portion of the three-dimensional environment).

In response to detecting (10010) that the attention of the user is no longer directed to the first user interface object, in accordance with a determination that the first user interface object is of a second object type that has a second spatial relationship relative to the three-dimensional environment that is different from the first spatial relationship (e.g., is a respective object that is fixed in relationship to a portion of the three-dimensional environment (e.g., a representation of a physical surface, a physical object, a point in free space, a virtual surface, or a virtual object in the three-dimensional environment) instead of a respective object that is fixed in relationship to a virtual position corresponding to a portion of the user), the computer system maintains (10014) display of the first user interface object in the three-dimensional environment (e.g., such that the spatial relationship between the characteristic position of the first user interface object and the three-dimensional environment is maintained). For example, as described above with reference to FIGS. 7G-7H, the computer system maintains display of a first user interface object (e.g., user interface object 7304') in response to detecting that the attention of the user is no longer directed to the first user interface object (e.g., the dashed line from the user's eye shown in FIG. 7G is no longer directed to the user interface object 7304' in FIG. 7H, but display of the user interface object 7304' is maintained). In some embodiments, user interface object 7304' is the second object type that has a second spatial relationship relative to the three-dimensional environment. (e.g., user interface object 7304' is anchored to the three-dimensional environment).

In some embodiments, a respective user interface object of the first object type that has the first spatial relationship relative to the viewpoint of the view of the three-dimensional environment is displayed at a predefined location within the view of the three-dimensional environment. For example, in some embodiments, the predefined location within the view of the three-dimensional environment includes a sub-portion (e.g., bottom edge portion, top edge portion, central portion, upper left corner, lower right corner, and/or another sub-portion) of the field of view provided by the display generation component. In some embodiments, the predefined location within the view of the three-dimensional environment is at a depth (e.g., arm's length, 15 centimeters, 20 inches, or a user-selected distance) away from the viewpoint of the view of the three-dimensional environment. In some embodiments, the viewpoint through an HMD is locked to the user's head or the user's torso, therefore, when the user's head or torso moves, the viewpoint moves. For example, the user interface object 7302' (e.g., an object of the first object type) is displayed at a position "in front" of the user, such that the user interface object 7302' is locked to the user's viewpoint and moves with the viewpoint (which moves with the user's head or torso). For example, in FIG. 7H, the user interface object 7302' is anchored to the viewpoint of the view of the three-dimensional environment and is displayed at a predefined location with the view of the three-dimensional environment (e.g., at a bottom edge portion of the field of view provided by the display generation component 7100). Displaying a user interface object at a predefined location in front of the user based on the user's current viewpoint, such that the user interface object is anchored at a predefined position relative to the user's viewpoint provides real-time visual feedback to the user as the user moves the user's viewpoint, thereby providing improved visual feedback to the user.

In some embodiments, a respective user interface object of the second object type that has the second spatial relationship relative to the three-dimensional environment is displayed at a user-selected location among a plurality of eligible locations within the view of the three-dimensional environment. For example, the user can move a respective user interface object of the second object type across a surface or path, or from location to location within the view of the three-dimensional environment, and choose to place the respective user interface object at any location of multiple locations during the movement of the respective user interface object and have the respective user interface object fixed to that location (e.g., until the respective user interface object is moved again by user input or ceases to be displayed). In some embodiments, the viewpoint can move relative to the three-dimensional environment and the objects in it, as the user's head or torso moves in the physical environment. For example, user interface object 7304' is displayed at a position in the three-dimensional environment that is in front of the representation 7004' of a wall (e.g., at a respective height from the representation 7008' of the floor, and at a respective distance from the corner where the representation 7006' of a wall meets the representation 7004' of the wall). The user is enabled to move the user interface object 7304' to any other portion of the three-dimensional environment. For example, the user is enabled to anchor the user interface object 7304' at a position that overlaps the representation 7014' of a physical object. Allowing a user to select an anchor position for a user interface object, such that the user interface object is displayed at another position in the three-dimensional environment, and automatically updating display of the user interface object such that it is anchored to the selected position, provides real-time visual feedback to the user as the user selects a new anchor for a user interface object, thereby providing improved visual feedback to the user.

In some embodiments, the first user interface object is of the first object type that has the first spatial relationship relative to the viewpoint of the view of the three-dimensional environment. Prior to displaying the first user interface object with the first spatial relationship relative to the viewpoint of the view of the three-dimensional environment, the computer system displays the first user interface object at a first position that has a third spatial relationship relative to a position in the three-dimensional environment that corresponds to a location of a first hand of the user in the physical environment. While displaying the first user interface object at the first position in the three-dimensional environment, the computer system detects a first event (e.g., detection of a gesture provided by the first hand, a gesture provided by the second hand of the user, a voice command, and/or activation of a user interface object by the user). In response to detecting the first event, the computer system moves the first user interface object from the first position in the three-dimensional environment to a second position that has the first spatial relationship relative to the viewpoint of the view of the three-dimensional environment (e.g., switching from anchoring the first user interface object to the position of the representation of the first hand of the user to anchoring the first user interface object to the viewpoint of the view of the three-dimensional environment). In some embodiments, the computer system displays an animated transition showing the first user interface object flying away from the representation of the first hand to the position that is in front of the viewpoint in the three-dimensional environment. For example, as described with reference to FIG. 7G-7J, the user is enabled to move a user interface object (e.g., user interface object 7302') from being anchored to the user's hand to being anchored to the predefined portion in front of the user. Providing the user with an option to change whether a user interface object is anchored relative to the user's hand or to a predefined portion of the three-dimensional environment that changes as the user's viewpoint changes, provides real-time visual feedback to the user and provides additional controls for the user without requiring the user to navigate through complex menu hierarchies, thereby providing improved visual feedback to the user without requiring additional user input.

In some embodiments, detecting the first event includes detecting a gesture provided by a second hand of the user at a location that is away from the first hand of the user. In some embodiments, the gesture is a pinch gesture followed by a drag gesture or a throw gesture performed by the second hand of the user. In some embodiments, the gesture is a pinch and a drag or a throw gesture detected in conjunction with a gaze input directed to the first user interface object while the first user interface object is displayed at the first position that has the third spatial relationship relative to the position that corresponds to the location of the first hand of the user. In some embodiments, the location of the pinch gesture corresponds to the first position of the first user interface object while the first user interface object is displayed at the first position in the three-dimensional environment. In some embodiments, the location of the pinch gesture corresponds to a position of a grab handle (e.g., a user interface object on the top edge, bottom edge, or a corner) of the first user interface object that is displayed in the view of the three-dimensional environment. For example, as described with reference to FIG. 7J, the user selects the user interface object 7302' and drags the user interface object to a position within the three-dimensional environment. Automatically detecting a plurality of different gestures, including a pinch and drag or throw gesture, and other user inputs that cause the system to perform distinct operations, and automatically performing the operation in response to the respective detected gesture, provides additional controls for the user without requiring the user to navigate through complex menu hierarchies, thereby reducing the number of inputs needed to perform an operation.

In some embodiments, detecting the first event includes detecting a throw gesture provided by the first hand of the user (e.g., movement of the first hand with more than a threshold amount of speed and/or distance in a direction away from the user). In some embodiments, the throw gesture includes an initial grab of an object, then releasing the object at the end of (e.g., or during) the movement (e.g., throw), as described with reference to FIGS. 7J-7G. Automatically detecting a plurality of different gestures, including a throw gesture, that cause the system to perform distinct operations, and automatically performing the operation in response to the respective detected gesture, provides additional controls for the user without requiring the user to navigate through complex menu hierarchies, thereby reducing the number of inputs needed to perform an operation.

In some embodiments, detecting the first event includes detecting a gesture provided by a second hand of the user at a location that is on the first hand of the user. In some embodiments, the gesture is a tap gesture performed by the second hand of the user. For example, as described with reference to FIGS. 7J-7G, in some embodiments, the tap gesture is detected at a location on the first hand that corresponds to the position within the first user interface object. In some embodiments, the tap gesture is detected at a location on the first hand that corresponds to the position of a control of the first user interface object. Automatically detecting a plurality of different gestures, including a tap gesture on a predefined position on the user's hand, that cause the system to perform distinct operations, and automatically performing the operation in response to the respective detected gesture, provides additional controls for the user without requiring the user to navigate through complex menu hierarchies, thereby reducing the number of inputs needed to perform an operation.

In some embodiments, the first user interface object is of the first object type that has the first spatial relationship relative to the viewpoint of the view of the three-dimensional environment. In some embodiments, while displaying the first user interface object with the first spatial relationship relative to the viewpoint of the view of the three-dimensional environment, the computer system detects a second event (e.g., detection of a gesture provided by the first hand, a gesture provided by the second hand of the user, a voice command, or activation of a user interface object by the user). In response to detecting the second event, the computer system moves the first user interface object from a third respective position in the three-dimensional environment that has the first spatial relationship relative to the viewpoint of the view of the three-dimensional environment, to a fourth position that has a third spatial relationship relative to a position that corresponds to a location of a first hand of the user in the physical environment (e.g., switches from anchoring the first user interface object to the viewpoint of the view of the three-dimensional environment to anchoring the first user interface object to the position of the representation of the first hand of the user). For example, as described with reference to FIGS. 7G-7J, the user is enabled to move the user interface object 7302' from being anchored to the predefined portion of the three-dimensional environment (e.g., in front of the user) to being anchored to a portion of the user's body (e.g., the user's hand). In some embodiments, the computer system displays an animated transition showing the first user interface object flying away from its position in front of the viewpoint in the three-dimensional environment toward the representation of the first hand in the three-dimensional environment. Providing the user with an option to change whether a user interface object is anchored relative to the user's hand or to a predefined position within the three-dimensional environment that is independent of the user's hand, and automatically detecting the user inputs to determine where the user has selected to anchor the user interface object, provides real-time visual feedback to the user and provides additional controls for the user without requiring the user to navigate through complex menu hierarchies, thereby providing improved visual feedback to the user without requiring additional user input.

In some embodiments, after moving the first user interface object to the fourth position that has the third spatial relationship relative to a position that corresponds to a location of a first hand of the user in the physical environment, the computer system detects movement of the first hand of the user in the physical environment to a second location, and in response to detecting the movement of the first hand of the user, the computer system moves the first user interface object relative to the viewpoint of the view of the three-dimensional environment to maintain the third spatial relationship relative to the position that corresponds to the second location of the first hand of the user in the physical environment. This is shown in FIGS. 7B-7D, for example, where after moving the first user interface object to the fourth position that has the third spatial relationship relative to a position that corresponds to a location of a first hand of the user in the physical environment, the orientation of the first user interface object (e.g., the user interface object 7016') is selected based on a characteristic orientation of the first hand (e.g., as described above as the user rotates the user's hand in FIGS. 7B-7D). Moving the first user interface object relative to the viewpoint of the view of the three-dimensional environment to maintain the third spatial relationship relative to the position that corresponds to the second location of the first hand of the user in the physical environment provides real-time visual feedback to the user as the first hand of the user moves, thereby providing improved visual feedback to the user.

In some embodiments, detecting the second event includes detecting a gesture provided by the first hand of the user (e.g., at a location that is away from the location that corresponds to the third position of the first user interface object). In some embodiments, the gesture is a pinch gesture followed by a wrist flick gesture performed by the first hand of the user. In some embodiments, the gesture is a pinch and grab gesture detected in conjunction with a gaze input directed to the first user interface object while the first user interface object is displayed at the third position that has the first spatial relationship relative to the viewpoint of the view of the three-dimensional environment. In some embodiments, the location of the pinch gesture corresponds to the third position of the first user interface object while the first user interface object is displayed at the third position in the three-dimensional environment. In some embodiments, the location of the pinch gesture corresponds to a position of a grab handle (e.g., a user interface object on the top edge, bottom edge, or a corner) of the first user interface object that is displayed in the view of the three-dimensional environment. This is shown in FIGS. 7G and 7H, for example, where detecting the second event includes detecting a gesture provided by the first hand of the user (e.g., the user's hand 7020). Automatically detecting a plurality of different gestures, including a pinch and drag gesture, and other user inputs that cause the system to perform distinct operations, and automatically performing the operation in response to the respective detected gestures, provides additional controls for the user without requiring the user to navigate through complex menu hierarchies, thereby providing additional control options without cluttering the user's view with additional displayed controls.

In some embodiments, detecting the second event includes detecting a gesture provided by a second hand of the user at a location that is on the first hand of the user. In some embodiments, the gesture is a tap gesture performed by the second hand of the user. In some embodiments, the tap gesture is detected at a location on the first hand that corresponds to the position of a control corresponding to the first user interface object, as described with reference to FIGS. 7G-7J. Automatically detecting a plurality of different gestures, including a tap gesture on a predefined position on the user's hand, that cause the system to perform distinct operations, and automatically performing the operation in response to the respective detected gesture, provides additional controls for the user without requiring the user to navigate through complex menu hierarchies, thereby providing improved visual feedback and providing additional control options without cluttering the user's view with additional displayed controls.

In some embodiments, the first user interface object is of the first object type that has the first spatial relationship relative to the viewpoint of the view of the three-dimensional environment. In such embodiments, while displaying the first user interface object with the first spatial relationship relative to the viewpoint of the view of the three-dimensional environment, the computer system detects a third event (e.g., detection of a gesture provided by the first hand, a gesture provided by the second hand of the user, a voice command, and/or activation of a user interface object by the user). In some embodiments, in response to detecting the third event, the computer system moves the first user interface object from a third respective position in the three-dimensional environment that has the first spatial relationship relative to the viewpoint of the view of the three-dimensional environment, to a fifth position that has the second spatial relationship relative to the three-dimensional environment (e.g., switches from anchoring the first user interface object to the viewpoint of the view of the three-dimensional environment to anchoring the first user interface object to the three-dimensional environment, as described with reference to FIGS. 7G-7J). In some embodiments, the computer system displays an animated transition showing the first user interface object flying away from its position in front of the viewpoint in the three-dimensional environment toward a position in the three-dimensional environment that is fixed relative to the three-dimensional environment (e.g., the position in the three-dimensional environment corresponding to a wall or a table top in the physical environment). Providing the user with an option to change whether a user interface object is anchored relative to the user's current viewpoint, or anchored to a predefined position within the three-dimensional environment that is independent of the user's viewpoint, and automatically detecting the user inputs to determine where the user has selected to anchor the user interface object, provides real-time visual feedback to the user as the user changes an anchor of a user interface object, and provides additional controls for the user without requiring the user to navigate through complex menu hierarchies, thereby providing improved visual feedback to the user without requiring additional user input.

In some embodiments, the first three-dimensional computer-generated experience (e.g., an application experience, a home or launch pad experience, or a copresence experience) (e.g., an augmented reality experience, a mixed reality experience, or a virtual reality experience) displayed in the view of the three-dimensional environment is a shared experience between the user corresponding to the computer system and at least one other user corresponding to a second computer system. In such embodiments, the computer system keeps at least a portion of content in the first user interface object private to the user corresponding to the computer system while the first user interface object is displayed at the third position that has the first spatial relationship relative to the viewpoint of the view of the three-dimensional environment. In response to detecting the third event, the computer system reveals the portion of the content in the first user interface object to the at least one other user corresponding to the second computer system after the first user interface object is moved from the third respective position in the three-dimensional environment to the fifth position that has the second spatial relationship relative to the three-dimensional environment. In some embodiments, the user shares the three-dimensional environment with one or more other users (e.g., participants). For example, the user and the other participants can view the user interface objects that have been shared (e.g., are not private) with the other participants. In some embodiments, the other participants cannot view the portion of the content that is private to the user. For example, the user can see the "world" content (e.g., public content) in addition to the user's private content, while the other participants can only view the "world" content and their own respective participant private content, but cannot view the user's private content. In some embodiments, a user is enabled to move various user interface objects and/or portions of content between being displayed in the public content and the private content. For example, the user selects a first object to from the public content to move the first object to the user's private content and/or selects the first object from the user's private content to move to the public content, as described with reference to FIGS. 7G-7J. Providing the user with an option to change whether a user interface object shared with other users that are participating in a communication session, or whether the user interface object is privately displayed for the user without sharing the user interface object with the other users, improves the visual feedback provided to the user as the user selects which user interface objects to be shared with other users or not, and provides additional controls for the user without requiring the user to navigate through complex menu hierarchies, thereby providing improved visual feedback to the user without requiring additional user input.

In some embodiments, a respective object of the first object type that has the first spatial relationship to the viewpoint of the view of the three-dimensional environment has a display depth of more than a threshold distance that corresponds to an arm's length of the user, away from the viewpoint of the view of the three-dimensional environment. For example, user interface object 7302' described in FIGS. 7G-7J is displayed within the three-dimensional environment as being at a depth (e.g., distance away from the user's viewpoint) that is perceived to be out of reach of the user. Automatically displaying a user interface object at a position relative to the user's arm such that the object appears out of reach of the user, provides real-time feedback to the user by maintaining display of the user interface object even as the user moves the user's arm, thereby providing improved visual feedback to the user without requiring additional user input.

It should be understood that the particular order in which the operations in FIG. 10 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000 and 9000) are also applicable in an analogous manner to method 10000 described above with respect to FIG. 10. For example, the gestures, gaze inputs, physical objects, user interface objects, controls, movements, criteria, three-dimensional environment, display generation component, surface, representation of physical object, virtual objects, and/or animations described above with reference to method 10000 optionally have one or more of the characteristics of the gestures, gaze inputs, physical objects, user interface objects, controls, movements, criteria, three-dimensional environment, display generation component, surface, representation of physical object, virtual objects, and/or animations described herein with reference to other methods described herein (e.g., methods 8000 and 9000). For brevity, these details are not repeated here.

The operations described above with reference to FIGS. 8, 9, and 10 are, optionally, implemented by components depicted in FIGS. 1-6. In some embodiments, aspects/operations of methods 8000, 9000, and 10000 may be interchanged, substituted, and/or added between these methods. For brevity, these details are not repeated here.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

The foregoing description, for purpose of explanation, has been described with reference to specific embodiments.

However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
at a computer system that is in communication with a first display generation component and one or more input devices:
displaying, via the first display generation component, a first user interface object and a second user interface object in a first view of a three-dimensional environment, wherein a respective characteristic position of the first user interface object in the three-dimensional environment has a first spatial relationship to a first anchor position in the three-dimensional environment that corresponds to a location of a first hand of a user in a physical environment, and a respective characteristic position of the second user interface object in the three-dimensional environment has a second spatial relationship to the first anchor position in the three-dimensional environment that corresponds to the location of the first hand of the user in the physical environment, and wherein the first user interface object includes one or more user interface objects in a predetermined layout;
while displaying the first user interface object and the second user interface object in the first view of the three-dimensional environment, detecting, via the one or more input devices, a first movement of the first hand in the physical environment, the first movement of the first hand corresponds to a translational movement and a rotational movement relative to a viewpoint corresponding to the first view of the three-dimensional environment; and
in response to detecting the first movement of the first hand in the physical environment:
translating the first user interface object and the second user interface object in the three-dimensional environment relative to the viewpoint in accordance with the translational movement of the first hand in the physical environment; and
rotating the first user interface object in the three-dimensional environment relative to the viewpoint in accordance with the rotational movement of the first hand in the physical environment, without rotating the second user interface object in the three-dimensional environment.

2. The method of claim 1, wherein the first spatial relationship requires that the respective characteristic position of the first user interface object has a same distance or is closer to the viewpoint as compared to the first anchor position, and the second spatial relationship requires that the respective characteristic position of the second user interface object is farther away from the viewpoint as compared to the first anchor position.

3. The method of claim 1, wherein the second user interface object is oriented in the first view of the three-dimensional environment in accordance with a direction in the physical environment.

4. The method of claim 3, wherein the second user interface object is oriented in the first view of the three-dimensional environment in accordance with an upright direction of the first display generation component in the physical environment.

5. The method of claim 1, including:
while displaying the second user interface object in a respective view of the three-dimensional environment, detecting a first user input that corresponds to a request to display the second user interface object in the three-dimensional environment without regard to the second spatial relationship to the first anchor position in the three-dimensional environment; and
in response to detecting the first user input:
moving the second user interface object away from the respective characteristic position that has the second spatial relationship to the first anchor position, to a position that is independent of the location of the first hand of the user in the physical environment.

6. The method of claim 5, wherein detecting the first user input that corresponds to the request to display the second user interface object in the three-dimensional environment without regard to the second spatial relationship to the first anchor position in the three-dimensional environment includes:
detecting a first gesture of a second hand of the user, wherein the first gesture is directed to a first control object displayed at a position in the three-dimensional environment that corresponds to a location of the first hand of the user in the physical environment.

7. The method of claim 5, including:
while the second user interface object is displayed at the position that is independent of the location of the first hand of the user in the physical environment, displaying a second control object at a respective position in the three-dimensional environment that corresponds to the location of the first hand in the physical environment;
while displaying the second control object at the respective position in the three-dimensional environment that corresponds to the location of the first hand in the physical environment, detecting a second gesture of a second hand of the user, wherein the second gesture is directed to the second control object displayed at the respective position in the three-dimensional environment that corresponds to the location of the first hand of the user in the physical environment; and
in response to detecting the second gesture directed to the second control object, ceasing to display the second user interface object at the position that is independent of the location of the first hand of the user in the physical environment.

8. The method of claim 5, including:
while displaying the second user interface object in a respective view of the three-dimensional environment, detecting, via the one or more input devices, a second movement of the first hand in the physical environment, wherein the second movement of the first hand causes a representation of the first hand to move out of the respective view of the three-dimensional environment; and
in accordance with a determination that the second movement of the first hand has caused the representation of the first hand to move out of the respective view of the three-dimensional environment:
in accordance with a determination that the second user interface object is currently displayed with its characteristic position having the second spatial relationship with the first anchor position, ceasing to display the second user interface object in the respective view of the three-dimensional environment; and in accordance with a determination that the second user interface object is currently displayed at a position that is independent of the location of the first hand, maintaining display of the second user interface object in the respective view of the three-dimensional environment.

9. The method of claim 1, including:

while displaying the second user interface object in the first view of the three-dimensional environment, detecting, via the one or more input devices, a third movement of the first hand in the physical environment, wherein the third movement of the first hand corresponds to a movement of the first anchor position toward or away from the viewpoint corresponding to the first view of the three-dimensional environment; and in response to detecting the third movement of the first hand in the physical environment:

changing a size of the second user interface object in accordance with the movement of the first anchor position toward or away from the viewpoint, while maintaining the second spatial relationship between the respective characteristic position of the second user interface object and the first anchor position in the three-dimensional environment.

10. The method of claim 1, wherein a size of the second user interface object in the three-dimensional environment is selected based at least in part on a size of the first hand.

11. The method of claim 1, wherein an orientation of the first user interface object is selected based on a characteristic orientation of the first hand.

12. The method of claim 1, wherein the first user interface object is a control panel including a plurality of user interface objects corresponding to different device control functions of the computer system.

13. The method of claim 1, wherein the first user interface object is a dock including a plurality of user interface objects corresponding to different applications or experiences, wherein a respective user interface object in the dock, when activated, causes the computer system to initiate display of a respective application or computer-generated reality experience.

14. The method of claim 1, including:

while displaying the first user interface object in the first view of the three-dimensional environment, detecting, via the one or more input devices, a second movement of the first hand in the physical environment, the second movement of the first hand causes a first side of the first hand to turn away from the viewpoint corresponding to the first view of the three-dimensional environment; and in response to detecting the second movement of the first hand in the physical environment:

in accordance with a determination that visibility of the first side of the first hand in the first view of the three-dimensional environment is below a threshold amount of visibility, displaying a third user interface object, different from the first and second user interface objects overlaying or replacing display of a portion of a second side of the first hand in the three-dimensional environment; and in accordance with a determination that visibility of the first side of the first hand in the first view of the three-dimensional environment is above the threshold amount of visibility, forgoing display of the third user interface object in the three-dimensional environment.

15. The method of claim 1, including:

while displaying at least one of the first user interface object and the second user interface object in the first view of the three-dimensional environment, detecting, via the one or more input devices, a third movement of the first hand in the physical environment, wherein the third movement of the first hand reduces a spatial extent of a representation of a first side of the first hand in the first view of the three-dimensional environment; and in response to detecting the third movement of the first hand in the physical environment, reducing a visual prominence of the at least one of the first user interface object and the second user interface object in the first view of the three-dimensional environment.

16. The method of claim 1, including:

while displaying at least one of the first user interface object and the second user interface object in the first view of the three-dimensional environment, detecting, via the one or more input devices, a fourth movement of the first hand in the physical environment; and in response to detecting the fourth movement of the first hand in the physical environment:

in accordance with a determination that the fourth movement of the first hand causes a representation of the first hand to exit the first view of the three-dimensional environment, and a determination that a first side of the first hand was facing toward the viewpoint of the first view of the three-dimensional environment when representation of the first hand exited the first view of the three-dimensional environment, maintaining display the at least one of the first user interface object and the second user interface object in the first view of the three-dimensional environment; and in accordance with a determination that the fourth movement of the first hand causes the representation of the first hand to exit the first view of the three-dimensional environment, and a determination that the first side of the first hand was not facing toward the viewpoint of the first view of the three-dimensional environment when representation of the first hand exited the first view of the three-dimensional environment, ceasing display the at least one of the first user interface object and the second user interface object in the first view of the three-dimensional environment.

17. The method of claim 1, wherein the first hand is a non-dominant hand associated with the user, and in accordance with a determination that the first hand is the non-dominant hand associated with the user, the computer system displays the first user interface object and the second user interface object with the first and second spatial relationships to the first anchor position in the three-dimensional environment that corresponds to the location of the first hand, while both the first hand and a second hand of the user are visible in the first view of the three-dimensional environment.

18. The method of claim 1, including:

prior to displaying the second user interface object with the respective characteristic position of the second user interface object having the second spatial relationship to the first anchor position in the three-dimensional environment, moving the second user interface object from an initial position to the respective characteristic position of the second user interface object in the first view of the three-dimensional environment, wherein the initial position of the second user interface object is closer to the first anchor position in the three-dimensional environment than respective characteristic position of the second user interface object with the second spatial relationship with the first anchor position.

19. The method of claim 1, including:
while displaying at least one of the first user interface object and the second user interface object in the first view of the three-dimensional environment, detecting, via the one or more input devices, an input directed to a respective user interface object of the at least one of the first user interface object and the second user interface object; and
in response to detecting the input that is directed to the respective user interface object of the at least one of the first user interface object and the second user interface object, in accordance with a determination that the input meets activation criteria, performing an operation corresponding to activation of the respective user interface object of the at least one of the first user interface object and the second user interface object, wherein the activation criteria are capable of being met by either:
a gaze input directed to the respective user interface object in conjunction with a first gesture of a second hand of the user detected away from a characteristic position of the respective user interface object, or
a second gesture detected at a location corresponding to the characteristic position of the respective user interface object.

20. The method of claim 1, including:
while displaying at least one of the first user interface object and the second user interface object in the first view of the three-dimensional environment, detecting, via the one or more input devices, a first gaze input directed to a respective user interface object of the at least one of the first user interface object and the second user interface object; and
in response to detecting the first gaze input that is directed to the respective user interface object of the at least one of the first user interface object and the second user interface object, displaying an expanded version of the respective user interface object.

21. A computer system, comprising:
a first display generation component;
one or more input devices;
one or more processors; and
memory storing one or more programs, wherein the one or more programs are configured to be executed by the one or more processors, the one or more programs including instructions for performing operations including:
displaying, via the first display generation component, a first user interface object and a second user interface object in a first view of a three-dimensional environment, wherein a respective characteristic position of the first user interface object in the three-dimensional environment has a first spatial relationship to a first anchor position in the three-dimensional environment that corresponds to a location of a first hand of a user in a physical environment, and a respective characteristic position of the second user interface object in the three-dimensional environment has a second spatial relationship to the first anchor position in the three-dimensional environment that corresponds to the location of the first hand of the user in the physical environment, and wherein the first user interface object includes one or more user interface objects in a predetermined layout;
while displaying the first user interface object and the second user interface object in the first view of the three-dimensional environment, detecting, via the one or more input devices, a first movement of the first hand in the physical environment, the first movement of the first hand corresponds to a translational movement and a rotational movement relative to a viewpoint corresponding to the first view of the three-dimensional environment; and
in response to detecting the first movement of the first hand in the physical environment:
translating the first user interface object and the second user interface object in the three-dimensional environment relative to the viewpoint in accordance with the translational movement of the first hand in the physical environment; and
rotating the first user interface object in the three-dimensional environment relative to the viewpoint in accordance with the rotational movement of the first hand in the physical environment, without rotating the second user interface object in the three-dimensional environment.

22. A non-transitory computer readable storage medium storing one or more programs, the one or more programs comprising instructions that, when executed by a computer system that includes a first display generation component and one or more input devices, cause the computer system to:
display, via the first display generation component, a first user interface object and a second user interface object in a first view of a three-dimensional environment, wherein a respective characteristic position of the first user interface object in the three-dimensional environment has a first spatial relationship to a first anchor position in the three-dimensional environment that corresponds to a location of a first hand of a user in a physical environment, and a respective characteristic position of the second user interface object in the three-dimensional environment has a second spatial relationship to the first anchor position in the three-dimensional environment that corresponds to the location of the first hand of the user in the physical environment, and wherein the first user interface object includes one or more user interface objects in a predetermined layout;
while displaying the first user interface object and the second user interface object in the first view of the three-dimensional environment, detect, via the one or more input devices, a first movement of the first hand in the physical environment, the first movement of the first hand corresponds to a translational movement and a rotational movement relative to a viewpoint corresponding to the first view of the three-dimensional environment; and
in response to detecting the first movement of the first hand in the physical environment:
translate the first user interface object and the second user interface object in the three-dimensional environment relative to the viewpoint in accordance with the translational movement of the first hand in the physical environment; and rotate the first user interface object in the three-dimensional environment relative to the viewpoint in accordance with the rotational movement of the first hand in the physical environment, without rotating the second user interface object in the three-dimensional environment.

23. The computer system of claim 21, wherein the first spatial relationship requires that the respective characteristic position of the first user interface object has a same distance or is closer to the viewpoint as compared to the first anchor position, and the second spatial relationship requires that the respective characteristic position of the second user interface object is farther away from the viewpoint as compared to the first anchor position.

24. The computer system of claim 21, wherein the second user interface object is oriented in the first view of the three-dimensional environment in accordance with a direction in the physical environment.

25. The computer system of claim 24, wherein the second user interface object is oriented in the first view of the three-dimensional environment in accordance with an upright direction of the first display generation component in the physical environment.

26. The computer system of claim 21, wherein the one or more programs include instructions for:
while displaying the second user interface object in a respective view of the three-dimensional environment, detecting a first user input that corresponds to a request to display the second user interface object in the three-dimensional environment without regard to the second spatial relationship to the first anchor position in the three-dimensional environment; and
in response to detecting the first user input:
moving the second user interface object away from the respective characteristic position that has the second spatial relationship to the first anchor position, to a position that is independent of the location of the first hand of the user in the physical environment.

27. The computer system of claim 26, wherein detecting the first user input that corresponds to the request to display the second user interface object in the three-dimensional environment without regard to the second spatial relationship to the first anchor position in the three-dimensional environment includes:
detecting a first gesture of a second hand of the user, wherein the first gesture is directed to a first control object displayed at a position in the three-dimensional environment that corresponds to a location of the first hand of the user in the physical environment.

28. The computer system of claim 26, wherein the one or more programs include instructions for:
while the second user interface object is displayed at the position that is independent of the location of the first hand of the user in the physical environment, displaying a second control object at a respective position in the three-dimensional environment that corresponds to the location of the first hand in the physical environment;
while displaying the second control object at the respective position in the three-dimensional environment that corresponds to the location of the first hand in the physical environment, detecting a second gesture of a second hand of the user, wherein the second gesture is directed to the second control object displayed at the respective position in the three-dimensional environment that corresponds to the location of the first hand of the user in the physical environment; and
in response to detecting the second gesture directed to the second control object, ceasing to display the second user interface object at the position that is independent of the location of the first hand of the user in the physical environment.

29. The computer system of claim 26, wherein the one or more programs include instructions for:
while displaying the second user interface object in a respective view of the three-dimensional environment, detecting, via the one or more input devices, a second movement of the first hand in the physical environment, wherein the second movement of the first hand causes a representation of the first hand to move out of the respective view of the three-dimensional environment; and
in accordance with a determination that the second movement of the first hand has caused the representation of the first hand to move out of the respective view of the three-dimensional environment:
in accordance with a determination that the second user interface object is currently displayed with its characteristic position having the second spatial relationship with the first anchor position, ceasing to display the second user interface object in the respective view of the three-dimensional environment; and
in accordance with a determination that the second user interface object is currently displayed at a position that is independent of the location of the first hand, maintaining display of the second user interface object in the respective view of the three-dimensional environment.

30. The computer system of claim 21, wherein the one or more programs include instructions for:
while displaying the second user interface object in the first view of the three-dimensional environment, detecting, via the one or more input devices, a third movement of the first hand in the physical environment, wherein the third movement of the first hand corresponds to a movement of the first anchor position toward or away from the viewpoint corresponding to the first view of the three-dimensional environment; and
in response to detecting the third movement of the first hand in the physical environment:
changing a size of the second user interface object in accordance with the movement of the first anchor position toward or away from the viewpoint, while maintaining the second spatial relationship between the respective characteristic position of the second user interface object and the first anchor position in the three-dimensional environment.

31. The computer system of claim 21, wherein a size of the second user interface object in the three-dimensional environment is selected based at least in part on a size of the first hand.

32. The computer system of claim 21, wherein an orientation of the first user interface object is selected based on a characteristic orientation of the first hand.

33. The computer system of claim 21, wherein the first user interface object is a control panel including a plurality of user interface objects corresponding to different device control functions of the computer system.

34. The computer system of claim 21, wherein the first user interface object is a dock including a plurality of user interface objects corresponding to different applications or experiences, wherein a respective user interface object in the dock, when activated, causes the computer system to initiate display of a respective application or computer-generated reality experience.

35. The computer system of claim 21, wherein the one or more programs include instructions for:
while displaying the first user interface object in the first view of the three-dimensional environment, detecting, via the one or more input devices, a second movement of the first hand in the physical environment, the second movement of the first hand causes a first side of the first hand to turn away from the viewpoint corresponding to the first view of the three-dimensional environment; and
in response to detecting the second movement of the first hand in the physical environment:
in accordance with a determination that visibility of the first side of the first hand in the first view of the three-dimensional environment is below a threshold amount of visibility, displaying a third user interface object, different from the first and second user interface objects overlaying or replacing display of a portion of a second side of the first hand in the three-dimensional environment; and
in accordance with a determination that visibility of the first side of the first hand in the first view of the three-dimensional environment is above the threshold amount of visibility, forgoing display of the third user interface object in the three-dimensional environment.

36. The computer system of claim 21, wherein the one or more programs include instructions for:
while displaying at least one of the first user interface object and the second user interface object in the first view of the three-dimensional environment, detecting, via the one or more input devices, a third movement of the first hand in the physical environment, wherein the third movement of the first hand reduces a spatial extent of a representation of a first side of the first hand in the first view of the three-dimensional environment; and
in response to detecting the third movement of the first hand in the physical environment, reducing a visual prominence of the at least one of the first user interface object and the second user interface object in the first view of the three-dimensional environment.

37. The computer system of claim 21, including:
while displaying at least one of the first user interface object and the second user interface object in the first view of the three-dimensional environment, detecting, via the one or more input devices, a fourth movement of the first hand in the physical environment; and
in response to detecting the fourth movement of the first hand in the physical environment:
in accordance with a determination that the fourth movement of the first hand causes a representation of the first hand to exit the first view of the three-dimensional environment, and a determination that a first side of the first hand was facing toward the viewpoint of the first view of the three-dimensional environment when representation of the first hand exited the first view of the three-dimensional environment, maintaining display the at least one of the first user interface object and the second user interface object in the first view of the three-dimensional environment; and
in accordance with a determination that the fourth movement of the first hand causes the representation of the first hand to exit the first view of the three-dimensional environment, and a determination that the first side of the first hand was not facing toward the viewpoint of the first view of the three-dimensional environment when representation of the first hand exited the first view of the three-dimensional environment, ceasing display the at least one of the first user interface object and the second user interface object in the first view of the three-dimensional environment.

38. The computer system of claim 21, wherein the first hand is a non-dominant hand associated with the user, and in accordance with a determination that the first hand is the non-dominant hand associated with the user, the computer system displays the first user interface object and the second user interface object with the first and second spatial relationships to the first anchor position in the three-dimensional environment that corresponds to the location of the first hand, while both the first hand and a second hand of the user are visible in the first view of the three-dimensional environment.

39. The computer system of claim 21, wherein the one or more programs include instructions for:
prior to displaying the second user interface object with the respective characteristic position of the second user interface object having the second spatial relationship to the first anchor position in the three-dimensional environment, moving the second user interface object from an initial position to the respective characteristic position of the second user interface object in the first view of the three-dimensional environment, wherein the initial position of the second user interface object is closer to the first anchor position in the three-dimensional environment than respective characteristic position of the second user interface object with the second spatial relationship with the first anchor position.

40. The computer system of claim 21, wherein the one or more programs include instructions for:
while displaying at least one of the first user interface object and the second user interface object in the first view of the three-dimensional environment, detecting, via the one or more input devices, an input directed to a respective user interface object of the at least one of the first user interface object and the second user interface object; and
in response to detecting the input that is directed to the respective user interface object of the at least one of the first user interface object and the second user interface object, in accordance with a determination that the input meets activation criteria, performing an operation corresponding to activation of the respective user interface object of the at least one of the first user interface object and the second user interface object, wherein the activation criteria are capable of being met by either:
a gaze input directed to the respective user interface object in conjunction with a first gesture of a second hand of the user detected away from a characteristic position of the respective user interface object, or
a second gesture detected at a location corresponding to the characteristic position of the respective user interface object.

41. The computer system of claim 21, wherein the one or more programs include instructions for:
while displaying at least one of the first user interface object and the second user interface object in the first view of the three-dimensional environment, detecting, via the one or more input devices, a first gaze input directed to a respective user interface object of the at least one of the first user interface object and the second user interface object; and in response to detecting the first gaze input that is directed to the respective user interface object of the at least one of the first user interface object and the second user interface object, displaying an expanded version of the respective user interface object.

42. The non-transitory computer readable storage medium of claim 22, wherein the first spatial relationship requires that the respective characteristic position of the first user interface object has a same distance or is closer to the viewpoint as compared to the first anchor position, and the second spatial relationship requires that the respective characteristic position of the second user interface object is farther away from the viewpoint as compared to the first anchor position.

43. The non-transitory computer readable storage medium of claim 22, wherein the second user interface object is oriented in the first view of the three-dimensional environment in accordance with a direction in the physical environment.

44. The non-transitory computer readable storage medium of claim 43, wherein the second user interface object is oriented in the first view of the three-dimensional environment in accordance with an upright direction of the first display generation component in the physical environment.

45. The non-transitory computer readable storage medium of claim 22, wherein the one or more comprise instructions that, when executed by the computer system, cause the computer system to perform operations including:

while displaying the second user interface object in a respective view of the three-dimensional environment, detecting a first user input that corresponds to a request to display the second user interface object in the three-dimensional environment without regard to the second spatial relationship to the first anchor position in the three-dimensional environment; and in response to detecting the first user input:
moving the second user interface object away from the respective characteristic position that has the second spatial relationship to the first anchor position, to a position that is independent of the location of the first hand of the user in the physical environment.

46. The non-transitory computer readable storage medium of claim 45, wherein detecting the first user input that corresponds to the request to display the second user interface object in the three-dimensional environment without regard to the second spatial relationship to the first anchor position in the three-dimensional environment includes:

detecting a first gesture of a second hand of the user, wherein the first gesture is directed to a first control object displayed at a position in the three-dimensional environment that corresponds to a location of the first hand of the user in the physical environment.

47. The non-transitory computer readable storage medium of claim 45, wherein the one or more comprise instructions that, when executed by the computer system, cause the computer system to perform operations including:

while the second user interface object is displayed at the position that is independent of the location of the first hand of the user in the physical environment, displaying a second control object at a respective position in the three-dimensional environment that corresponds to the location of the first hand in the physical environment;

while displaying the second control object at the respective position in the three-dimensional environment that corresponds to the location of the first hand in the physical environment, detecting a second gesture of a second hand of the user, wherein the second gesture is directed to the second control object displayed at the respective position in the three-dimensional environment that corresponds to the location of the first hand of the user in the physical environment; and in response to detecting the second gesture directed to the second control object, ceasing to display the second user interface object at the position that is independent of the location of the first hand of the user in the physical environment.

48. The non-transitory computer readable storage medium of claim 45, wherein the one or more comprise instructions that, when executed by the computer system, cause the computer system to perform operations including:

while displaying the second user interface object in a respective view of the three-dimensional environment, detecting, via the one or more input devices, a second movement of the first hand in the physical environment, wherein the second movement of the first hand causes a representation of the first hand to move out of the respective view of the three-dimensional environment; and in accordance with a determination that the second movement of the first hand has caused the representation of the first hand to move out of the respective view of the three-dimensional environment:

in accordance with a determination that the second user interface object is currently displayed with its characteristic position having the second spatial relationship with the first anchor position, ceasing to display the second user interface object in the respective view of the three-dimensional environment; and in accordance with a determination that the second user interface object is currently displayed at a position that is independent of the location of the first hand, maintaining display of the second user interface object in the respective view of the three-dimensional environment.

49. The non-transitory computer readable storage medium of claim 22, wherein the one or more comprise instructions that, when executed by the computer system, cause the computer system to perform operations including:

while displaying the second user interface object in the first view of the three-dimensional environment, detecting, via the one or more input devices, a third movement of the first hand in the physical environment, wherein the third movement of the first hand corresponds to a movement of the first anchor position toward or away from the viewpoint corresponding to the first view of the three-dimensional environment; and in response to detecting the third movement of the first hand in the physical environment:
changing a size of the second user interface object in accordance with the movement of the first anchor position toward or away from the viewpoint, while maintaining the second spatial relationship between the respective characteristic position of the second user interface object and the first anchor position in the three-dimensional environment.

50. The non-transitory computer readable storage medium of claim 22, wherein a size of the second user interface object in the three-dimensional environment is selected based at least in part on a size of the first hand.

51. The non-transitory computer readable storage medium of claim 22, wherein an orientation of the first user interface object is selected based on a characteristic orientation of the first hand.

52. The non-transitory computer readable storage medium of claim 22, wherein the first user interface object is a control panel including a plurality of user interface objects corresponding to different device control functions of the computer system.

53. The non-transitory computer readable storage medium of claim 22, wherein the first user interface object is a dock including a plurality of user interface objects corresponding to different applications or experiences, wherein a respective user interface object in the dock, when activated, causes the computer system to initiate display of a respective application or computer-generated reality experience.

54. The non-transitory computer readable storage medium of claim 22, wherein the one or more comprise instructions that, when executed by the computer system, cause the computer system to perform operations including:
  while displaying the first user interface object in the first view of the three-dimensional environment, detecting, via the one or more input devices, a second movement of the first hand in the physical environment, the second movement of the first hand causes a first side of the first hand to turn away from the viewpoint corresponding to the first view of the three-dimensional environment; and
  in response to detecting the second movement of the first hand in the physical environment:
    in accordance with a determination that visibility of the first side of the first hand in the first view of the three-dimensional environment is below a threshold amount of visibility, displaying a third user interface object, different from the first and second user interface objects overlaying or replacing display of a portion of a second side of the first hand in the three-dimensional environment; and
    in accordance with a determination that visibility of the first side of the first hand in the first view of the three-dimensional environment is above the threshold amount of visibility, forgoing display of the third user interface object in the three-dimensional environment.

55. The non-transitory computer readable storage medium of claim 22, wherein the one or more comprise instructions that, when executed by the computer system, cause the computer system to perform operations including:
  while displaying at least one of the first user interface object and the second user interface object in the first view of the three-dimensional environment, detecting, via the one or more input devices, a third movement of the first hand in the physical environment, wherein the third movement of the first hand reduces a spatial extent of a representation of a first side of the first hand in the first view of the three-dimensional environment; and
  in response to detecting the third movement of the first hand in the physical environment, reducing a visual prominence of the at least one of the first user interface object and the second user interface object in the first view of the three-dimensional environment.

56. The non-transitory computer readable storage medium of claim 22, wherein the one or more comprise instructions that, when executed by the computer system, cause the computer system to perform operations including:
  while displaying at least one of the first user interface object and the second user interface object in the first view of the three-dimensional environment, detecting, via the one or more input devices, a fourth movement of the first hand in the physical environment; and
  in response to detecting the fourth movement of the first hand in the physical environment:
    in accordance with a determination that the fourth movement of the first hand causes a representation of the first hand to exit the first view of the three-dimensional environment, and a determination that a first side of the first hand was facing toward the viewpoint of the first view of the three-dimensional environment when representation of the first hand exited the first view of the three-dimensional environment, maintaining display the at least one of the first user interface object and the second user interface object in the first view of the three-dimensional environment; and
    in accordance with a determination that the fourth movement of the first hand causes the representation of the first hand to exit the first view of the three-dimensional environment, and a determination that the first side of the first hand was not facing toward the viewpoint of the first view of the three-dimensional environment when representation of the first hand exited the first view of the three-dimensional environment, ceasing display the at least one of the first user interface object and the second user interface object in the first view of the three-dimensional environment.

57. The non-transitory computer readable storage medium of claim 22, wherein the first hand is a non-dominant hand associated with the user, and in accordance with a determination that the first hand is the non-dominant hand associated with the user, the computer system displays the first user interface object and the second user interface object with the first and second spatial relationships to the first anchor position in the three-dimensional environment that corresponds to the location of the first hand, while both the first hand and a second hand of the user are visible in the first view of the three-dimensional environment.

58. The non-transitory computer readable storage medium of claim 22, wherein the one or more comprise instructions that, when executed by the computer system, cause the computer system to perform operations including:
  prior to displaying the second user interface object with the respective characteristic position of the second user interface object having the second spatial relationship to the first anchor position in the three-dimensional environment, moving the second user interface object from an initial position to the respective characteristic position of the second user interface object in the first view of the three-dimensional environment, wherein the initial position of the second user interface object is closer to the first anchor position in the three-dimensional environment than respective characteristic position of the second user interface object with the second spatial relationship with the first anchor position.

59. The non-transitory computer readable storage medium of claim 22, wherein the one or more comprise instructions that, when executed by the computer system, cause the computer system to perform operations including:
  while displaying at least one of the first user interface object and the second user interface object in the first view of the three-dimensional environment, detecting, via the one or more input devices, an input directed to a respective user interface object of the at least one of the first user interface object and the second user interface object; and in response to detecting the input that is directed to the respective user interface object of the at least one of the first user interface object and the second user interface object, in accordance with a determination that the input meets activation criteria, performing an operation corresponding to activation of the respective user interface object of the at least one of the first user interface object and the second user interface object, wherein the activation criteria are capable of being met by either:

a gaze input directed to the respective user interface object in conjunction with a first gesture of a second hand of the user detected away from a characteristic position of the respective user interface object, or a second gesture detected at a location corresponding to the characteristic position of the respective user interface object.

60. The non-transitory computer readable storage medium of claim 22, wherein the one or more comprise instructions that, when executed by the computer system, cause the computer system to perform operations including:

while displaying at least one of the first user interface object and the second user interface object in the first view of the three-dimensional environment, detecting, via the one or more input devices, a first gaze input directed to a respective user interface object of the at least one of the first user interface object and the second user interface object; and in response to detecting the first gaze input that is directed to the respective user interface object of the at least one of the first user interface object and the second user interface object, displaying an expanded version of the respective user interface object.

\* \* \* \* \*